(12) United States Patent
Kutz et al.

(10) Patent No.: US 12,556,440 B2
(45) Date of Patent: Feb. 17, 2026

(54) SIGNALING OF INFORMATION FOR NON-LINEARITY MODEL

(71) Applicant: QUALCOMM Incorporated, San Diego, CA (US)

(72) Inventors: Gideon Shlomo Kutz, Ramat Hasharon (IL); Yaron Laufer, Brookline, MA (US); Amit Bar-Or Tillinger, Tel-Aviv (IL); Elad Meir, Ramat Gan (IL); Ori Barak, Beer Sheva (IL); Assaf Touboul, Netanya (IL); Ram Krips, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/742,698

(22) Filed: May 12, 2022

(65) Prior Publication Data
US 2022/0385515 A1 Dec. 1, 2022

Related U.S. Application Data

(63) Continuation of application No. 17/738,983, filed on May 6, 2022.

(60) Provisional application No. 63/186,795, filed on May 10, 2021.

(51) Int. Cl.
| | |
|---|---|
| *H04L 27/26* | (2006.01) |
| *H03F 1/32* | (2006.01) |
| *H03F 3/24* | (2006.01) |
| *H04B 1/04* | (2006.01) |
| *H04W 74/04* | (2009.01) |
| *H04W 76/15* | (2018.01) |

(52) U.S. Cl.
CPC ....... *H04L 27/2623* (2013.01); *H03F 1/3276* (2013.01); *H03F 3/24* (2013.01); *H04B 1/0475* (2013.01); *H04W 74/04* (2013.01); *H04W 76/15* (2018.02); *H04B 2001/0425* (2013.01)

(58) Field of Classification Search
CPC .. H04L 27/2623; H04W 76/15; H04W 74/04; H04B 1/0475; H04B 2001/0425; H03F 1/3276; H03F 3/24
USPC .................................................. 375/295, 296
See application file for complete search history.

(56) References Cited

U.S. PATENT DOCUMENTS

| | | |
|---|---|---|
| 8,265,583 B1 | 9/2012 | Venkataraman |
| 9,337,782 B1 * | 5/2016 | Mauer ............... H04L 25/03343 |
| 10,091,810 B2 | 10/2018 | Zeng et al. |

(Continued)

FOREIGN PATENT DOCUMENTS

WO WO-2021132928 A1 * 7/2021 ........... H04B 1/0475

OTHER PUBLICATIONS

International Search Report and Written Opinion—PCT/US2022/028315—ISA/EPO—Sep. 15, 2022.

*Primary Examiner* — Kevin M Burd
(74) *Attorney, Agent, or Firm* — Loza & Loza, LLP

(57) ABSTRACT

Aspects relate to signaling relating to a non-linearity model for power amplifier circuitry of a transmitting device. The power amplifier circuitry may apply digital pre-distortion (DPD) to a signal prior to amplification and transmission of the signal. A receiving device may apply digital post-distortion (DPoD) to a signal received from the transmitting device where the DPoD is based on the non-linearity model. The transmitting device may send to the receiving device non-linearity parameters for the non-linearity model.

26 Claims, 27 Drawing Sheets

(56) References Cited

U.S. PATENT DOCUMENTS

| | | | |
|---|---|---|---|
| 10,447,244 B1* | 10/2019 | Zhou | H03H 17/0294 |
| 10,911,029 B1 | 2/2021 | Velazquez et al. | |
| 2007/0153884 A1 | 7/2007 | Balasubramanian et al. | |
| 2011/0103455 A1 | 5/2011 | Forrester et al. | |
| 2011/0261896 A1* | 10/2011 | Haddad | H04L 27/2623 |
| | | | 375/268 |
| 2012/0081178 A1 | 4/2012 | Shi et al. | |
| 2012/0328050 A1 | 12/2012 | Bai et al. | |
| 2015/0049843 A1* | 2/2015 | Reuven | H04B 1/0475 |
| | | | 375/296 |
| 2015/0054579 A1 | 2/2015 | Omer et al. | |
| 2015/0318830 A1 | 11/2015 | Okazaki | |
| 2016/0034421 A1 | 2/2016 | Magesacher et al. | |
| 2017/0111189 A1* | 4/2017 | Fine | H04L 5/005 |
| 2018/0152925 A1* | 5/2018 | Nammi | H04W 72/0453 |
| 2018/0316450 A1* | 11/2018 | Rico Alvarino | H04L 5/0053 |
| 2019/0207785 A1* | 7/2019 | Choi | H04L 25/0224 |
| 2019/0215023 A1 | 7/2019 | Abouelenin | |
| 2020/0083934 A1 | 3/2020 | Nammi | |
| 2020/0119755 A1 | 4/2020 | Mahmood et al. | |
| 2020/0169334 A1 | 5/2020 | Li et al. | |
| 2020/0252032 A1 | 8/2020 | Faig et al. | |
| 2021/0014912 A1 | 1/2021 | Song et al. | |
| 2021/0111769 A1* | 4/2021 | Wang | H04B 7/0434 |
| 2021/0119654 A1 | 4/2021 | Raghavan | |
| 2021/0119682 A1* | 4/2021 | Gutman | H04L 25/03006 |
| 2021/0306843 A1* | 9/2021 | Tsai | H04W 24/10 |
| 2022/0393709 A1 | 12/2022 | Kutz et al. | |
| 2023/0354187 A1* | 11/2023 | Kim | H04W 76/15 |

* cited by examiner

SIGNALING OF INFORMATION FOR NON-LINEARITY MODEL

CROSS-REFERENCE TO RELATED APPLICATIONS

The present application for patent is a continuation of U.S. patent application Ser. No. 17/738,983, titled "SIGNALING OF INFORMATION FOR NON-LINEARITY MODEL" filed May 6, 2022. U.S. patent application Ser. No. 17/738,983 claims priority to and the benefit of U.S. Provisional Application No. 63/186,795, titled "SIGNALING OF INFORMATION FOR NON-LINEARITY MODEL" filed May 10, 2021, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to techniques for signaling information relating to a non-linearity model of power amplifier circuitry.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of another wireless communication device such as a first base station (e.g., a gNB) and/or access a second cell of a second base station.

A base station may schedule access to a cell to support access by multiple UEs. For example, a base station may allocate different resources (e.g., time domain and frequency domain resources) for different UEs operating within a cell of the base station. A UE may therefore transmit data to the base station via one or more of these allocated resources. In addition, a UE may receive data transmitted by the base station via one or more of these allocated resources.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a first wireless communication device may include a transceiver, a memory, and a processor coupled to the transceiver and the memory. The processor may be configured to determine a change in a non-linearity model for a power amplifier circuit that includes a digital pre-distorter. The processor may also be configured to transmit an indication of the change in the non-linearity model to a second wireless communication device via the transceiver.

In some examples, a method for wireless communication at a first wireless communication device is disclosed. The method may include determining a change in a non-linearity model for a power amplifier circuit that includes a digital pre-distorter. The method may also include transmitting an indication of the change in the non-linearity model to a second wireless communication device.

In some examples, a first wireless communication device may include means for determining a change in a non-linearity model for a power amplifier circuit that includes a digital pre-distorter. The first wireless communication device may also include means for transmitting an indication of the change in the non-linearity model to a second wireless communication device.

In some examples, a non-transitory computer-readable medium has stored therein instructions executable by a processing system of a first wireless communication device to determine a change in a non-linearity model for a power amplifier circuit that includes a digital pre-distorter. The computer-readable medium may also have stored therein instructions executable by the processing system of the first wireless communication device to transmit an indication of the change in the non-linearity model to a second wireless communication device.

In some examples, a first wireless communication device may include a transceiver, a memory, and a processor coupled to the transceiver and the memory. The processor may be configured to receive, from a second wireless communication device via the transceiver, an indication of a change in a non-linearity model for a power amplifier circuit of the second wireless communication device. The processor may also be configured to update non-linearity information for a digital post-distorter of the first wireless communication device after the receipt of the indication. The processor may further be configured to receive a signal from the second wireless communication device via the transceiver. The processor may additionally be configured to use the digital post-distorter to compensate for non-linear distortion in the signal.

In some examples, a method for wireless communication at a first wireless communication device is disclosed. The method may include receiving, from a second wireless communication device, an indication of a change in a non-linearity model for a power amplifier circuit comprising a digital pre-distorter of the second wireless communication device. The method may also include updating non-linearity information for a digital post-distorter of the first wireless communication device after the receiving the indication. The method may further include receiving a signal from the second wireless communication device. The method may additionally include using the digital post-distortion to compensate for non-linear distortion in the signal.

In some examples, a first wireless communication device may include means for receiving, from a second wireless communication device, an indication of a change in a non-linearity model for a power amplifier circuit comprising a digital pre-distorter of the second wireless communication device. The first wireless communication device may also include means for updating non-linearity information for a digital post-distorter of the first wireless communication device after the receiving the indication. The first wireless communication device may further include means for receiving a signal from the second wireless communication device. The first wireless communication device may additionally include means for using the digital post-distortion to compensate for non-linear distortion in the signal.

In some examples, a non-transitory computer-readable medium has stored therein instructions executable by a processing system of a first wireless communication device to receive, from a second wireless communication device, an indication of a change in a non-linearity model for a power amplifier circuit of the second wireless communication device. The computer-readable medium may also have stored therein instructions executable by the processing system of the first wireless communication device to update non-linearity information for a digital post-distorter of the first wireless communication device after the receipt of the indication. The computer-readable medium may further have stored therein instructions executable by the processing system of the first wireless communication device to receive a signal from the second wireless communication device. The computer-readable medium may additionally have stored therein instructions executable by the processing system of the first wireless communication device to use the digital post-distorter to compensate for non-linear distortion in the signal.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
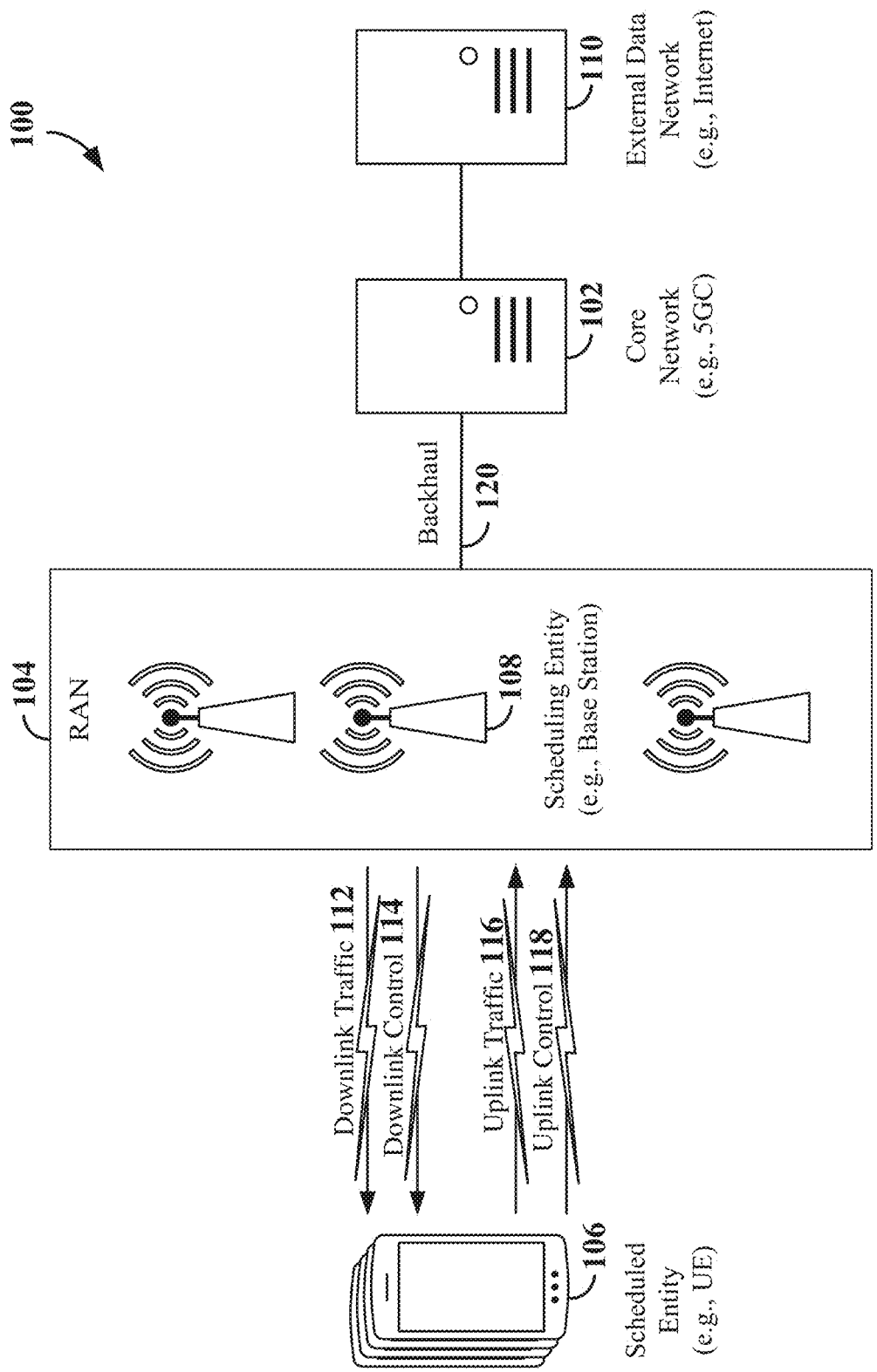
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the present disclosure relate to signaling information pertaining to a non-linear model (equivalently, a non-linearity model) of power amplifier circuitry at a transmitting device. The power amplifier circuitry applies digital pre-distortion (DPD) to a signal prior to non-linear amplification and transmission of the signal. The non-linearity model is representative of the non-linear characteristics of power amplifier circuitry such as a power amplifier, a digital pre-distorter, and, optionally, other components.

A receiving device may apply digital post-distortion (DPoD) to a signal received from the transmitting device. In some aspects, the DPoD may be based on the non-linearity model of the power amplifier circuitry of the transmitting device.

Due to one or more factors (e.g., a change in an attribute relating to the power amplifier of the power amplifier circuitry, a change in the DPD configuration, etc.), the non-linearity model may change over time. In this case, the transmitting device may send to the receiving device an indication of a change in the non-linearity model. In this way, the receiving device may be triggered to update its locally maintained non-linearity model of the power amplifier circuitry. Alternatively or in addition, the transmitting device may send to the receiving device non-linearity parameters for the non-linearity model after the non-linearity model has changed.

In some examples, the receiving device may calculate non-linearity information (e.g., DPD coefficients) for the non-linearity model of the power amplifier circuitry and transmit this information to the transmitting device. For example, the transmitting device may request that the receiving device calculate DPD coefficients to offload this task from the transmitting device. Upon receipt of the DPD coefficients, the transmitting device may update its locally maintained non-linearity model for the power amplifier circuitry. In some examples, the receiving device may jointly calculate DPD information and DPOD information.

In some examples, a transmitting device applies a first crest factor reduction (CFR) function, a DPD function, and a second CFR function to a signal prior to power amplification and transmission of the signal. In this case, the transmitting device may send to a receiving device parameters indicative of the effective model of the power amplifier, including parameters associated with the first CFR function, the DPD function, and the second CFR function. The receiving device may thereby take these parameters into account to determine a non-linearity model of the power amplifier circuitry, and use that non-linearity model for a DPoD function at the receiving device.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 50. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (SNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) of some other type of network entity allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
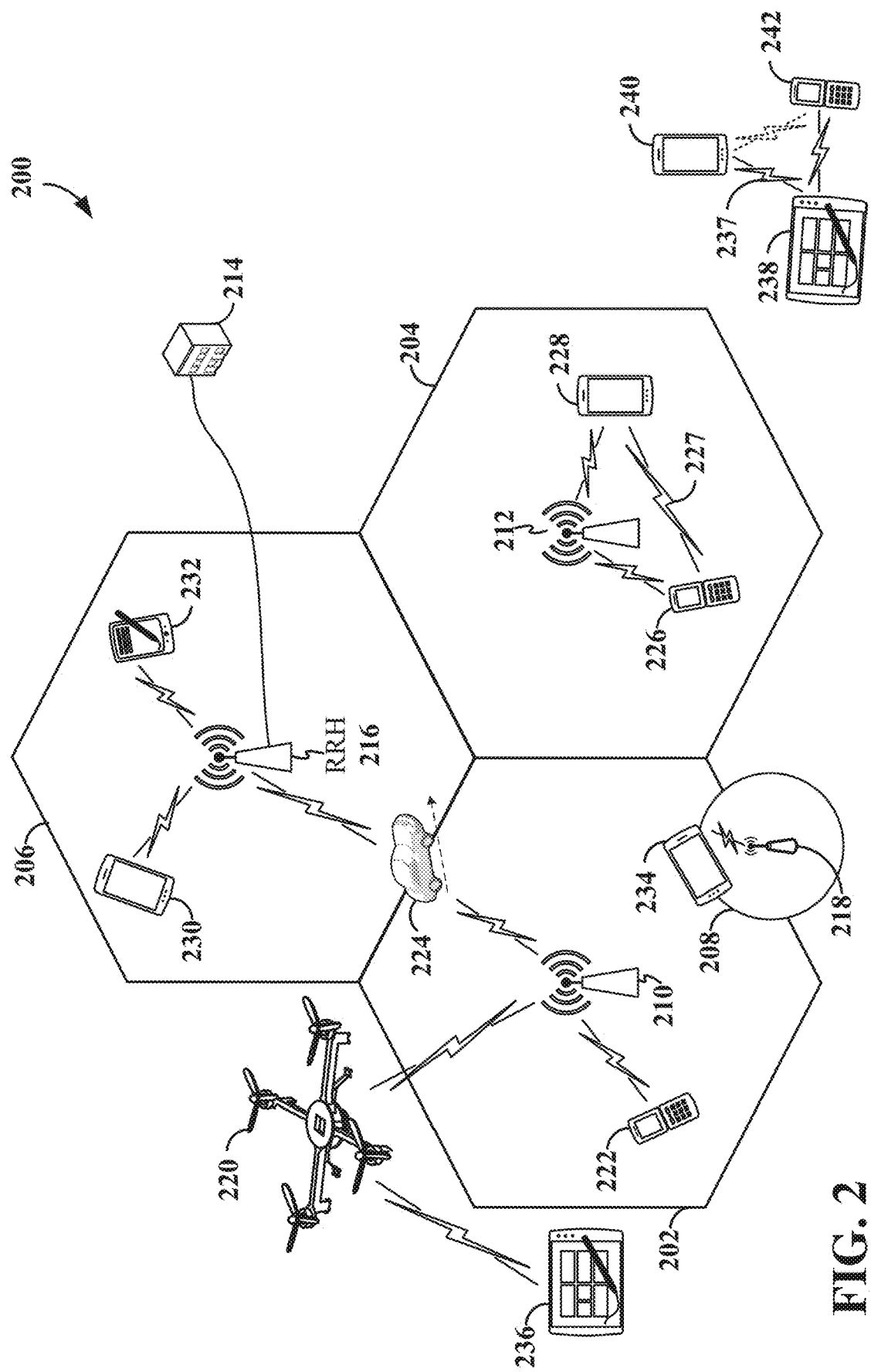
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Figure 3:
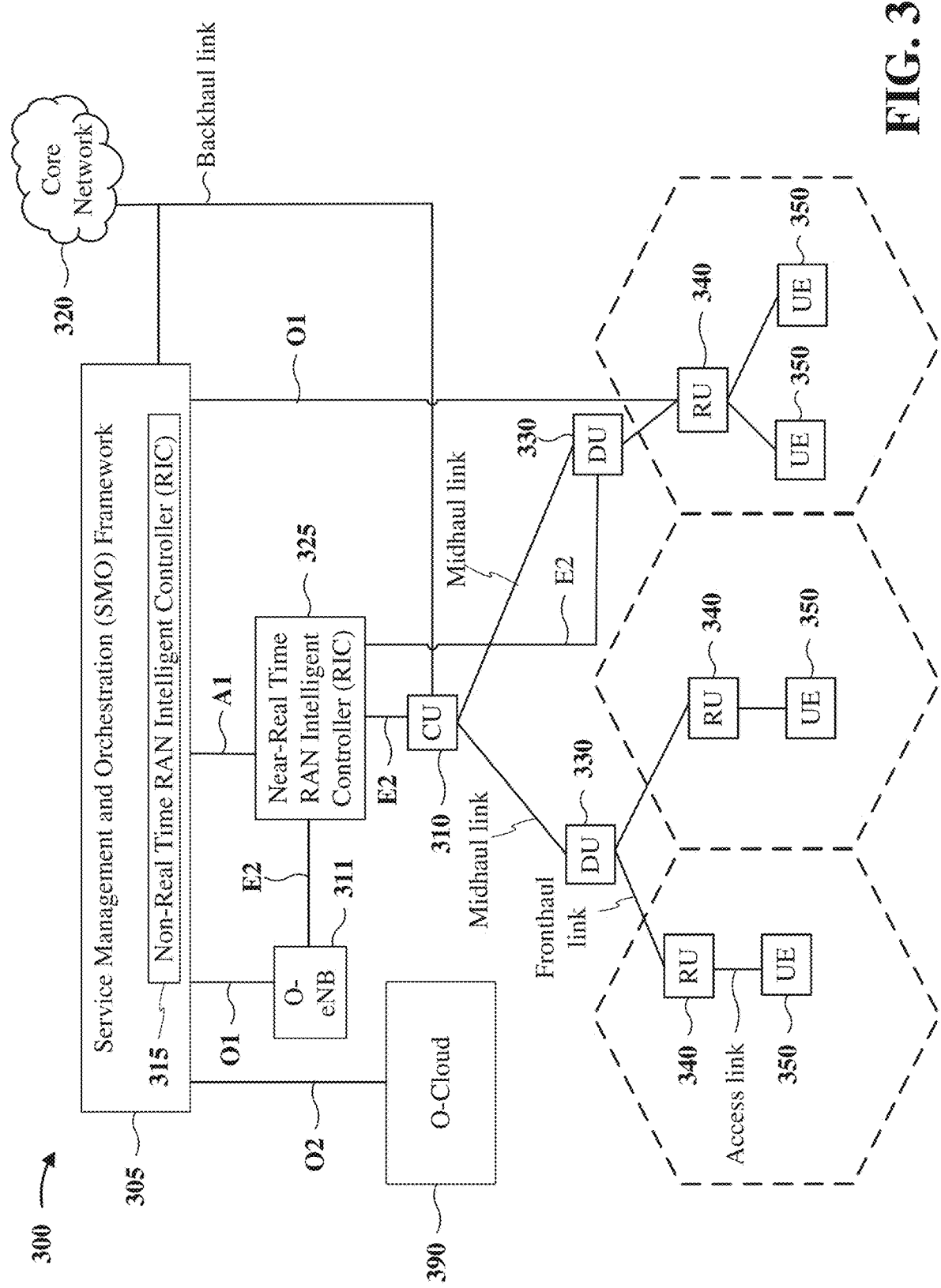
FIG. 3 is a diagram providing a high-level illustration of one example of a configuration of a disaggregated base station according to some aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 350 via one or more radio frequency (RF) access links. In some implementations, the UE 350 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium.

Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit—User Plane (CU-UP)), control plane functionality (i.e., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the distributed unit (DU) 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 350. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
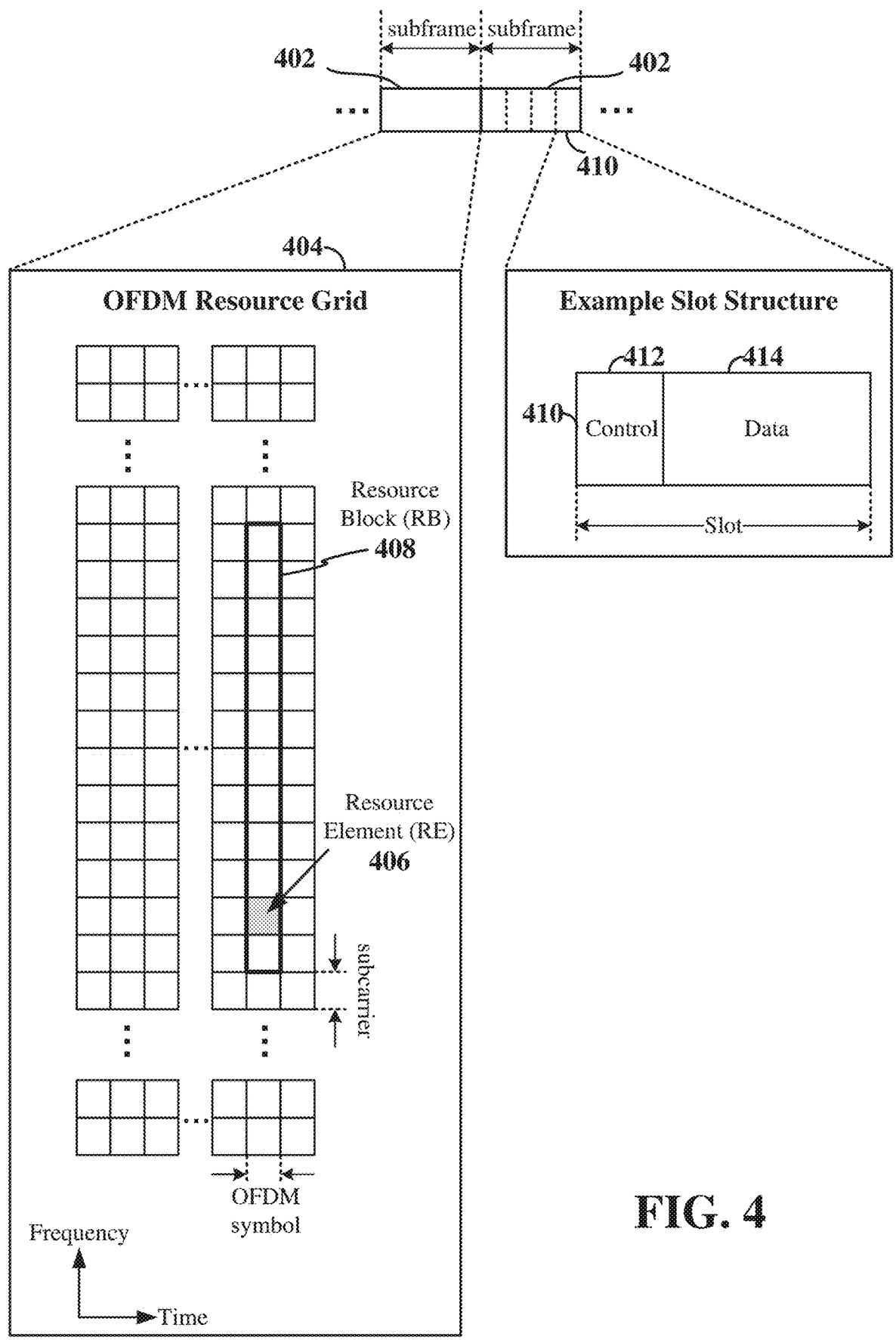
FIG. 4 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 4, an expanded view of an example subframe 402 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port.

In some examples, an antenna port is a logical entity used to map data streams to one or more antennas. Each antenna port may be associated with a reference signal (e.g., which may allow a receiver to distinguish data streams associated with the different antenna ports in a received transmission). An antenna port may be defined such that the channel over which a symbol on the antenna port is conveyed can be inferred from the channel over which another symbol on the same antenna port is conveyed. Thus, a given antenna port may represent a specific channel model associated with a particular reference signal. In some examples, a given antenna port and sub-carrier spacing (SCS) may be associated with a corresponding resource grid (including REs as discussed above). Here, modulated data symbols from multiple-input-multiple-output (MIMO) layers may be combined and re-distributed to each of the antenna ports, then precoding is applied, and the precoded data symbols are applied to corresponding REs for OFDM signal generation and transmission via one or more physical antenna elements. In some examples, the mapping of an antenna port to a physical antenna may be based on beamforming (e.g., a signal may be transmitted on certain antenna ports to form a desired beam). Thus, a given antenna port may correspond to a particular set of beamforming parameters (e.g., signal phases and/or amplitudes).

In a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely an example, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy. e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the UE may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-4 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 5:
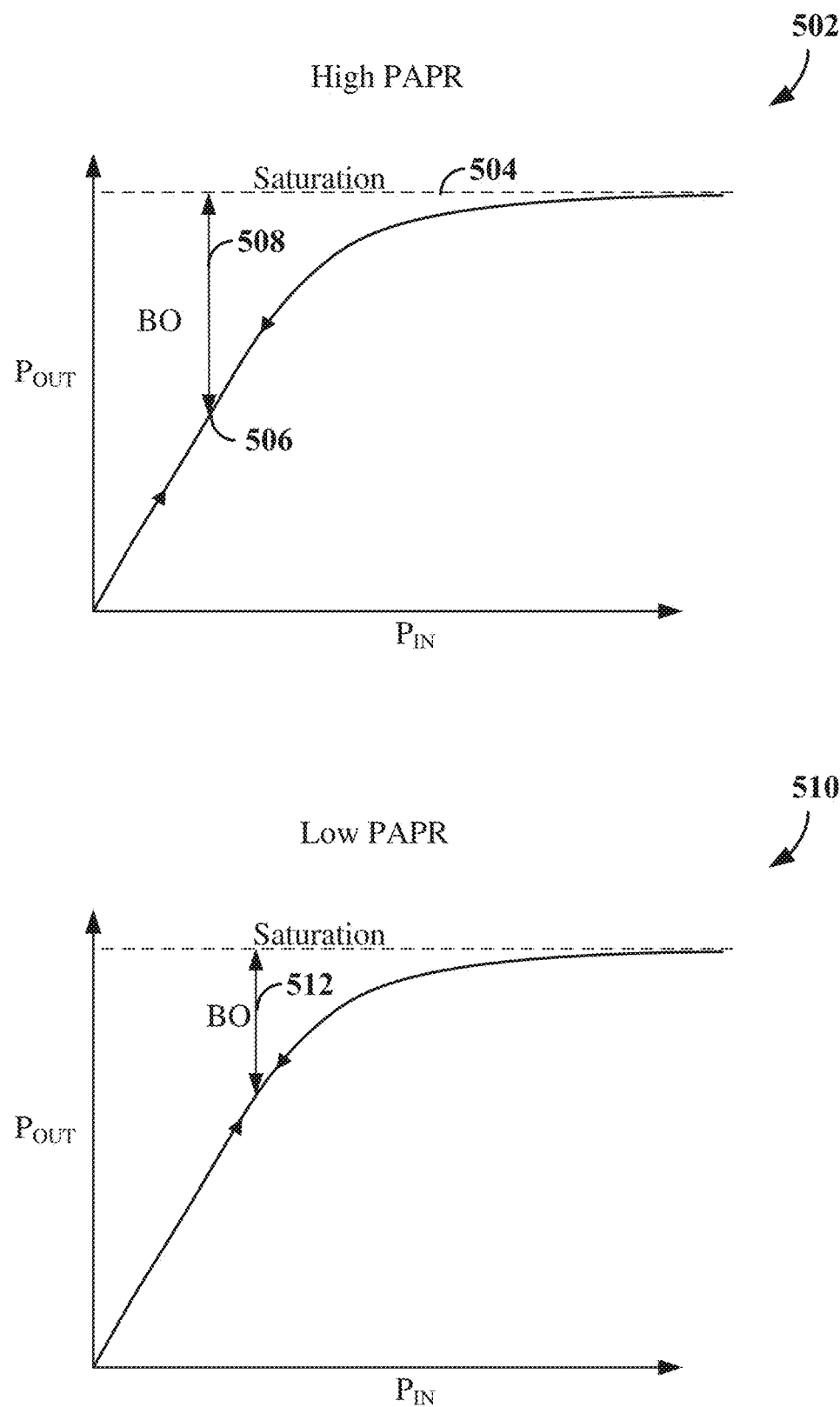
FIG. 5 is a conceptual illustration of an example of non-linearity of a power amplifier and different backoffs according to some aspects.

Power amplifiers such as those used in wireless communication devices (e.g., UEs and base stations) typically exhibit non-linear behavior at higher levels of input power. The graph 502 of FIG. 5 illustrates an example of a power out ($P_{OUT}$) to power in ($P_{IN}$) characteristic of a power amplifier. Here, it may be seen that the amplification by the power amplifier is linear at lower levels of $P_{IN}$. As $P_{IN}$ increases, however, the amplification becomes non-linear, and the power amplifier ultimately reaches a saturation level 504 corresponding to a maximum output power.

This amplifier-induced non-linearity may result in in-band and out-of-band distortion of the amplified signal, and a degraded (i.e., larger) error vector magnitude (EVM). Typically, EVM is a measure of the transmitter quality, that is, the distance of the transmitted constellation points to the ideal. Since each constellation point represents a different phase and amplitude combination, to ensure low EVM at a transmitter, the power amplifier of the transmitter should have a sufficiently large operating range to represent the range of amplitudes in a signal to be transmitted.

To avoid non-linearity, the power amplifier may be operated at a working point 506 that is several decibels (dBs) lower than the saturation level as represented, for example, by the backoff (BO) 508. An appropriate power level may be determined by selecting an input power that maintains the signal below a certain level. For example, a BO 508 can be chosen to be proportional to the peak-to-average power ratio (PAPR). As another example, if a signal has a PAPR of x dB, a BO 508 of x dB may be used to avoid the non-linearity region even at the peak of the input signal. In practice, various tradeoffs may be made in selecting a desired operating point for a power amplifier.

The use of orthogonal frequency division multiplexing (OFDM) as discussed above may enable more efficient channel estimation at the receiver and provide greater flexibly in utilizing the available time and frequency resources. However, the use of OFDM may result in a higher PAPR compared to single carrier techniques.

In addition, some applications may use a relatively high order modulation scheme such as 256 quadrature amplitude modulation (QAM), 1024 QAM or even 16K QAM for signal transmission. However, the use of a higher order modulation scheme (e.g., in a single carrier scheme) may result in higher PAPR compared to the PAPR seen when using a lower order modulation.

To maximize a power amplifier's power efficiency: $\mu=P_{OUT}/P_{IN}$, the working point for the power amplifier may be made as close as possible to the non-linear part of the $P_{OUT}$ to $P_{IN}$ curve. In scenarios where the PAPR is relatively high (e.g., OFDM scenarios), a relatively large backoff (e.g., as in the graph 502) may be used to ensure that the EVM required for higher order modulation schemes is met. However, a large backoff results in an inefficient use of the power amplifier since the highest output power achieved may be lower than the power level the power amplifier is capable of providing in its linear range. Thus, less power may be transmitted to the channel as compared to a scenario that uses a lower backoff. Reducing the PAPR will enable the use of a smaller BO and enable a working point with higher power efficiency, without compromising EVM.

The graph 510 of FIG. 5 illustrates an example where a smaller BO 512 is used (e.g., in a low PAPR scenario). This results in a more efficient use of the power amplifier, since the highest output power achieved is closer to the power output that the power amplifier is capable of providing, while still operating in the power amplifier's linear operating range.

To address these competing issues, a signal to be transmitted may be subjected to crest factor reduction (e.g., clipping and filtering), thereby reducing the PAPR, while still using an operating point with a desired level of power efficiency. However, crest factor reduction may introduce non-linear distortion into the signal which may make it more difficult for a receiving device to successfully decode the received signal.

In view of the above, in high PAPR scenarios, a power amplifier (e.g., a high power amplifier) that has limited linear dynamic range may generate nonlinear (NL) components and thus distort the transmitted signal. This nonlinear distortion may be classified as in-band distortion such as an EVM and/or out-of-band (OOB) emission such as an adjacent channel leakage ratio (ACLR). ACLR may be defined as the ratio of the amount of the transmitted power that leaks into an adjacent channel or adjacent channels over the amount of the transmitted power in a user's allocated channel (e.g., adjacent channel power÷main channel power). In some examples, an ACLR limit may be specified (e.g., by the network) to prevent a transmitting device from unduly interfering with channels used by other wireless communication devices.

Some transmit/receive architectures may use a digital pre-distorter or digital post-distorter to keep the amount of distortion in a signal at a target level. Here, the power amplifier at the transmitting device is allowed to operate within its nonlinear region. In addition, the transmit power BO is kept as low as possible, thereby enabling a power amplifier working point with a relatively high power efficiency. Advantageously, a larger power gain may be achieved without compromising EVM when using digital pre-distortion (DPD), discussed below.

Digital pre-distortion (DPD) involves pre-distorting the signal input to the power amplifier (PA) such that the overall response of the DPD and PA is linearized. For example, the DPD may impart onto the signal a frequency response that is the inverse of the frequency response of the power amplifier. DPD may help reduce in-band distortion (e.g., EVM) and out-of-band emissions (e.g., ACLR) at least to some degree since DPD can be used to control the amount of distortion that is present in a transmitted signal (e.g., where the characteristics of the DPD may be tuned based on feedback from a receiving device). The above description of DPD is only one example of DPD. DPD could be implemented in other ways in other DPD implementations.

Figure 6:
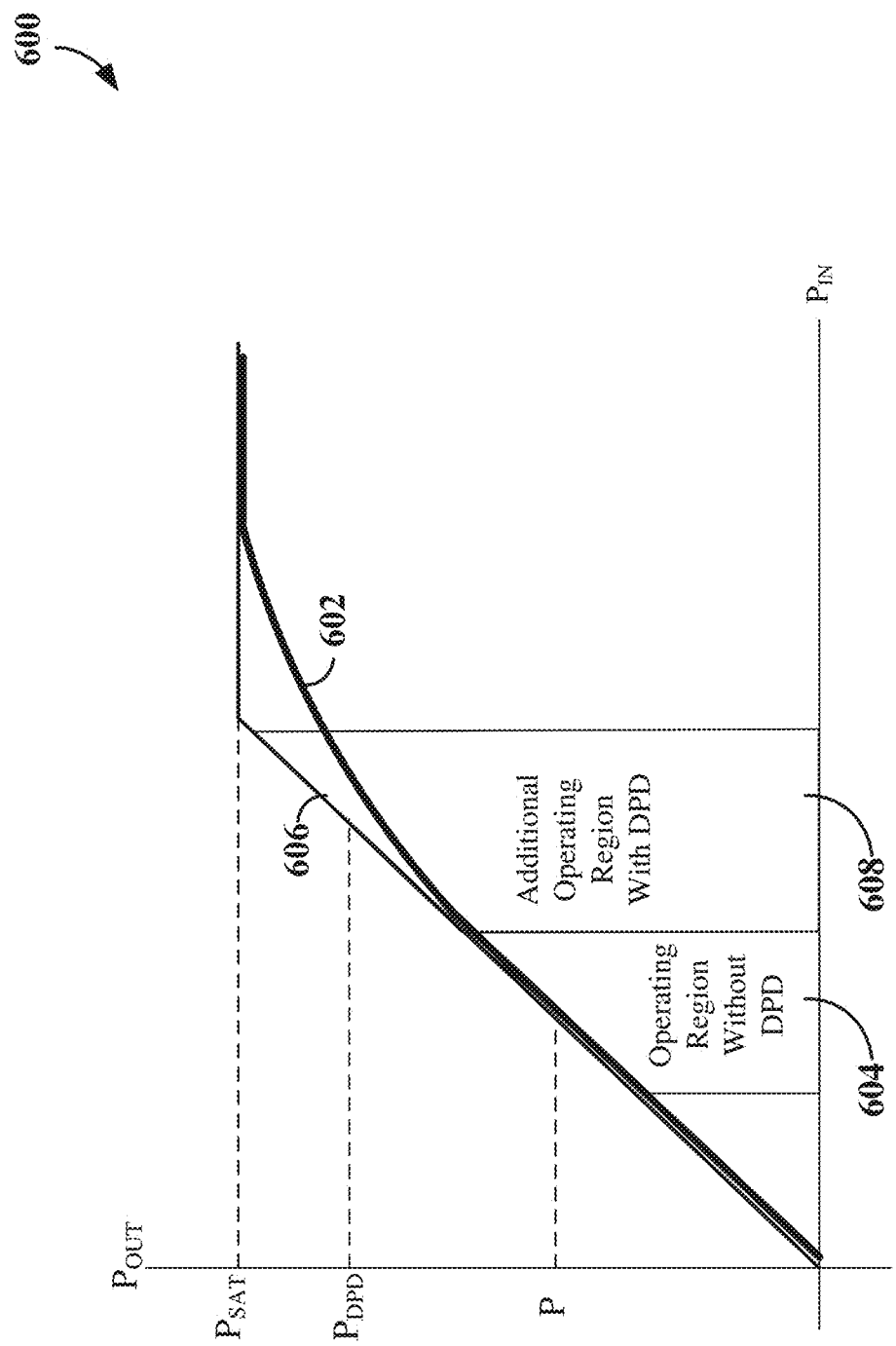
FIG. 6 is a conceptual illustration of an example use of digital pre-distortion (DPD) according to some aspects.

The graph 600 of FIG. 6 illustrates an example of a power out ($P_{OUT}$) to power in ($P_{IN}$) characteristic of a power amplifier similar to FIG. 5. As in FIG. 5, the power amplifier response 602 is linear at a lower levels of $P_{IN}$, then becomes non-linear as $P_{IN}$ increases, ultimately reaching a saturation level ($P_{SAT}$) corresponding to a maximum output power. Using a conventional power BO scheme, the operating point for the power amplifier may be set at point P, which corresponds to a power amplifier operating region represented by a region 604. If DPD is used, however, the power amplifier response 606 may be substantially linear up to the saturation level ($P_{SAT}$). In this case, the operating point for the power amplifier may be at point Pop, which corresponds to a wider power amplifier operating region represented by both region 604 and region 608.

Digital post distortion (DPoD) may be used at a receiving device to remove non-linearity components in a received signal. Thus, DPoD may be characterized as a post-PA equalizer. In contrast with DPD, DPoD does not involve feedback. In some examples, the use of DPoD may enable a PA to operate in a non-linear range (e.g., with a lower backoff). Since the backoff may be reduced, higher power efficiency may be achieved without compromising EVM post DPoD. As used herein. EVM post DPoD (or post DPoD EVM) refers in some aspect to the compensation of EVM distortions in the receiver. In this case, the DPoD processing may handle not only the transmitter EVM but also noise that was added to the signal. In some aspects, DPoD may provide better EVM performance than DPD. However, DPoD does not mitigate out-of-band emissions since DPoD is performed at a receiving device. As such, the benefits of DPoD may therefore be limited by the allowed out-of-band emissions.

Figure 7:
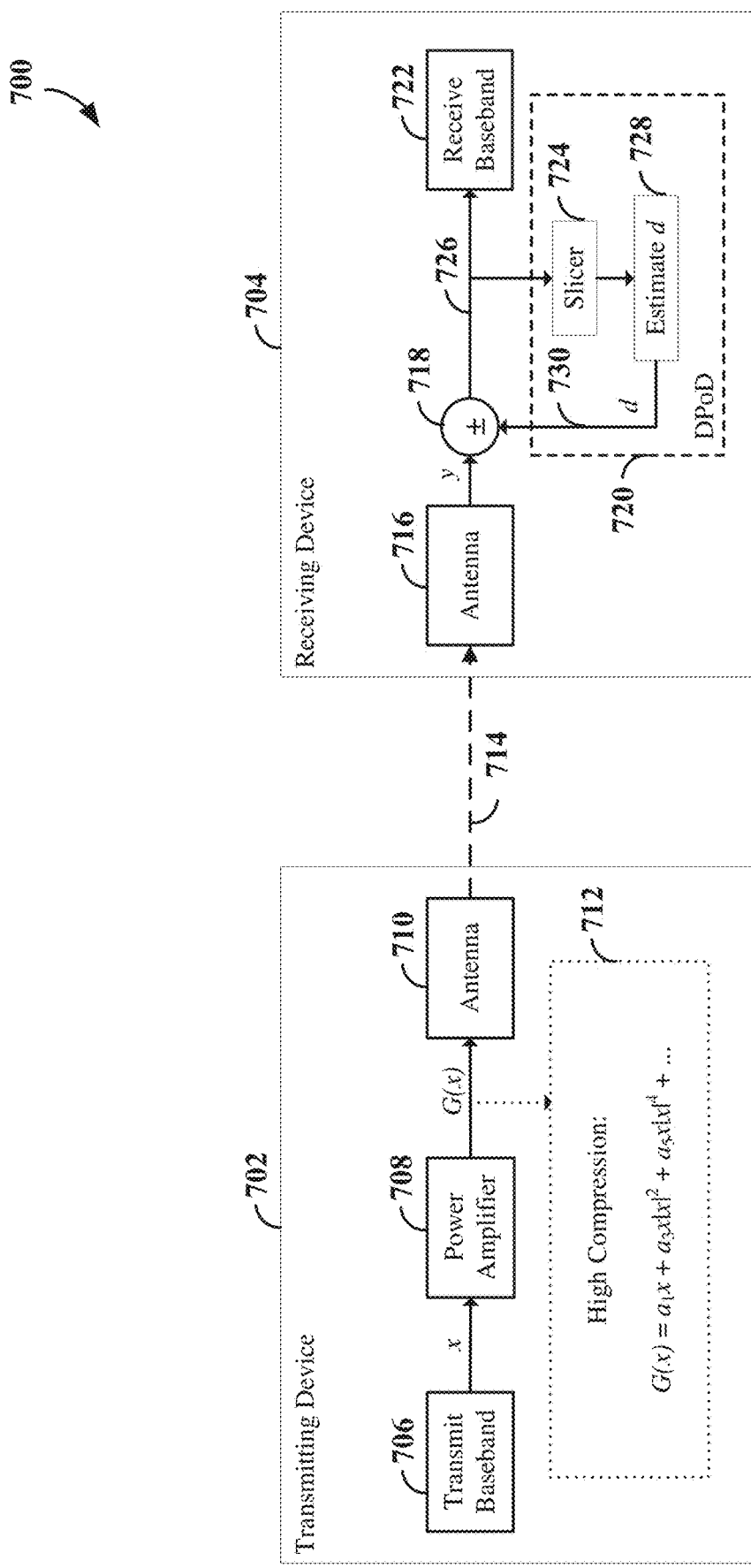
FIG. 7 is a conceptual illustration of an example of a wireless communication system where digital post-distortion (DPoD) is applied to a non-linearly distorted signal according to some aspects.

FIG. 7 illustrates an example of a wireless communication system 700 including a transmitting device 702 and a receiving device 704, where the receiving device 704 employs DPoD. Here, the DPoD employed at the receiving device 704 may be used to remove non-linearity components in a received signal.

FIG. 7 illustrates several components of a transmit chain of the transmitting device 702. The transmit chain includes a transmit baseband component 706, a power amplifier 708, and at least one antenna 710 for transmitting a signal 714 to the receiving device 704.

In some examples, the power amplifier 708 may exhibit relatively high gain compression (e.g., at higher levels of amplification, the gain may effectively decrease as the input power increases). This gain compression (and/or other characteristics of the transmit chain) may impart non-linearity on an amplified signal. In some examples, the output of the power amplifier 708 may be characterized by the function G(x) as represented by block 712 of FIG. 7.

In G(x) of block 712, the second, third, and subsequent components represent non-linear distortion components of the amplified signal. In some examples, the function G(x) may be characterized by a set of kernels and associated coefficients.

FIG. 7 also illustrates several components of a receive chain of the receiving device 704. The receive chain includes at least one antenna 716, a summer (or subtractor) 718, a DPoD component 720 (e.g., a digital post-distorter), and a receive baseband component 722. In some examples, the DPoD component 720 includes a slicer 724 that slices an input signal 726 and an estimator 728 that generates an estimate of the non-linear distortion d 730 present in a received signal y. In some examples, the DPoD component 720 together with the summer 718 perform an iterative process whereby the estimate of the non-linear distortion d 730 is subtracted from the received signal y, thereby removing non-linear signal components from the received signal y. The DPoD component 720 shown in FIG. 7 (including the slicer 724 and the estimator 728) is only one example of a DPoD structure. Other DPoD structures could be used in other DPoD implementations. For example, a DPoD structure could be any type of a module that provides a post PA equalization function, which could be implemented in a variety of ways.

As discussed above, operating a PA in a non-linear region may improve the PA's power efficiency and the received signal power which thereby increases the signal-to-noise ratio (SNR). However, reducing the backoff results in instantaneous high input power peaks, especially for high PAPR waveforms (such as OFDM), which may adversely affect PA reliability and lifetime.

To limit peak power at the PA input and avoid impacting the PA reliability and lifetime, a crest factor reduction (CFR) block may be used at the PA input. Thus, a transmitting device may add CFR to the input signal to the PA to keep the instantaneous peak power at a permissible level in terms of PA reliability.

Figure 8:
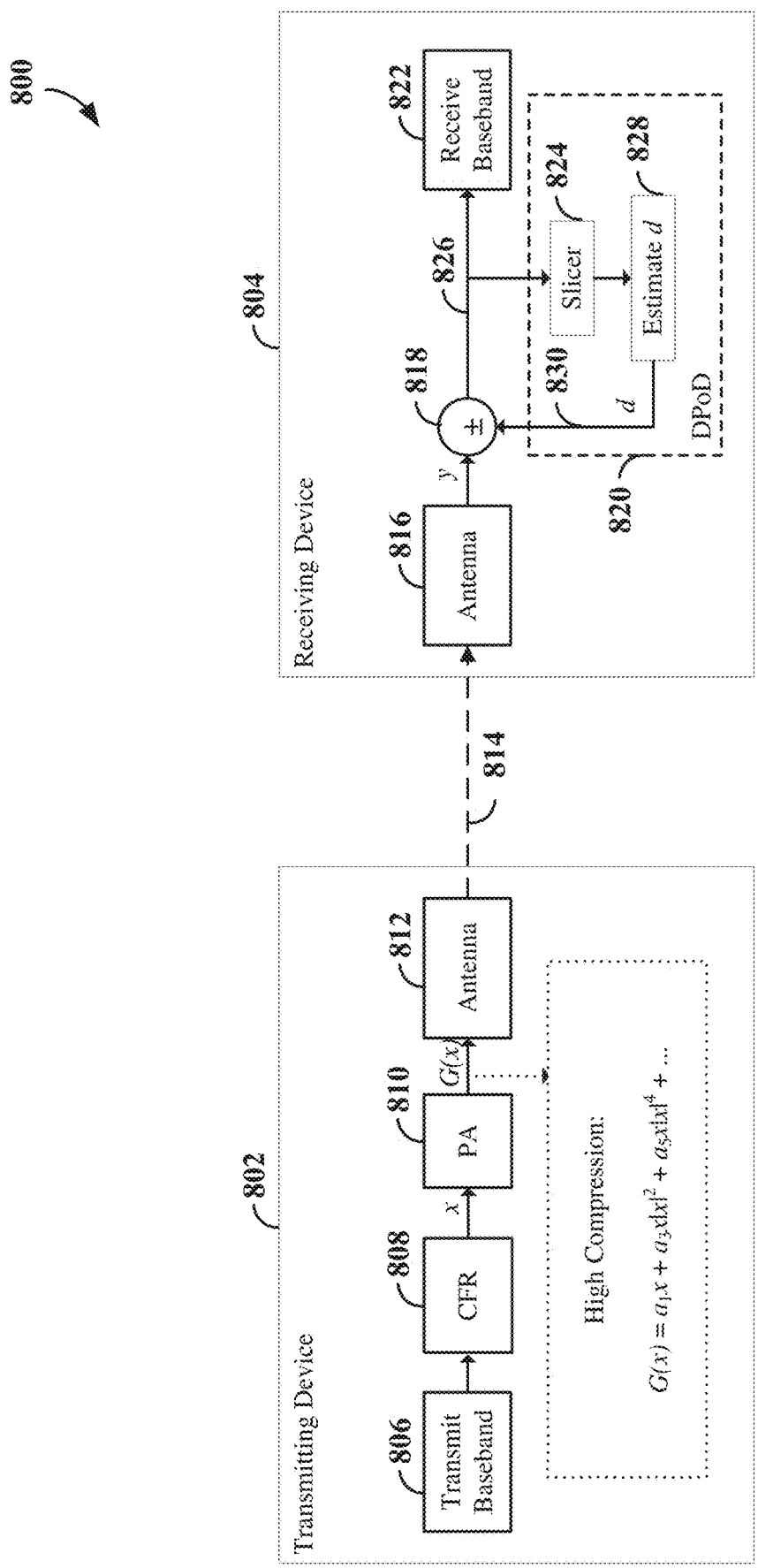
FIG. 8 is a conceptual illustration of another example of a wireless communication system where digital post-distortion (DPoD) is applied to a non-linearly distorted signal according to some aspects.

FIG. 8 illustrates an example of a wireless communication system 800 including a transmitting device 802 and a receiving device 804, where the transmitting device 802 employs CFR. As in the example of FIG. 7, DPoD is employed at the receiving device 804 to remove non-linearity components in a received signal.

FIG. 8 illustrates several components of a transmit chain of the transmitting device 802. The transmit chain includes a transmit baseband component 806, a crest factor reduction (CFR) component 808 (e.g., a crest factor reducer), a power amplifier 810, and at least one antenna 812 for transmitting a signal 814 to the receiving device 804. The CFR component 808 may apply clipping and filtering in some examples.

FIG. 8 also illustrates several components of a receive chain of the receiving device 804. The receive chain includes at least one antenna 816, a summer (or subtractor) 818, a DPoD component 820 (e.g., a digital post-distorter), and a receive baseband component 822. Similar to the DPoD component 720 of FIG. 7, the DPoD component 820 may include a slicer 824 that slices an input signal 826 and an estimator 828 that generates an estimate of the non-linear distortion d 830 present in a received signal y. In some examples, the DPoD component 820 together with the summer 818 perform an iterative process whereby the estimate of the non-linear distortion d 830 is subtracted from the received signal y, thereby removing non-linear signal components from the received signal y.

The disclosure relates in some aspects to using both DPD and DPoD to reduce in-band distortion and out-of-band emissions. At a transmitting device. DPD is used to reduce out-of-band emissions (e.g., ACLR). For example, the DPD functionality may be tuned to emphasize reduction of the out-of-band emissions (as opposed to the in-band distortion). For example, different weighting may be applied to different frequency bands (e.g., more weighting may be applied to the out-of-band region) to tune the DPD functionality in a desired manner. At the receiving device, DPoD is used to reduce the in-band distortion (e.g., EVM). In some aspects, the use of DPD may enable the use of relatively high transmit power levels (e.g., at or near saturation), while the use of DPoD may allow in-band distortion requirements to be met, without violating out-of-band emission requirements (due to the use of DPD).

Figure 9:
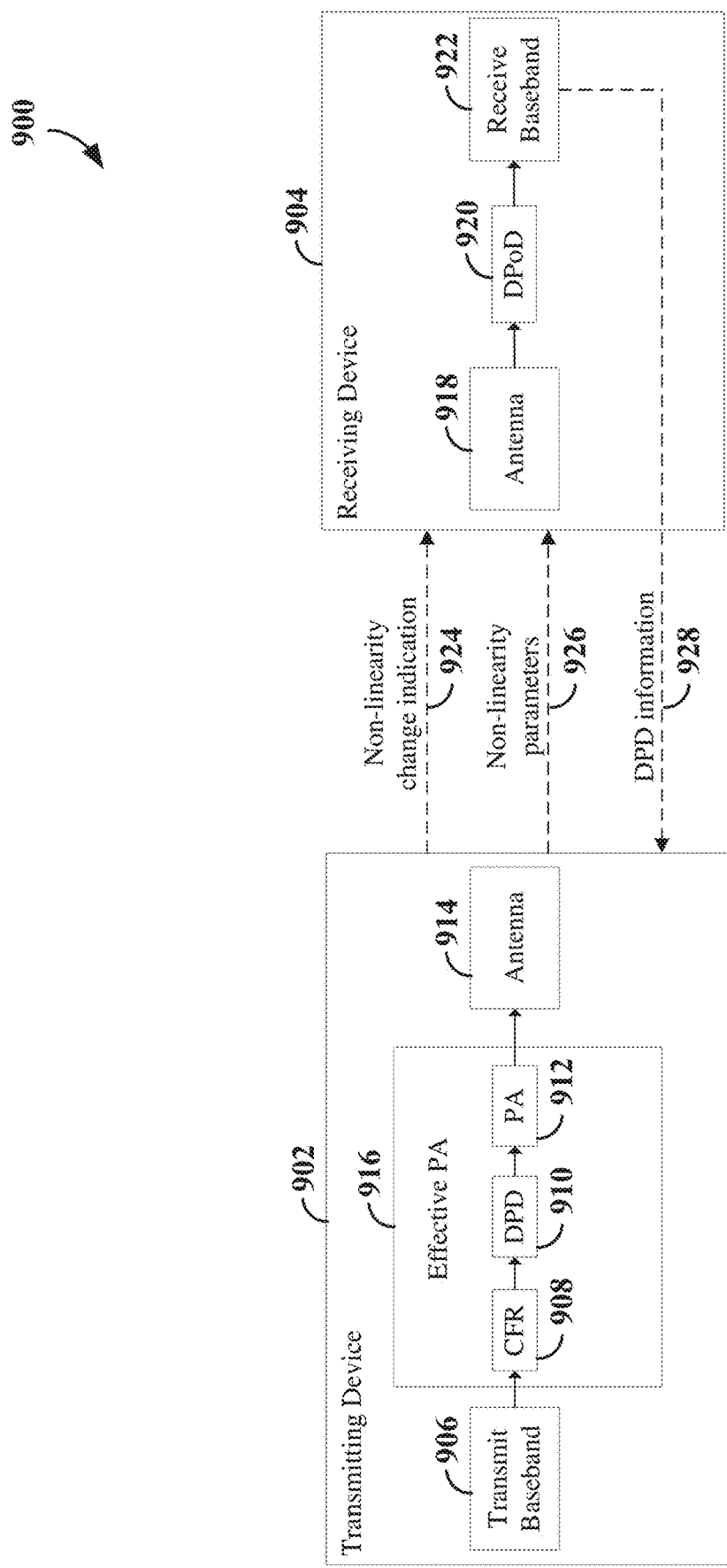
FIG. 9 is a conceptual illustration of an example of wireless communication devices signaling non-linearity information according to some aspects.

The disclosure relates in some aspects to different types of signaling that may be used in conjunction with the joint use of DPD and DPoD. FIG. 9 illustrates an example of a wireless communication system 900 where a transmitting device 902 and a receiving device 904 exchange signaling relating to the joint use of DPD and DPoD. Here, inverse power amplifier pre-equalization (e.g., DPD) employed at the transmitting device 902 is focused on (e.g., tuned for) ACLR reduction. In addition, post amplifier equalization (e.g., DPoD) employed at the receiving device 904 is used to reduce the in-band distortion.

FIG. 9 illustrates several components of a transmit chain of the transmitting device 902. The transmit chain includes a transmit baseband component 906, a crest factor reduction (CFR) component 908 (e.g., a crest factor reducer), a DPD component 910 (e.g., aa digital pre-distorter), a power amplifier 912, and at least one antenna 914. As mentioned above, the CFR component 908 may apply clipping and filtering in some examples.

In some examples, the power amplifier 912 may exhibit relatively high gain compression (e.g., at higher levels of amplification, the gain may effectively decrease as the input power increases). This gain compression (and/or other characteristics of the transmit chain) may impart non-linearity on an amplified signal. In some examples, the output of the power amplifier 912 may be characterized as set forth in Equation 1.

$$y = G(x) = x + c_1 x |x|^2 + c_2 x |x|^4 \qquad \text{EQUATION 1}$$

In Equation 1, the second, third, and subsequent components represent non-linear distortion components of the amplified signal. In some examples, the function G(x) may be characterized by a set of kernels and associated coefficients.

In some examples, the DPD component (e.g., a set of kernels) may be characterized as set forth in Equation 2 based on specified combinations of the input signal x. As mentioned above, in some aspects. Equation 2 may be formulated to provide an inverse response relative to the response of the power amplifier 912.

$$\hat{y}[n] = \sum_{k=0}^{2} \sum_{q=0}^{Q-1} w_{k,q}^1 \cdot x[n-q]|x[n-q]|^k + \qquad \text{EQUATION 2}$$

$$\sum_{k=1}^{2} \sum_{q=1}^{Q-1} w_{k,q}^2 \cdot |x[n]|^k x[n-q] + \sum_{q=1}^{Q-1} w_q^3 \cdot x[n]^2 x^*[n-q]$$

Equation 1 is only one example of a PA model. In a typical example, a PA model may be more complex (e.g., a PA model may include memory terms, unlike Equation 1). In some examples, a more general PA model has a form similar to Equation 2. In some examples, an equation with the form of Equation 2 may be used to describe both the PA model and the DPD model, where the different models will have different coefficients values. Some of the kernels might not appear in the PA model or DPD model. This might be reflected in the fact that their corresponding coefficients in this case are set to zero. Moreover, Equation 2 is only one example of a kernel model. For example, a typical model may have more kernels than the example of Equation 2.

In some examples, the CFR component 908, the DPD component 910, and the power amplifier 912 (e.g., the combined response of these components) may be referred to as the effective power amplifier 916 (e.g., the effective non-linearity model). The components of the effective power amplifier 916 may be collectively referred to herein as power amplifier circuitry. In addition, the function G(x) of Equation 1, etc., may be referred to as the non-linearity model of the effective power amplifier (e.g., the non-linearity model of the power amplifier circuitry).

FIG. 9 also illustrates several components of a receive chain of the receiving device 904. The receive chain includes at least one antenna 918, a DPoD component 920 (e.g., digital post-distorter), and a receive baseband component 922. In some examples, a DPoD process provided by the DPoD component 920 is based on a non-linearity model of the effective power amplifier 916. For example, the DPoD process may be based on the parameter G(x) of Equation 1, etc. Accordingly, the receiving device 904 may maintain a local copy of the non-linearity model (e.g., an estimate of the effective power amplifier model) for use by the DPoD component 920.

The DPoD process (e.g., Bussgang process as discussed below or some other DPoD process) may be applied whenever the receiving device 904 receives a data signal that includes a non-linear distortion component d (e.g., the PA output might be decomposed based on a Bussgang decomposition to y(x)=alpha*x+d, or more generally to y(x)=f(x)+d, where f is an arbitrary function chosen either to optimize the Bussgang iterations, reduce complexity, or combination of both). In some examples, the DPoD process iteratively removes an estimate of the non-linear distortion component d to restore the original data signal x by using a correction step, a slicing step, and a non-linear distortion estimation step as discussed below. In this process, knowledge of the non-linearity model G(x) is used to estimate the non-linear distortion term d.

This non-linearity model may change over time. For example, one or more attributes (e.g., temperature, etc.) associated with the power amplifier 912 may change over time. A change in such an attribute may affect the power amplifier state, thereby resulting in a change in the non-linearity imparted on a signal by the power amplifier 912.

As another example, the transmitting device 902 may elect to change the configuration of the CFR component 908 and/or the DPD component 910. A change in such a configuration may result in an instantaneous change in the non-linearity imparted on a signal by the CFR component 908 and/or the DPD component 910. In some examples, the transmitting device 902 may elect to change the configuration of the CFR component 908 and/or the DPD component 910 as a result of a change in an in-band distortion parameter (e.g., an EVM limit), a change in an out-of-band emission parameter (e.g., an ACLR limit), a change in a maximum power reduction parameter, a change in a modulation to be used when transmitting a signal via the power amplifier circuit, some other factor, or a combination of these factors. In some examples, one or more of the above changes may occur as a result of scheduling of the transmitting device 902. For example, if a base station (e.g., which may be the transmitting device 902) allocates new users that are relatively close to the transmitting device 902, the ACLR requirements may become stricter. This, in turn, may cause the transmitting device 902 to change the DPD/CFR mode to meet the new ACLR requirement.

The disclosure relates in some aspects to the transmitting device 902 transmitting a non-linearity change indication 924 to the receiving device 904 whenever there is a change (e.g., a change of a certain degree) in the non-linearity model. In some examples, the transmitting device 902 transmits the indication 924 whenever the transmitting device 902 detects a change in a condition (e.g., a change that affects an operating state of the power amplifier 912) that results in a change in the non-linearity model. In some examples, the transmitting device 902 transmits the indication 924 whenever the transmitting device 902 modifies a parameter (e.g., a configuration of the CFR component 908 and/or the DPD component 910) that results in a change in the non-linearity model.

The manner in which the non-linearity model changes (and, hence, the manner in which the receiving device 904 learns of the change) may depend on what led to the change. For example, when the transmitting device 902 changes the DPD configuration, a relatively abrupt change (e.g., a large and fast change) may occur in the non-linearity model. Thus, for a DPD change, the receiving device 904 may need to immediately receive an indication of the change to enable the receiving device 904 to quickly compute the new non-linearity model. In contrast, temperature variations of the power amplifier 912 may lead to relatively slow changes in the non-linearity model. These slow changes could be tracked and handled by a periodic re-computation of the non-linearity model in the receiving device 904 in some examples (e.g., the indication 924 might not be used to indicate a slow change to the non-linearity model in some examples).

Upon receiving the indication 924, the receiving device 904 may update its locally stored non-linearity model. For example, the receiving device 904 may update its estimate of the effective power amplifier model that is used by the DPoD component 920 to apply DPoD to a received signal.

In some examples, the receiving device 904 may autonomously re-estimate the non-linearity model (e.g., new DPoD functionality) as a result of receiving the indication 924. For example, the receiving device 904 may determine the new non-linearity model by selecting a new set of kernels based on dedicated pilots received from the transmitting device 902. After choosing the new set of kernels, the receiving device 904 uses the kernels to compute new coefficients. The new set of kernels and coefficients constructs the new G(x) that will subsequently be used for the DPoD process.

A more detailed example of the estimation of the non-linearity model G(x) follows. The receiving device 904 will have a list of kernels that correspond to the current non-linearity model (e.g., the transmitting device 902 may have sent the initial list to the receiving device 904). The receiving device then estimates the coefficients of the kernels in each signal reception based on received dedicated pilots (using the given set of kernels, the receiving device may apply a least-squares estimation). The resulting new set of kernels and coefficients provides the updated G(x) that the DPoD component 920 will use in the non-linearity distortion estimation phase.

In some examples, the receiving device 904 may send a request for non-linearity information to the transmitting device 902 to aid the receiving device 904 in its computation of the new non-linearity model. In response to the request, the transmitting device 902 may transmit non-linearity parameters 926 to the receiving device 904. For example, the transmitting device 902 may send the new set of non-linearity kernels for the non-linearity model. As another example, the transmitting device 902 may send the complete non-linearity model (the effective PA model). For example, the transmitting device may send the kernels and the coefficients of the new non-linearity model.

The transmitting device 902 may transmit the non-linearity parameters 926 in different ways in different examples. In some examples, the transmitting device 902 may transmit the non-linearity parameters 926 whenever there is a change (e.g., a change of a certain degree) in the non-linearity model. In some examples, the transmitting device 902 may transmit the indication 924 and the non-linearity parameters 926 in separate transmissions. In some examples, the transmitting device 902 may transmit the indication 924 and the non-linearity parameters 926 in the same transmission (e.g., in a single message). In some examples, the transmission of the non-linearity parameters 926 may serve as an indication that there is a change (e.g., a change of a certain degree) in the non-linearity model (e.g., the indication 924 might not be sent in this case).

The disclosure relates in some aspect to the receiving device 904 assisting the transmitting device 902 in calculating DPD information for the DPD component 910. For example, the receiving device 904 may calculate DPD information 928 (e.g., DPD coefficients, such as a of Equation 4 below) when the non-linearity model is changed and transmit the DPD information 928 to the transmitting device 902. The DPD component 910 may then use the DPD information 928 for DPD of a signal provided to the power amplifier 912. The calculation of the DPD might be complete or partial in different implementations. In the case of a partial calculation, the rest of the calculation is completed in the transmitting device.

In some examples (e.g., where the receiving device 904 indicates it can calculate DPD information), the transmitting device 902 sends a request to the receiving device to jointly compute DPD information and DPoD information and send the DPD information to the transmitting device 902. In some aspects, this joint calculation may enable optimization of the balance between in-band compensation and out-of-band compensation for the DPD component 910 (e.g., since a single device may select the weighting for different bands and/or band windowing to achieve an optimum result).

The transmitting device 902 may send one or more constraints to the receiving device 904 for the DPD computation. For example, such a constraint may be an ACLR requirement that defines an upper limit that should not be exceeded. The transmitting device 902 may send weights to the receiving device 904 for DPD computation optimization. For example, different weights may be defined for different frequency bands (e.g., to give a higher weight to out-of-band frequencies and a lower weight to in-band frequencies).

Figure 10:
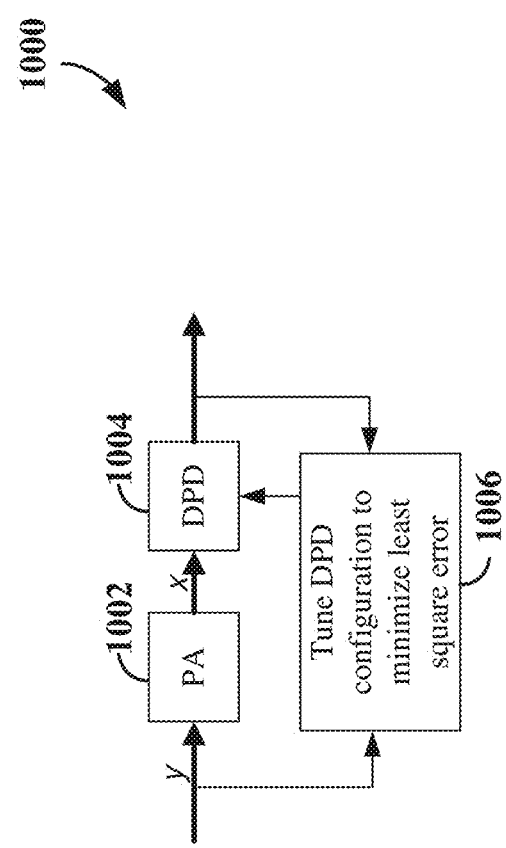
FIG. 10 is a conceptual illustration of an example of tuning a DPD configuration according to some aspects.

In some examples, the DPD component 910 may be tuned to mitigate out-of-band emissions. FIG. 10 illustrates a high-level example of a DPD training circuit 1000. Here, a power amplifier 1002 (e.g., the power amplifier 912 of FIG. 9) amplifies a signal y to provide a signal x. A DPD component 1004 (e.g., the DPD component 910 of FIG. 9) generates an output signal that is provided to a training component 1006 that tunes the DPD configuration to minimize a least squared error (LSE). In the example of FIG. 10, the DPD component 1004 is depicted as following the power amplifier 1002 (which is the reverse of the order of these components in FIG. 9) to show the (typical) computational procedure of the DPD. The model for the power amplifier 1002 may take the form $y \approx X\alpha$, where y is the PA input, x is the PA output, and X is a kernel matrix of x as set forth, for example, in Equation 3. The kernel matrix (e.g., including non-linear kernels) may be selected based on the characteristics of the power amplifier 1002 (e.g., using known kernel matrix techniques).

$X=[f_0(x) f_1(x) \ldots ]$ is a kernel matrix of $x$      EQUATION 3

$f_i(x)$ is the $i_{th}$ NL kernel applied to x

The training component 1006 may train (e.g., tune) the DPD by solving a least squares (LS) problem as set forth, for example, in Equation, 4.

$\alpha = \text{argmin} \|y-X\alpha\|^2 = (X^H X)^{-1} X^H y$      EQUATION 4

Thus, the goal is to calculate the coefficients $\alpha$ such that the combination of the power amplifier 1002 and the DPD component 1004 is linear. In other words, multiplying the output of the PA x by $\alpha$ a should result in the PA input y.

In some examples, the training may be based on weighting applied under certain conditions. For example, different weighting may be applied for different frequency bands as mentioned above. Equation 5 illustrates an example of Equation 4 that has been modified to accommodate weighting where W is a weight vector and F is a linear transformation (e.g., a Fast Fourier Transform (FFT) matrix).

$\alpha = \text{argmin} \|WF(y-X\alpha)\|^2$      EQUATION 5

Figure 11:
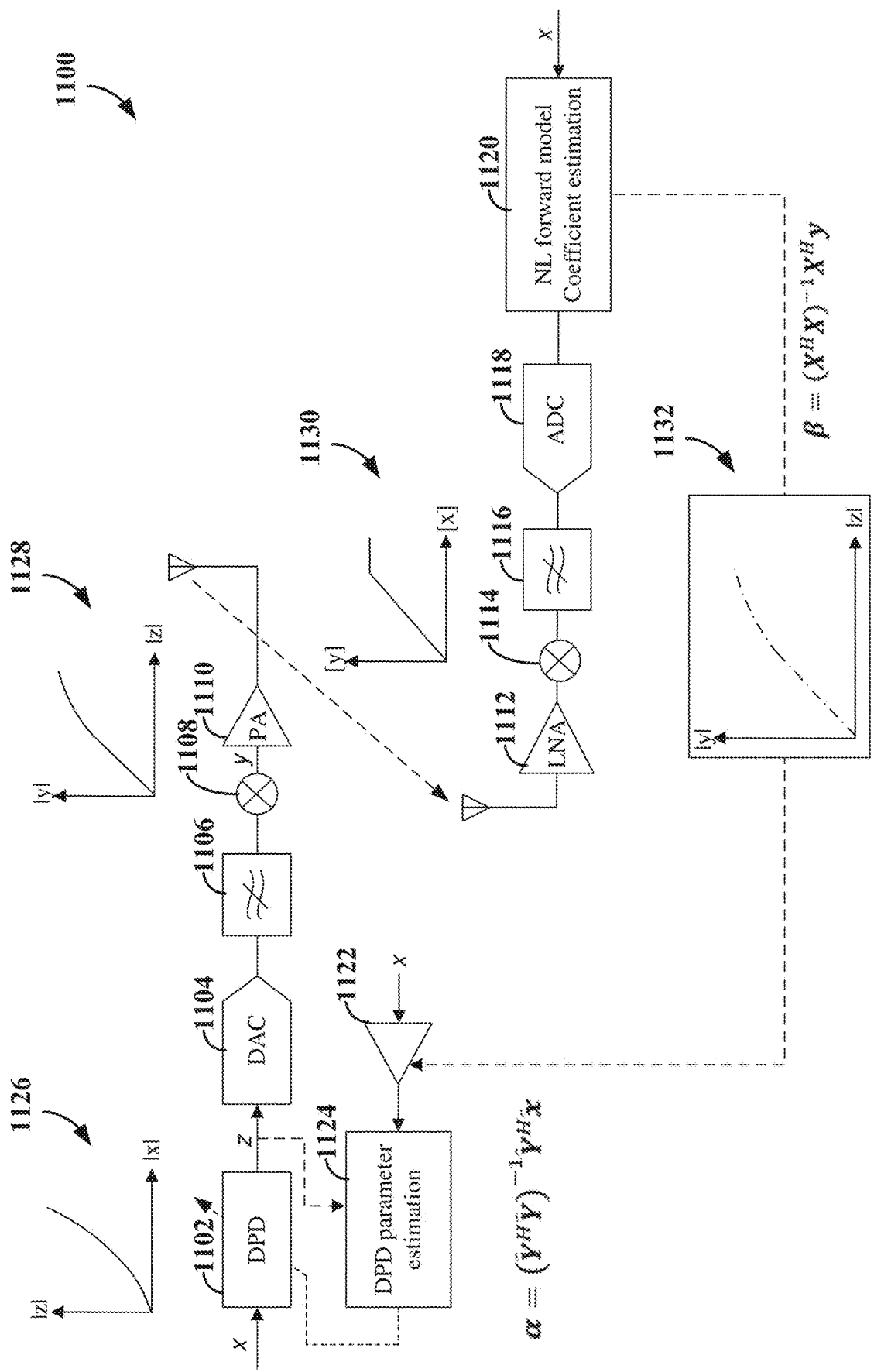
FIG. 11 is a schematic illustration of an example of tuning a DPD configuration according to some aspects.

FIG. 11 illustrates a more detailed example 1100 of the DPD training circuit 1000 where a receive chain of a receiving device (e.g., the receiving device 904 of FIG. 9) feeds back information to a transmit chain of a transmitting device (e.g., the transmitting device 902 of FIG. 9).

The transmit chain includes a DPD component 1102 (e.g., the DPD component 910 of FIG. 9), a digital-to-analog converter (DAC) 1104, a filter 1106, a mixer 1108, and a power amplifier 1110 (e.g., the power amplifier 912 of FIG. 9). The transmit chain processes a signal x and amplifies a signal y for transmission to the receive chain.

The receive chain includes a low noise amplifier (LNA) 1112, a mixer 1114, a filter 1116, an analog-to-digital converter (ADC) 1118, and a non-linearity forward model coefficient estimation component 1120. The estimation component 1120 calculates information (e.g., x, X, coefficients, etc.) based on the received signal and transmits the information to the transmit chain.

At the transmit chain, a digital PA model 1122, in cooperation with a DPD parameter estimation component 1124, generates the DPD parameters for the DPD component 1102 based on the information received from the receive chain. In the example of FIG. 11, it is demonstrated that the receiver side calculates the forward NL model, and then sends this model to the transmitter side which calculates the DPD (backward model). The DPD may be calculated in other ways in other examples. For example, the transmitter side could also calculate the DPD (backward model) on its own. As used herein, the term forward model refers to the PA model and the term backward model refers to the DPD model. The DPD model is referred to as a backward model since it is intended to invert the PA operation. The receiver side could calculate either model, and send the calculated model to the transmitter side. If the receiver side calculates the DPD model, the transmitter side calculates the DPD coefficients from the received DPD model and then uses those coefficients for the DPD operation (DPD-based correction).

The graphs 1126, 1128, 1130, and 1132 of FIG. 11 illustrate the input-to-output responses of different components of FIG. 11. For example, the graph 1126 illustrates that the response of the DPD component 1102 corresponds to the inverse of the response of the power amplifier 1110 as represented by the graph 1128. The graph 1130 illustrates that the DPD component 1102 compensates for the non-linearity of the power amplifier 1110 such that the transmitted signal corresponds to the response 606 of FIG. 6. The graph 1132 illustrates that the estimation component 1120 generates information corresponding to the response of the power amplifier 1110.

Figure 12:
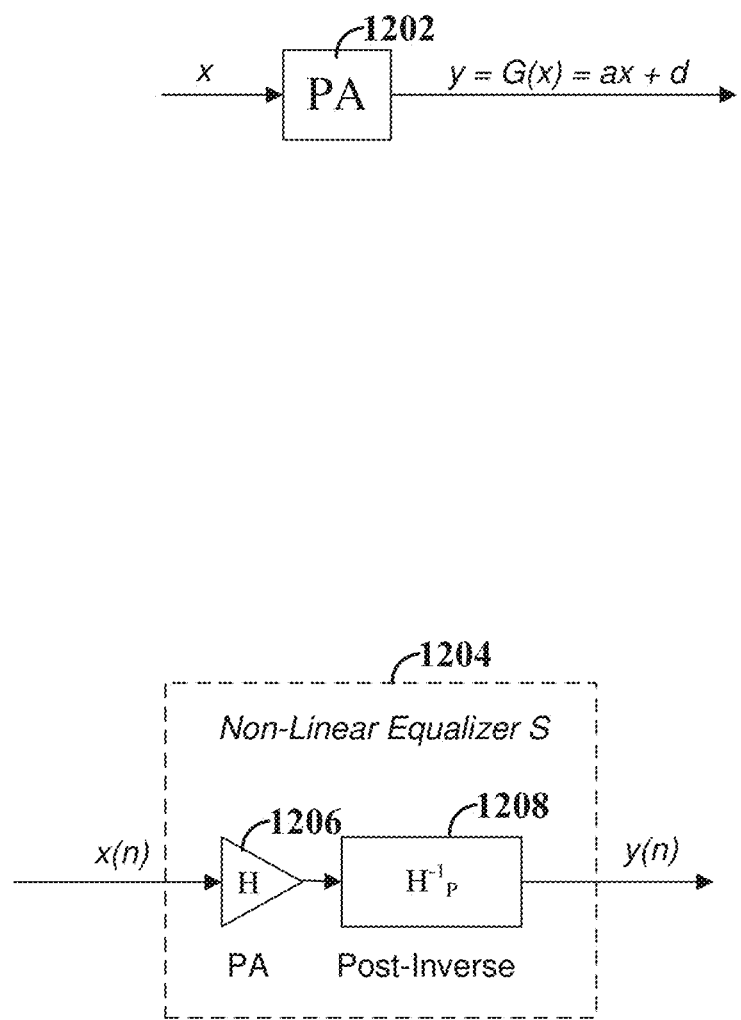
FIG. 12 is a conceptual illustration of an example of applying digital post-distortion (DPoD) to a non-linearly distorted received signal according to some aspects.

Referring now to the DPoD process of a receiving device, as mentioned above, a receiving device may receive a data signal y that includes a non-linear distortion component d. In some examples, the DPoD process is based on modeling the non-linear distortion as an additive signal. For example, as shown in FIG. 12, the output of a power amplifier (PA) 1202 of a transmitting device may be represented by y=G(x)=αx+d.

In some examples, the DPoD process may be an iterative process based on a Bussgang decomposition as discussed below. As shown in FIG. 12, the receiving device in essence provides a non-linear equalizer (S) 1204, where the response H of a power amplifier (PA) 1206 is compensated using a post-inverse response ($H^{-1}_p$) 1208.

Figure 13:
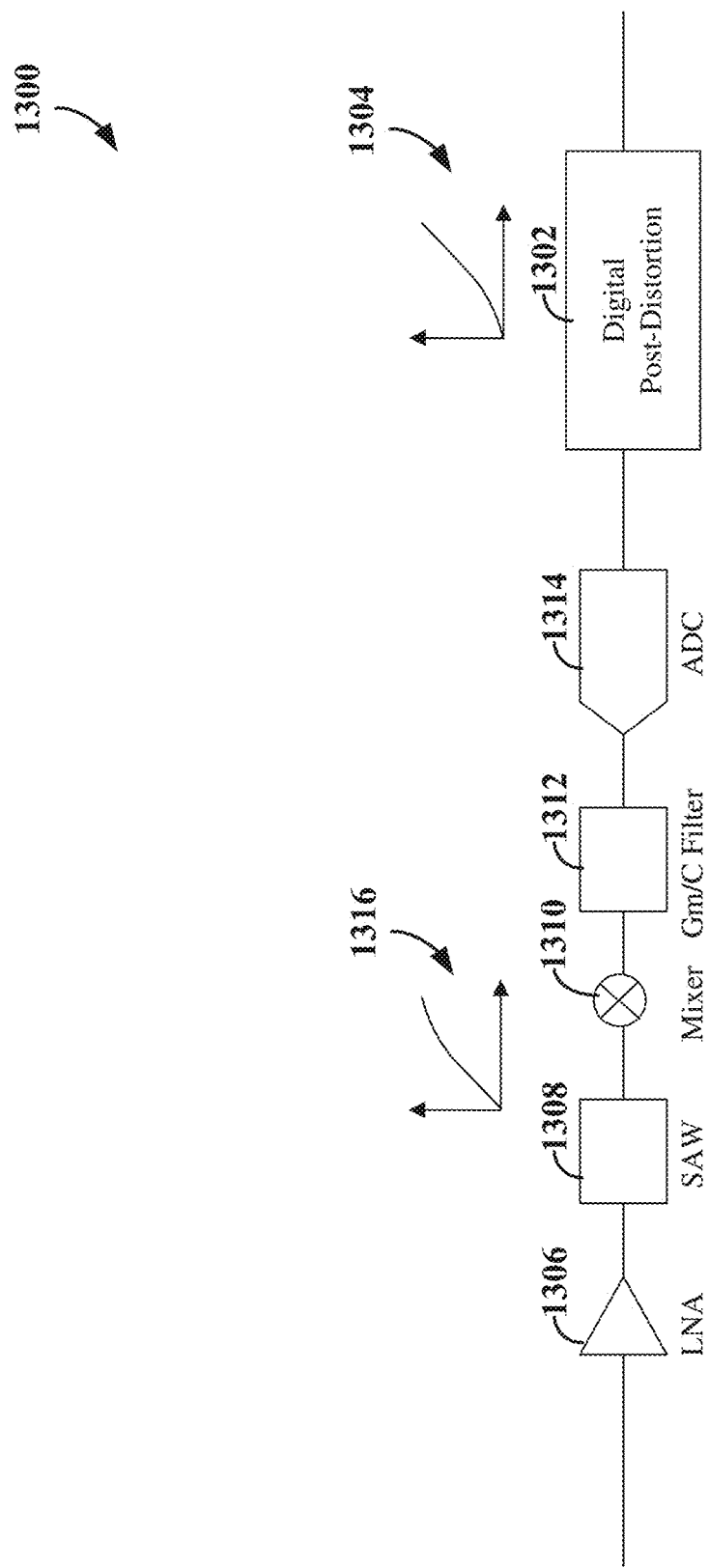
FIG. 13 is a schematic illustration of an example of a receive chain including DPoD functionality according to some aspects.

FIG. 13 illustrates the receive chain 1300 of a receiving device including a DPoD component 1302 with an input to output response 1304. The receive chain 1300 may include an LNA 1306, a surface acoustic wave (SAW) component 1308, a mixer 1310, a filter 1312, and an ADC 1314, similar to the receive chain of FIG. 11. As indicated by the response 1316, the response 1304 of the DPoD component 1302 may be the inverse of the response of the transmitted signal.

An example of a DPoD process implemented using an iterative Bussgang decomposition process is set forth in Table 1.

TABLE 1

| |  |
|---|---|
| Decomposition based on: $y(x) = G(x) = \alpha x + d$ | |
| $\alpha = \arg\min E[\|y - \alpha x\|^2]$ | |
| Initialize: $\hat{d} = 0$ | |
| Iterations loop: | |
|    Correction: | $y_{corrected} \, y - \hat{d}$ |
|    Decision: | $x = \text{ifft}\left(\text{Slicer}\left(\text{fft}\left(\frac{y_{corrected}}{\alpha}\right)\right)\right)$ |
|    Estimation: | $\hat{d} = G(\hat{x}) - \alpha\hat{x}$ |
| Output: $y_{corrected}$ | |

Here, y(x) is the received signal at a receiving device after channel equalization. The signal y(x) (i.e., y) is based on the original data signal x at the transmitting device. As discussed above, the original data signal x is subject to non-linear distortion (e.g., at the CFR 908, the DPD 910, and the PA 912 of FIG. 9). The term G(x) represents this non-linear distortion model.

The distorted signal may be considered a scaled version of x (e.g., αx) with a non-linear distortion component d. In some examples, the scaling factor α might be Bussgang coefficient. In Table 1, the Bussgang coefficient $\alpha = \arg\min E[|y-\alpha x|^2]$. In a Bussgang decomposition y=αx+d, the linear term x and the non-linear distortion component d are orthogonal to each other. The manner in which α is calculated, namely $\alpha = \arg\min E[|y-ax|^2]$, guarantees this orthogonality. This can be shown by taking the derivative of the expression and comparing it to zero (0).

The parameter $\hat{d}$ in Table 1 may represent the non-linear distortion that occurred at the transmitting device. The DPoD reconstruction procedure involves estimating the non-linear distortion $\hat{d}$ in the received signal. With each iteration of the loop, a more accurate estimate of x and $\hat{d}$ can be obtained.

Initially, $\hat{d}$ is set to 0. The iterative process then starts at the Correction phase where $\hat{d}$ is subtracted from the received signal y. At the Decision (e.g., Slicing) phase, the resulting $y_{corrected}$ value is scaled by 1/α, converted to the frequency domain (e.g., to obtain the constellation representation of the OFDM symbol), and then sliced (e.g., to estimate a value of the signal) using knowledge of the modulation (e.g., 64 QAM, 256 QAM, etc.) used by the transmitting device. This result is converted back to the time domain to get the estimated signal $\hat{x}$. The slicing operation of the Decision phase may take different forms in different examples. In some examples, the slicing operation is a hard slicing operation. In some examples, the slicing operation is a soft slicing operation. In some examples, the slicing operation is a transparent slicing operation. In some aspects, transparent slicing means that the output of the slicing function equals the input.

At the Estimation phase, the reconstruction process applies the same non-linear distortion G(x) to $\hat{x}$ as the transmitting device applied to the original data signal x. Here, by removing a scaled version of x from the non-linearly distorted signal, a new estimation of $\hat{d}$ is obtained. In the next iteration of the loop, this value of $\hat{d}$ is removed from y at the Correction phase to get a better estimate of $y_{corrected}$.

The iteration loop may be performed one or more times (e.g., depending on the desired level of performance). In some examples, the iteration loop is performed a defined number of times (e.g., once, twice, etc.).

In some examples, the iteration loop is performed until a defined criterion (e.g., convergence) is met. For example, the iterations may be stopped if the means square error (MSE) as measured at the output of the slicer is less than or equal to an error threshold. It should be understood that for illustration purposes the DPoD process has been described without accounting for the multipath channel. The DPoD can be modified to take into account the multipath channel by, for example, adding the following: 1) Linear equalization on $y_{corrected}$ to remove the channel; and 2) Convolution with the channel of d before subtracting it from y to get $y_{corrected}$.

The non-linearity model G(x) used in the above Estimation phase may be obtained in different ways in different examples. As mentioned above, in some examples, a receiving device receives non-linearity parameters for the non-linearity model from the transmitting device and calculates the non-linearity model based on those parameters. In some examples, the transmitting device sends the entire non-linearity model to the receiving device. In some examples, the receiving device autonomously estimates the non-linearity model.

Figure 14:
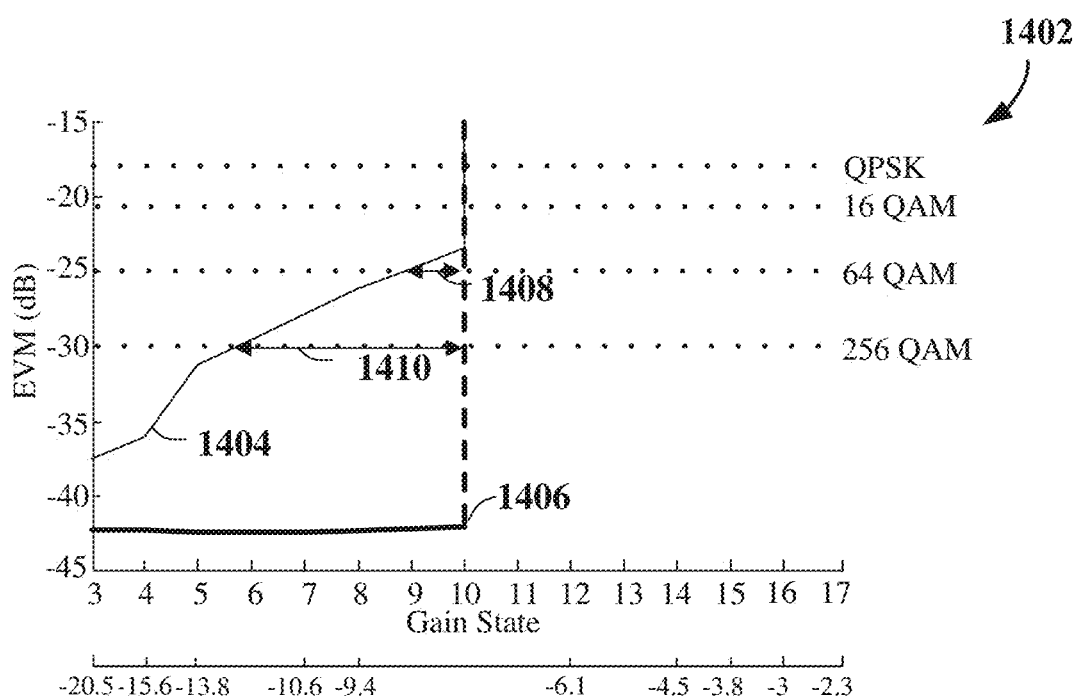
FIG. 14 is a graphical illustration of examples of DPoD-related gain according to some aspects.
Figure 14:
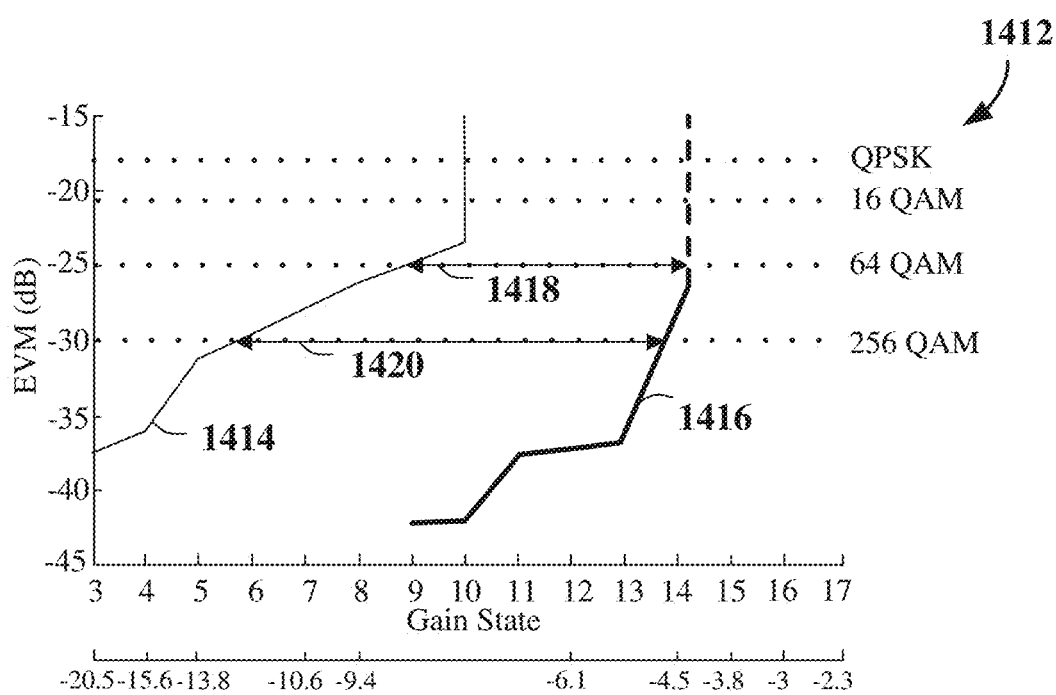

FIG. 14 illustrates that the use of DPD and DPoD as disclosed herein may improve power efficiency, while still meeting out-of-band emission requirements (e.g., ACLR constraints). If ACLR limitations are ignored, the use of DPoD by itself may provide a considerable gain in performance. When ACLR constraints are considered, the DPoD gain may be relatively limited. One way to mitigate that is by using the combination of DPD+DPoD as described herein. Another way to partially alleviate this is by having dynamic out of band requirements—so that these requirements can be relaxed when possible, allowing more gains to the DPoD.

For example, the graph 1402 of FIG. 14 illustrates an example of EVM at a receiving device for different modulation schemes (QPSK, 16 QAM, 64 QAM, and 256 QAM). In general, at higher gain states for the power amplifier, the non-linear distortion increases, thereby worsening ACLR. The line 1404 represents the EVM when DPD and DPoD are not enabled. The line 1406 represents the EVM when DPD is not enabled and DPoD is enabled. The line 1408 illustrates the DPoD gain for 64 QAM. The line 1410 illustrates the DPoD gain for 128 QAM. In this example, an ACLR limit of −28 dB is assumed, and the ACLR limit is exceeded if a gain state greater than 10 is used. This is a significant restraint on power efficiency.

In contrast, the graph 1412 of FIG. 14 illustrates an example of EVM at a receiving device when the combination of DPD and DPoD is used as taught herein to enable DPoD with out-of-band emission compliance. As discussed above, the DPD component compensates for out-of-band emissions, while the DPoD component compensates for EVM. The line 1414 represents the EVM when DPD and DPoD are not enabled (as in the graph 1402). The line 1416 represents the minimum EVM where the ACLR is still met, with appropriate selection of CFR, DPD, and DPoD configurations. The line 1418 illustrates the DPoD gain for 64 QAM. The line 1420 illustrates the DPoD gain for 128 QAM. Thus, it may be seen that the combination of DPD and DPoD may provide a significant improvement in power efficiency (e.g., up to gain state 14). Moreover, as discussed above, the combination of DPD and DPoD may also enable out-of-band combination compliance.

In the combined DPD-DPoD scheme discussed above, the PAPR of a signal may be increased (e.g., as compared to other schemes). As discussed above, a higher PAPR may adversely affect PA reliability. The disclosure relates in some aspects to mitigating such reliability issues by limiting the instantaneous input power to the PA.

For a combined scheme of DPD+DPoD, an additional CFR module may be introduced between the DPD and PA to limit the instantaneous input power to the PA. In some aspects, the use of this additional CFR module may modify the effective PA model. Thus, the characteristics of this additional CFR module may be communicated to a receiving device so that the DPoD algorithm can be modified accordingly.

Figure 15:
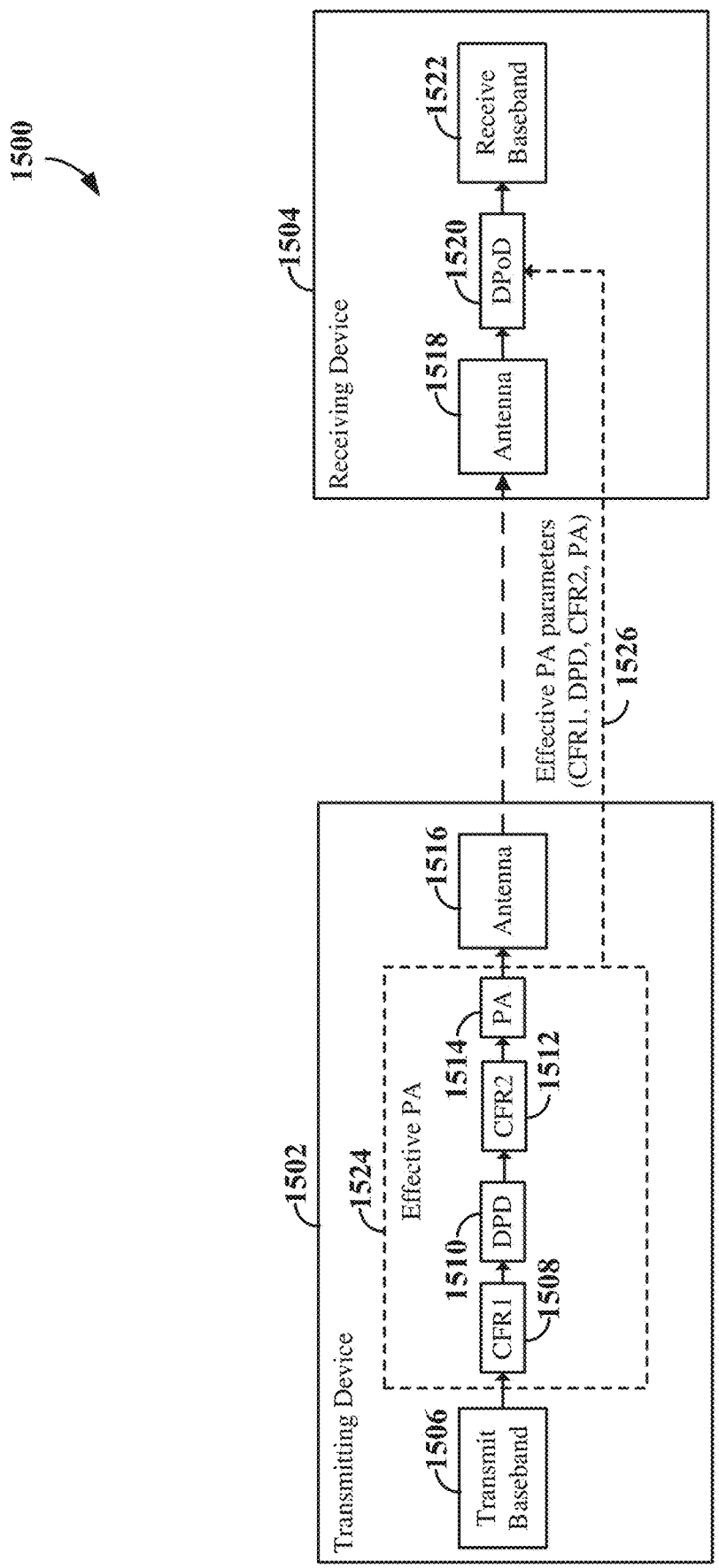
FIG. 15 is a conceptual illustration of an example of wireless communication devices signaling effective power amplifier parameters according to some aspects.

FIG. 15 illustrates an example of a wireless communication system 1500 including a transmitting device 1502 and a receiving device 1504, where the transmitting device 1502 employs two CFR functions. As in the example of FIG. 9, DPD is employed at the transmitting device 902 and DPoD is employed at the receiving device 1504.

FIG. 15 illustrates several components of a transmit chain of the transmitting device 1502. The transmit chain includes a transmit baseband component 1506, a first CFR component 1508, a DPD component 1510, a second CFR component 1512, a power amplifier 1514, and at least one antenna 1516. As mentioned above, each CFR component 1508 or 1512 may apply clipping and filtering in some examples.

FIG. 15 also illustrates several components of a receive chain of the receiving device 1504. The receive chain includes at least one antenna 1518, a DPoD component 1520 (e.g., digital post-distorter), and a receive baseband component 1522. In some examples, a DPoD function performed by the DPoD component 1520 is based on a non-linearity model of the effective power amplifier (e.g., an effective power amplifier model 1524). Accordingly, the receiving device 1504 may maintain a local copy of the non-linearity model (e.g., an estimate of the effective power amplifier model 1524) for use by the DPoD component 1520.

In the example of FIG. 15, the effective power amplifier model 1524 for the transmitting device 1502 is based on the first CFR component 1508, the DPD component 1510, the second CFR component 1512, and the power amplifier 1514. To enable the receiving device to determine the non-linearity model, the transmitting device 1502 transmits effective PA parameters 1526 to the receiving device 1504. In some examples, the effective PA parameters 1526 may include a first parameter (e.g., a clipping level) for the first CFR component 1508, a second parameter (e.g., a kernel and associated parameters) for the DPD component 1510, a third parameter (e.g., a clipping level) for the second CFR component 1512, and a fourth parameter (e.g., a kernel and associated parameters) for the power amplifier 1514. In some examples, the first CFR component 1508 may clip a signal to an absolute voltage level. In some examples, the second CFR component 1512 may clip a signal to meet a target PAPR for a transmission that uses the power amplifier 1514.

Table 2 illustrates an example of the signal processing operations that may be performed by the first CFR component 1508, the DPD component 1510, and the second CFR component 1512 of the transmitting device 1502. The signal s[n] is the original OFDM time domain waveform that is input the first CFR component 1508. The output x[n] of the first CFR component 1508 is the input to the DPD component 1510. The output ŷ[n] of the the DPD component 1510 is the input to the second CFR component 1512. The output y[n] of the second CFR component 1512 is the input to the power amplifier 1514.

TABLE 2

$x[n] = CFR_1(s[n])$. For example, $CFR_1$ may be $\min(|s[n]|,T_1)e^{j\angle s[n]}$. Here, $T_1$ may be selected according to a target PAPR.

$$\hat{y}[n] = \sum_k \sum_q w^1_{k,q} x[n-q]|x[n-q]|^k + \sum_k \sum_q w^2_{k,q} x[n-q]|x[n]|^k + \sum_k \sum_q w^3_{k,q} x[n-q]x^2[n]$$

$y[n] = CFR_2(\hat{y}[n])$. For example, $CFR_2$ may be $\min(|s[n]|,T_2)e^{j\angle s[n]}$. Here, $T_2$ may be selected to limit the peak value at the PA input.
Transmit y[n] through the PA.

Table 3 illustrates an example of the signal processing operations that may be performed by the DPoD component 1520 of the receiving device 1504. As discussed above, the DPoD function involves an iterative operation. In this example, the operation is based, in part, on the parameters for both the first CFR component 1508 and the second CFR component 1512.

At #1616, the transmitting device 1602 applies DPD to a signal to be transmitted to the receiving device 1604 at #1618.

At #1620, the receiving device 1604 applies DPoD (based on the new NL model) to the signal received at #1618.

TABLE 3

For each iteration:
$\tilde{s}[n] \Leftarrow$ estimate s[n] from a receiver signal (equalizer)
$\tilde{x}[n] = CFR_1(\tilde{s}[n])$ $$\hat{y}[n] = \sum_k \sum_q w^1_{k,q} \, \tilde{x}[n-q] |\tilde{x}[n-q]|^k + \sum_k \sum_q w^2_{k,q} \, \tilde{x}[n-q] |\tilde{x}[n-q]|^k + \sum_k \sum_q w^3_q \, \tilde{x} \cdot [n-q] \tilde{x}^2[n]$$

$y[n] = CFR_2(\hat{y}[n])$.

Contruct the distortion: $\tilde{d} = PA(\hat{y}) - \hat{y}$

Figure 16:
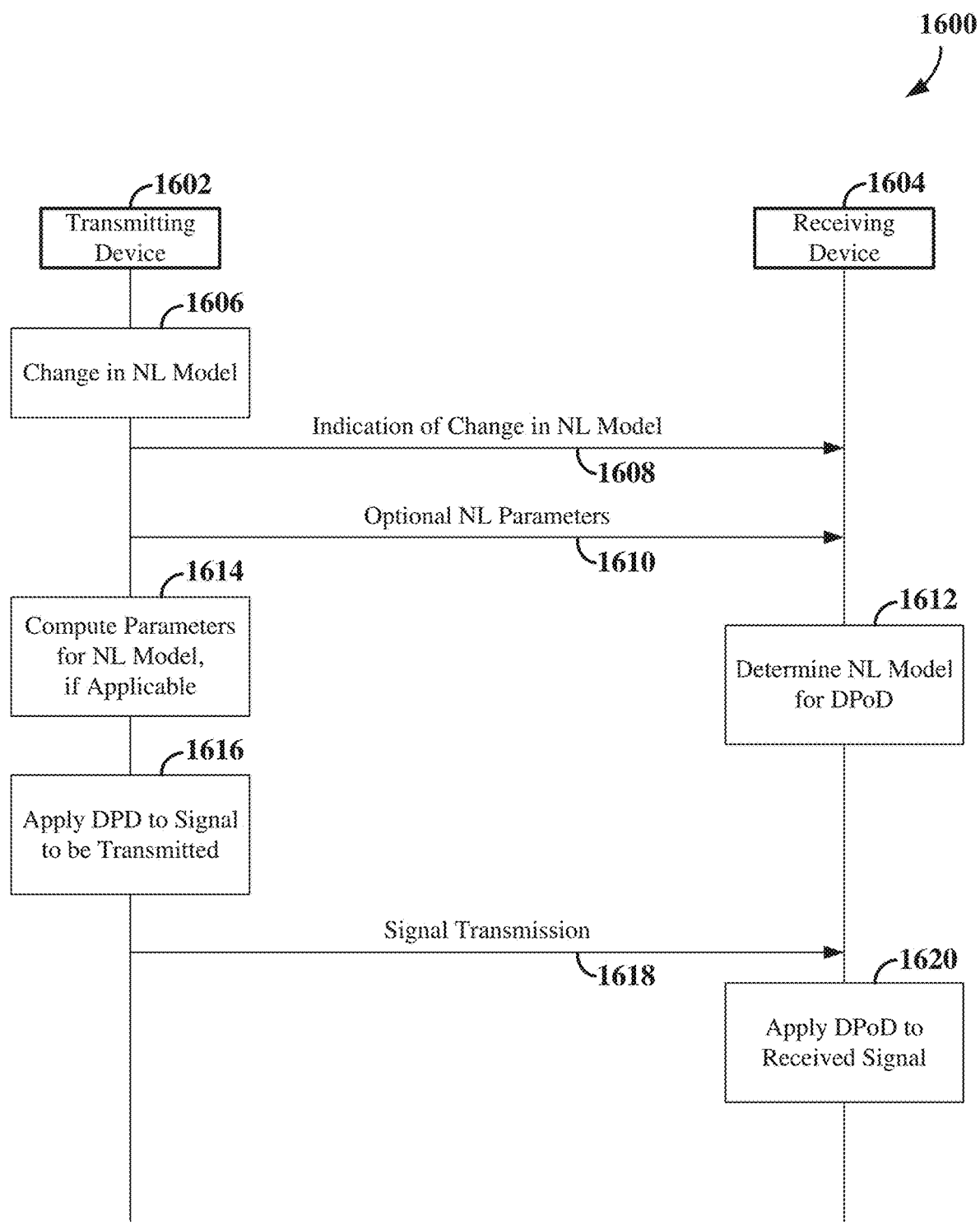
FIG. 16 is a signaling diagram illustrating an example of signaling to indicate a change in a non-linearity model according to some aspects.

Apply inverse equalizer on $\tilde{d}$ and subtract from received signal
Iteration ends FIG. 16 is a signaling diagram 1600 illustrating an example of non-linearity model-related signaling in a wireless communication system including a transmitting device 1602 and a receiving device 1604. In some examples, the transmitting device 1602 may correspond to any of the transmitting devices shown in any of FIGS. 7-9, 15, and 17-19. In some examples, the transmitting device 1602 may correspond to any of the network entities, base stations, CUs, DUs, RUs, or scheduling entities shown in any of FIGS. 1-3, 20, and 24. In some examples, the transmitting device 1602 may correspond to any of the UEs or scheduled entities shown in any of FIGS. 1-3, 20, and 24. In some examples, the receiving device 1604 may correspond to any of the receiving devices shown in any of FIGS. 7-9, 15, and 17-19. In some examples, the receiving device 1604 may correspond to any of the network entities, base stations, CUs, DUs, RUs, scheduling entities shown in any of FIGS. 1-3, 20, and 24. In some examples, the receiving device 1604 may correspond to any of the UEs or scheduled entities shown in any of FIGS. 1-3, 20, and 24.

At #1606 of FIG. 16, a change in a non-linearity (NL) model occurs at the transmitting device 1602. For example, the transmitting device 1602 may detect or cause a change in the DL model as discussed above.

At #1608, the transmitting device 1602 sends an indication of the change in the NL mode to the receiving device 1604.

At optional #1610, the transmitting device 1602 may send NL parameters to the receiving device 1604. For example, the transmitting device 1602 may send a set of kernels corresponding to a new NL model or the entire new NL model to the receiving device 1604.

At #1612, the receiving device 1604 determines the new NL model for its DPoD process. As discussed above, the receiving device may calculate the NL model on its own (e.g., based on received pilot signals), the receiving device may calculate the NL model based on the NL parameters received at #1610, the receiving device may obtain the entire NL model from the NL parameters received at #1610, or the receiving device 1604 may determine the new NL model in some other way.

At #1614, the transmitting device 1602 may compute parameters (e.g., DPD coefficients) for its DPD process, if applicable (e.g., due to the change to the NL model).

Figure 17:
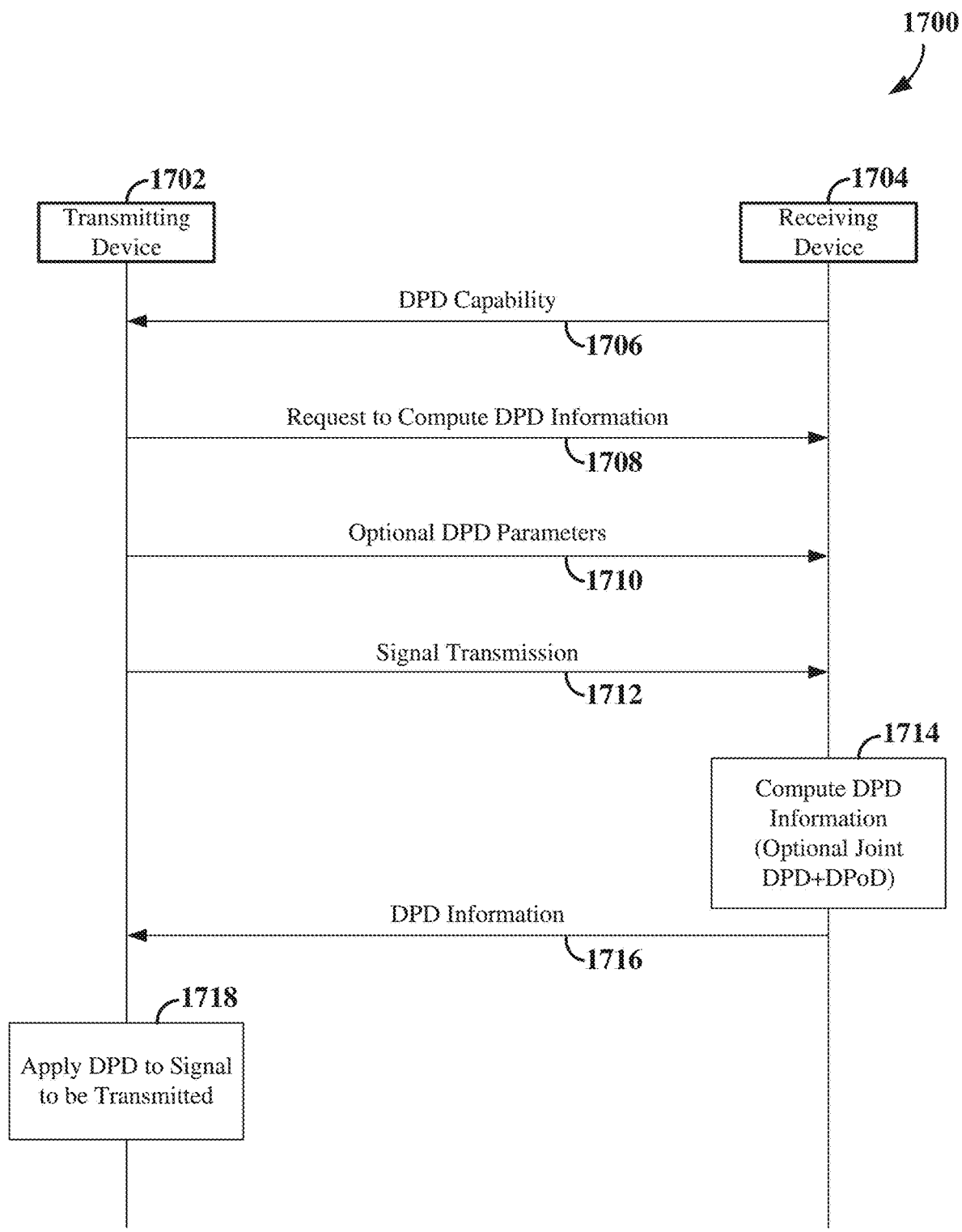
FIG. 17 is a signaling diagram illustrating an example of calculation of DPD information at a receiving device according to some aspects.

FIG. 17 is a signaling diagram 1700 illustrating an example of non-linearity model-related signaling in a wireless communication system including a transmitting device 1702 and a receiving device 1704. In some examples, the transmitting device 1702 may correspond to any of the transmitting devices shown in any of FIGS. 7-9, 15, 16, and 18-19. In some examples, the transmitting device 1702 may correspond to any of the network entities, base stations. CUs, DUs, RUs, or scheduling entities shown in any of FIGS. 1-3, 20, and 24. In some examples, the transmitting device 1702 may correspond to any of the UEs or scheduled entities shown in any of FIGS. 1-3, 20, and 24. In some examples, the receiving device 1704 may correspond to any of the receiving devices shown in any of FIGS. 7-9, 15, 16, and 18-19. In some examples, the receiving device 1704 may correspond to any of the network entities, base stations, CUs, DUs, RUs, scheduling entities shown in any of FIGS. 1-3, 20, and 24. In some examples, the receiving device 1704 may correspond to any of the UEs or scheduled entities shown in any of FIGS. 1-3, 20, and 24.

At #1706 of FIG. 17, the receiving device 1704 informs the transmitting device that the receiving device 1704 is able to calculate DPD information. For example, the receiving device 1704 may transmit a capability message including a DPD capability bit.

At #1708, the transmitting device 1702 sends a request to the receiving device 1704 for the receiving device 1704 to compute DPD information. In some examples, the transmitting device 1702 instructs to the receiving device 1704 to perform joint DPD and DPoD operations.

At optional #1710, the transmitting device 1702 may send DPD parameters to the receiving device 1704. For example, the transmitting device 1702 may send information (e.g., a kernel type, a DPD parameter, etc.) that the receiving device 1704 may use to compute the DPD information. As another example, the transmitting device 1702 may send at least one constraint (e.g., an ACLR limit, a weight, etc.) for computing the DPD information.

At #1712, the transmitting device 1702 transmits a signal to the receiving device 1704.

At #1714, the receiving device 1704 computes the DPD information (e.g., DPD coefficients) for the DPD process at the transmitting device 1702. For example, the receiving device may compute new DPD coefficients as a result of receiving an indication of a change to the NL model (e.g., as discussed above in conjunction with FIG. 16).

In some examples, the receiving device 1704 jointly computes DPD and DPoD information. For example, the receiving device 1704 may jointly compute DPD parameters (e.g., DPD coefficients) for a DPD process of the transmitting device 1702 and DPoD parameters for the receiving device 1704 (e.g., joint computation based on an ACLR limit).

At #1716, the receiving device 1704 sends the DPD information to the transmitting device 1702.

At #1718, the transmitting device 1702 applies DPD (based on the DPD information received at #1716) to another signal to be transmitted to the receiving device 1704.

Figure 18:
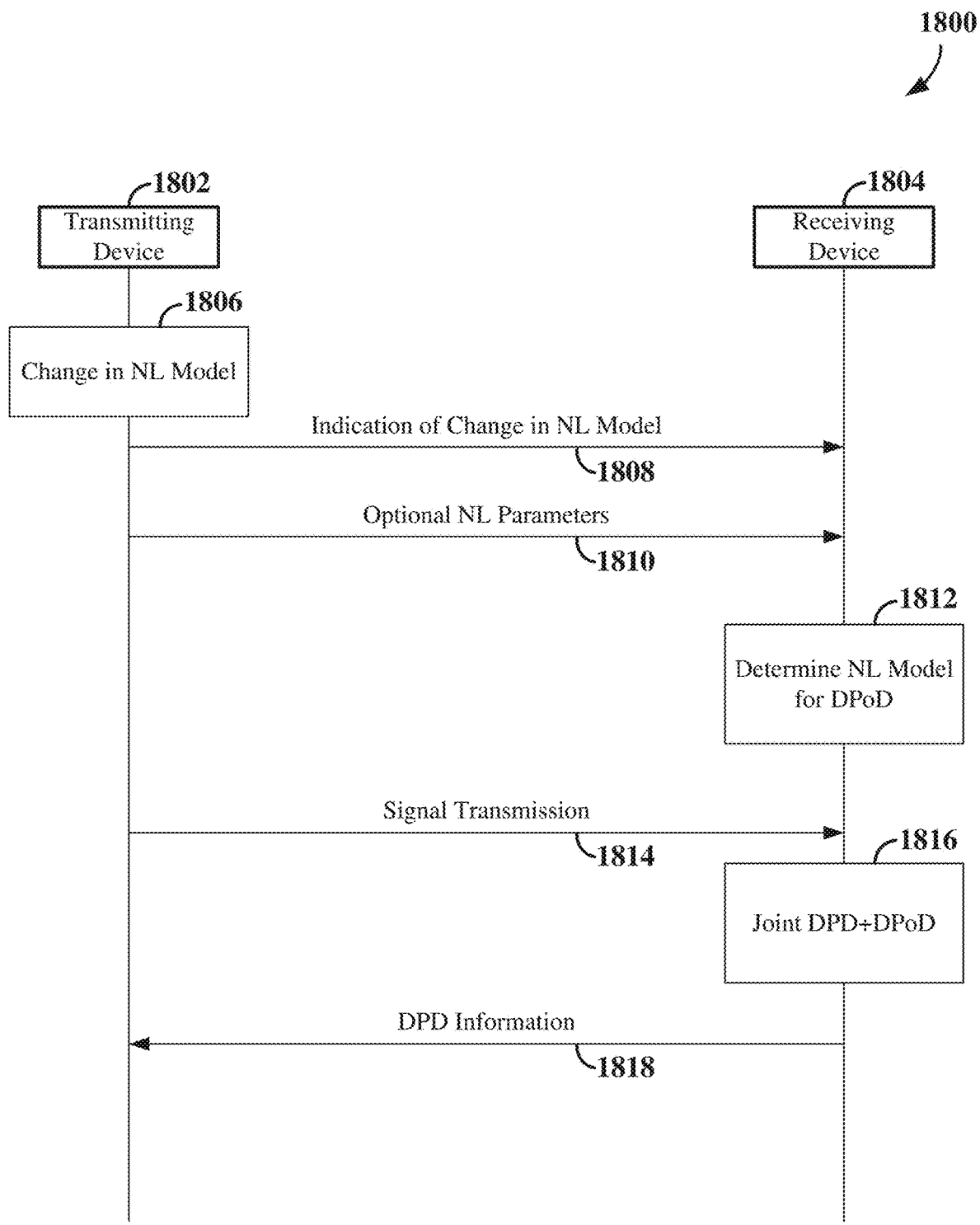
FIG. 18 is a signaling diagram illustrating an example of signaling for joint DPD and DPoD computations according to some aspects.

FIG. 18 is a signaling diagram 1800 illustrating an example of non-linearity model-related signaling in a wireless communication system including a transmitting device 1802 and a receiving device 1804. In some examples, the transmitting device 1802 may correspond to any of the transmitting devices shown in any of FIGS. 7-9, 15-17, and 19. In some examples, the transmitting device 1802 may correspond to any of the network entities, base stations, CUs, DUs. RUs, or scheduling entities shown in any of FIGS. 1-3, 20, and 24. In some examples, the transmitting device 1802 may correspond to any of the UEs or scheduled entities shown in any of FIGS. 1-3, 20, and 24. In some examples, the receiving device 1804 may correspond to any of the receiving devices shown in any of FIGS. 7-9, 15-17, 19. In some examples, the receiving device 1804 may correspond to any of the network entities, base stations, CUs, DUs, RUs, scheduling entities shown in any of FIGS. 1-3, 20, and 24. In some examples, the receiving device 1804 may correspond to any of the UEs or scheduled entities shown in any of FIGS. 1-3, 20, and 24.

At #1806 of FIG. 18, a change in a non-linearity (NL) model occurs at the transmitting device 1802. For example, the transmitting device 1802 may detect or cause a change in the DL model as discussed above.

At #1808, the transmitting device 1802 sends an indication of the change in the NL mode to the receiving device 1804.

At optional #1810, the transmitting device 1802 may send NL parameters to the receiving device 1804. For example, the transmitting device 1802 may send a set of kernels corresponding to a new NL model or the entire new NL model to the receiving device 1804.

At #1812, the receiving device 1804 determines the new NL model for its DPoD process. As discussed above, the receiving device may calculate the NL model on its own (e.g., based on received pilot signals), the receiving device may calculate the NL model based on the NL parameters received at #1810, the receiving device may obtain the entire NL model from the NL parameters received at #1810, or the receiving device 1804 may determine the new NL model in some other way.

At #1814, the transmitting device 1802 transmits a signal to the receiving device 1804.

At #1816, the receiving device 1804 jointly computes DPD and DPoD information. For example, the receiving device 1804 may jointly compute DPD parameters (e.g., DPD coefficients) for a DPD process of the transmitting device 1802 and DPoD parameters for the receiving device 1804 (e.g., joint computation based on an ACLR limit).

At #1818, the receiving device 1804 transmits the computed DPD information to the transmitting device 1802.

Figure 19:
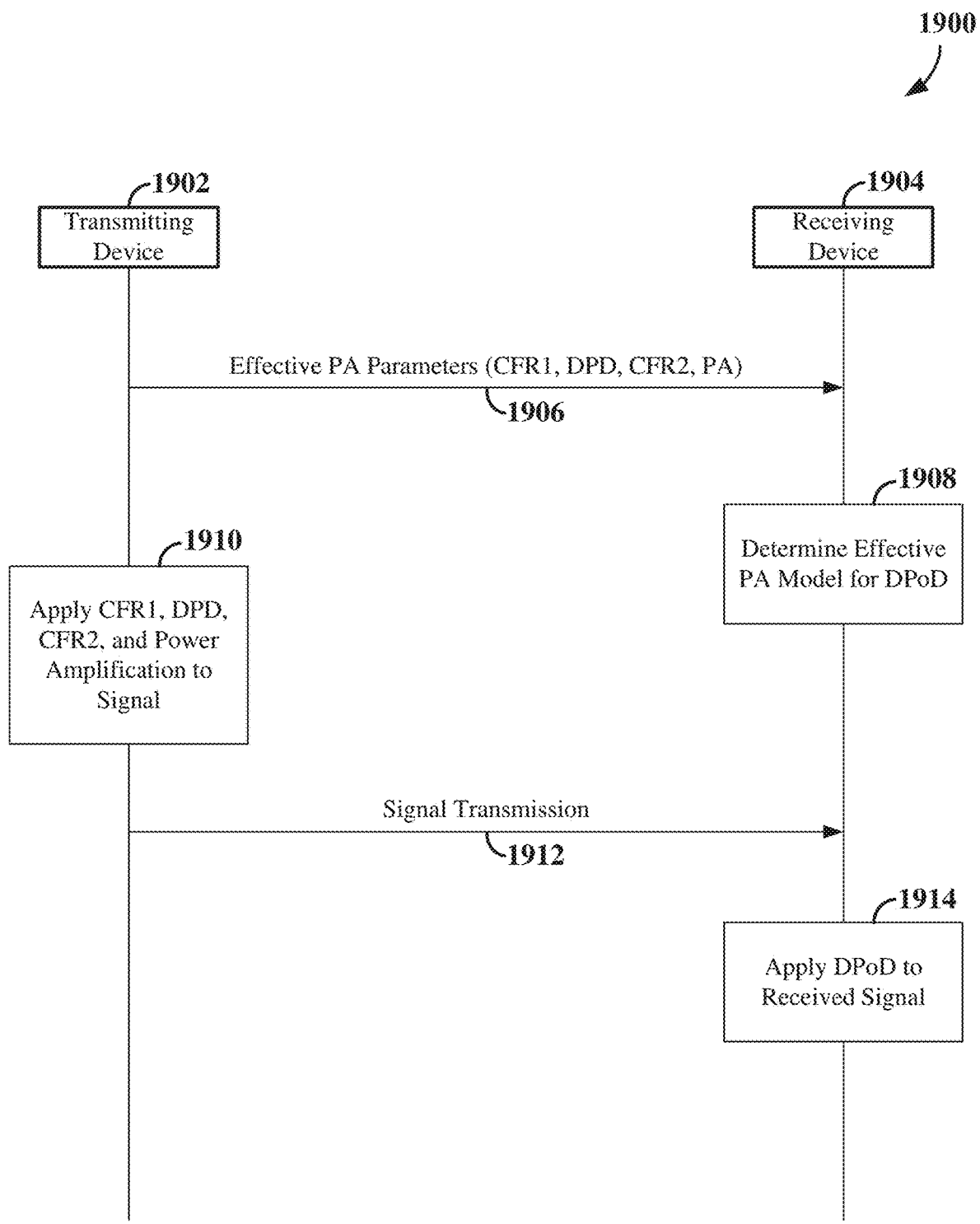
FIG. 19 is a signaling diagram illustrating an example of a signal based on multiple crest factor reductions (CFRs) according to some aspects.

FIG. 19 is a signaling diagram 1900 illustrating an example of non-linearity model-related signaling in a wireless communication system including a transmitting device 1902 and a receiving device 1904. In some examples, the transmitting device 1902 may correspond to any of the transmitting devices shown in any of FIGS. 7-9 and 15-18. In some examples, the transmitting device 1902 may correspond to any of the network entities, base stations, CUs, DUs, RUs, or scheduling entities shown in any of FIGS. 1-3, 20, and 24. In some examples, the transmitting device 1902 may correspond to any of the UEs or scheduled entities shown in any of FIGS. 1-3, 20, and 24. In some examples, the receiving device 1904 may correspond to any of the receiving devices shown in any of FIGS. 7-9 and 15-18. In some examples, the receiving device 1904 may correspond to any of the network entities, base stations, CUs, DUs, RUs, scheduling entities shown in any of FIGS. 1-3, 20, and 24. In some examples, the receiving device 1904 may correspond to any of the UEs or scheduled entities shown in any of FIGS. 1-3, 20, and 24.

At #1906 of FIG. 19, the transmitting device 1902 sends an indication of its effective power amplifier parameters to the receiving device 1904. As discussed herein, these parameters may include parameters for a first CFR function, parameters for a DPD function, parameters for a second CFR function, and parameters for a power amplifier model.

At #1908, the receiving device 1904 determines an effective power amplifier model for its DPoD process based on the parameters received at #1906.

At #1910, the transmitting device 1902 applies the first CFR function, the DPD function, the second CFR function, and power amplification to a signal to be transmitted to the receiving device 1904 at #1912.

At #1914, the receiving device 1904 applies DPoD (based on the effective power amplifier model determined at #1908) to the signal received at #1912.

Figure 20:
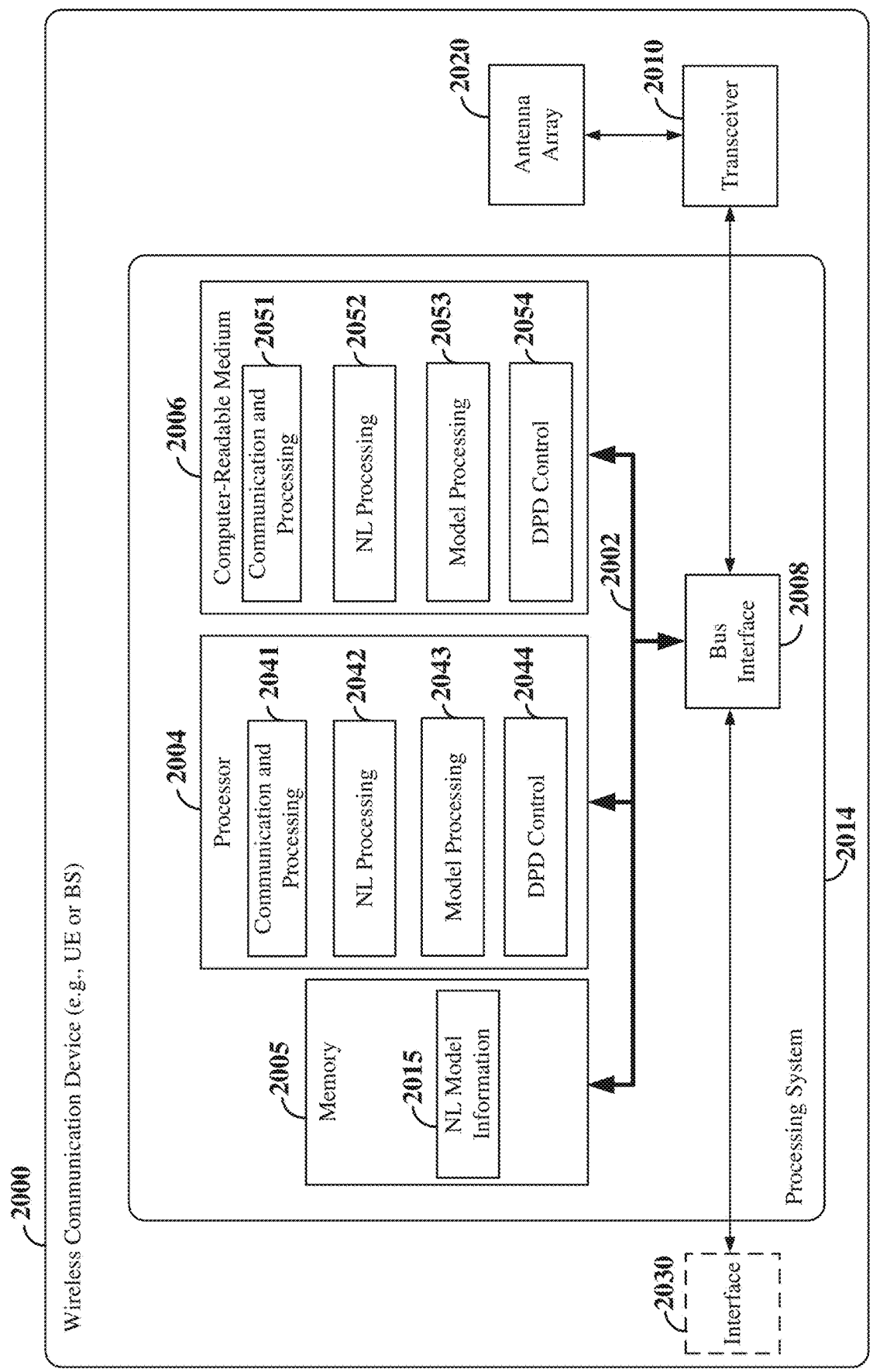
FIG. 20 is a block diagram illustrating an example of a hardware implementation for a wireless communication device (e.g., a user equipment or a base station) employing a processing system according to some aspects.

FIG. 20 is a block diagram illustrating an example of a hardware implementation for a wireless communication device 2000 employing a processing system 2014. In some examples, the wireless communication device 2000 may be a UE or scheduled entity configured to wirelessly communicate with a base station or scheduling entity, as discussed in any one or more of FIGS. 1-19. In this case, the wireless communication device 2000 may correspond to any of the UEs or scheduled entities shown in any of FIGS. 1-3 and 24. In some examples, the wireless communication device 2000 may be a base station or scheduling entity configured to wirelessly communicate with a UE or scheduled entity, as discussed in any one or more of FIGS. 1-19. In this case, the wireless communication device 2000 may correspond to any of the base stations or scheduling entities shown in any of FIGS. 1-3 and 24. In some examples, the wireless communication device 2000 may correspond to any of the transmitting devices shown in any of FIGS. 7-9 and 15-19. In some examples, the wireless communication device 2000 may correspond to any of the receiving devices shown in any of FIGS. 7-9 and 15-19.

In accordance with various aspects of the disclosure, an element, or any portion of an element, or any combination of elements may be implemented with the processing system 2014. The processing system 2014 may include one or more processors 2004. Examples of processors 2004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 2000 may be configured to perform any one or more of the functions described herein. That is, the processor 2004, as utilized in a wireless communication device 2000, may be used to implement any one or more of the processes and procedures described herein.

The processor 2004 may in some instances be implemented via a baseband or modem chip and in other implementations, the processor 2004 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 2014 may be implemented with a bus architecture, represented generally by the bus 2002. The bus 2002 may include any number of interconnecting buses and bridges depending on the specific application of the processing system 2014 and the overall design constraints. The bus 2002 communicatively couples together various circuits including one or more processors (represented generally by the processor 2004), a memory 2005, and computer-readable media (represented generally by the computer-readable medium 2006). The bus 2002 may also link various other circuits such as timing sources, peripherals, voltage regulators, and power management circuits, which are well known in the art, and therefore, will not be described any further. A bus interface 2008 provides an interface between the bus 2002 and a transceiver 2010 and an antenna array 2020 and between the bus 2002 and an interface 2030. The transceiver 2010 provides a communication interface or means for communicating with various other apparatus over a wireless transmission medium. The interface 2030 provides a communication interface or means of communicating with various other apparatuses and devices (e.g., other devices housed within the same apparatus as the wireless communication device 2000 or other external apparatuses) over an internal bus or external transmission medium, such as an Ethernet cable. Depending upon the nature of the apparatus, the interface 2030 may include a user interface (e.g., keypad, display, speaker, microphone, joystick). Of course, such a user interface is optional, and may be omitted in some examples, such as a base station.

The processor 2004 is responsible for managing the bus 2002 and general processing, including the execution of software stored on the computer-readable medium 2006. The software, when executed by the processor 2004, causes the processing system 2014 to perform the various functions described below for any particular apparatus. The computer-readable medium 2006 and the memory 2005 may also be used for storing data that is manipulated by the processor 2004 when executing software. For example, the memory 2005 may store NL model information 2015 (e.g., kernels, coefficients, etc.) used by the processor 2004 in cooperation with the transceiver 2010 for the NL model-related operations described herein.

One or more processors 2004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 2006.

The computer-readable medium 2006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 2006 may reside in the processing system 2014, external to the processing system 2014, or distributed across multiple entities including the processing system 2014. The computer-readable medium 2006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The wireless communication device 2000 may be configured to perform any one or more of the operations described herein (e.g., as described above in conjunction with FIGS. 1-19 and as described below in conjunction with FIGS. 21-23). In some aspects of the disclosure, the processor 2004, as utilized in the wireless communication device 2000, may include circuitry configured for various functions.

The processor 2004 may include communication and processing circuitry 2041. In examples where the wireless communication device 2000 is a scheduled entity (e.g., a UE), the communication and processing circuitry 2041 may be configured to communicate with a scheduling entity such as a base station. In examples where the wireless communication device 2000 is a scheduling entity (e.g., a base station), the communication and processing circuitry 2041 may be configured to communicate with a scheduled entity such as a UE. The communication and processing circuitry 2041 may include one or more hardware components that provide the physical structure that performs various processes related to wireless communication (e.g., signal reception and/or signal transmission) as described herein. The communication and processing circuitry 2041 may further include one or more hardware components that provide the physical structure that performs various processes related to signal processing (e.g., processing a received signal and/or processing a signal for transmission) as described herein. In some examples, the communication and processing circuitry 2041 may include two or more transmit/receive chains, each configured to process signals in a different RAT (or RAN) type. The communication and processing circuitry 2041 may further be configured to execute communication and processing software 2051 included on the computer-readable medium 2006 to implement one or more functions described herein.

In some implementations where the communication involves receiving information, the communication and processing circuitry 2041 may obtain information from a component of the wireless communication device 2000 (e.g., from the transceiver 2010 that receives the information via radio frequency signaling or some other type of signaling suitable for the applicable communication medium), process (e.g., decode) the information, and output the processed information. For example, the communication and processing circuitry 2041 may output the information to another component of the processor 2004, to the memory 2005, or to the bus interface 2008. In some examples, the communication and processing circuitry 2041 may receive one or more of signals, messages, other information, or any combination thereof. In some examples, the communication and processing circuitry 2041 may receive information via one or more channels. In some examples, the communication and processing circuitry 2041 may include functionality for a means for receiving. In some examples, the communication and processing circuitry 2041 may include functionality for a means for decoding.

In some implementations where the communication involves sending (e.g., transmitting) information, the communication and processing circuitry 2041 may obtain information (e.g., from another component of the processor 2004, the memory 2005, or the bus interface 2008), process (e.g., encode) the information, and output the processed information. For example, the communication and processing circuitry 2041 may output the information to the transceiver 2010 (e.g., that transmits the information via radio frequency signaling or some other type of signaling suitable for the applicable communication medium). In some examples, the communication and processing circuitry 2041 may send one or more of signals, messages, other information, or any combination thereof. In some examples, the communication and processing circuitry 2041 may send information via one or more channels. In some examples, the communication and processing circuitry 2041 may include functionality for a means for sending (e.g., a means for transmitting). In some examples, the communication and processing circuitry 2041 may include functionality for a means for encoding.

The processor 2004 may include non-linearity (NL) processing circuitry 2042 configured to perform NL processing-related operations as discussed herein (e.g., one or more of the NL processing-related operations described in conjunction with FIGS. 6-19). The NL processing circuitry 2042 may be configured to execute NL processing software 2052 included on the computer-readable medium 2006 to implement one or more functions described herein.

In some examples, the NL processing circuitry 2042 may include functionality for a means for pre-distorting a signal. For example, the NL processing circuitry 2042 may be configured to apply a DPD function to a signal to be amplified and transmitted. In some examples, the DPD function may be based on Equation 2.

In some examples, the NL processing circuitry 2042 may include functionality for a means for transmitting a signal to a wireless communication device. For example, the NL processing circuitry 2042 may be configured to apply a first CFR function, a DPD function, and a second CFR function to a signal to be amplified and transmitted (e.g., as described at #1910 of FIG. 19).

The processor 2004 may include model processing circuitry 2043 configured to perform model processing-related operations as discussed herein (e.g., one or more of the model processing-related operations described in conjunction with FIGS. 6-19). The model processing circuitry 2043 may be configured to execute model processing software 2053 included on the computer-readable medium 2006 to implement one or more functions described herein.

In some examples, the model processing circuitry 2043 may include functionality for a means for determining a change in a non-linearity model. For example, the model processing circuitry 2043 may be configured to determine new parameters for the model based on a received signal (e.g., as described at #1606 of FIG. 16).

In some examples, the model processing circuitry 2043 may include functionality for a means for transmitting an indication of a change in a non-linearity model. For example, the model processing circuitry 2043 may be configured to send an indication of the change to a transmitting device via a designated wireless communication channel (e.g., as described at #1608 and/or #1610 of FIG. 16).

In some examples, the model processing circuitry 2043 may include functionality for a means for transmitting an indication associated with a non-linearity model for a power amplifier circuit. For example, the model processing circuitry 2043 may be configured to send an indication including a first parameter for a first CFR function, a second parameter for a DPD function, and a third parameter for a second CFR function to a wireless communication device via a designated wireless communication channel (e.g., as described at #1906 of FIG. 19).

The processor 2004 may include digital pre-distortion (DPD) control circuitry 2044 configured to perform DPD control-related operations as discussed herein (e.g., one or more of the DPD control processing operations described in conjunction with FIGS. 6-19). The DPD control circuitry 2044 may further be configured to execute DPD control software 2054 included on the computer-readable medium 2006 to implement one or more functions described herein.

In some examples, the DPD control circuitry 2044 may include functionality for a means for receiving DPD information. For example, the DPD control circuitry 2044 may be configured to receive DPD information from a receiving device via a designated channel (e.g., as described at #1716 of FIG. 17 and/or #1818 of FIG. 18).

The transceiver 2010 may include amplifier circuitry (e.g., a power amplifier) configured to amplify a pre-distorted signal to provide an amplified. The transceiver 2010 may include transmitter circuitry configured to transmit an amplified signal.

Figure 21:
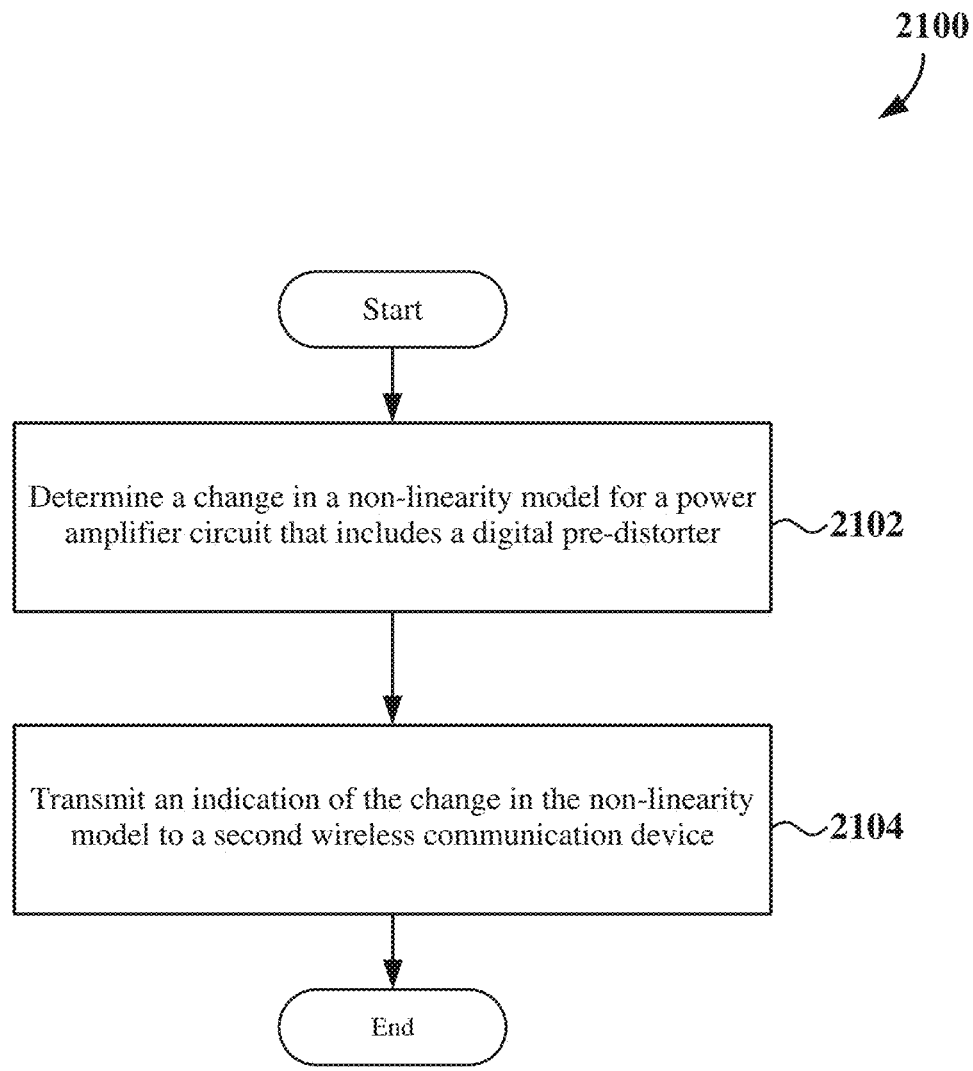
FIG. 21 is a flowchart illustrating an example process for indicating a change in a non-linearity model according to some aspects.

FIG. 21 is a flow chart illustrating an example method 2100 for wireless communication in accordance with some aspects of the present disclosure. As described below, some or all illustrated features may be omitted in a particular implementation within the scope of the present disclosure, and some illustrated features may not be required for implementation of all examples. In some examples, the method 2100 may be carried out by the wireless communication device 2000 illustrated in FIG. 20. In some examples, the method 2100 may be carried out by any suitable apparatus or means for carrying out the functions or algorithm described below.

At block 2102, a first wireless communication device may determine a change in a non-linearity model for a power amplifier circuit that includes a digital pre-distorter. For example, the model processing circuitry 2043 together with the communication and processing circuitry 2041 and the transceiver 2010, shown and described above in connection with FIG. 20, may provide a means to determine a change in a non-linearity model for a power amplifier circuit that includes a digital pre-distorter.

In some examples, determining the change in the non-linearity model may include detecting a change associated with a power amplifier of the power amplifier circuit. In some examples, determining the change in the non-linearity model may include changing a configuration of the digital pre-distorter. In some examples, determining the change in the non-linearity model may include changing a configuration of a crest factor reducer of the power amplifier circuit. In some examples, determining the change in the non-linearity model may include determining at least one of a change in an in-band distortion parameter, a change in an out-of-band emission parameter, a change in a maximum power reduction parameter, a change in a modulation to be used when transmitting a signal via the power amplifier circuit, or a combination thereof. In some examples, a change in the demodulation triggers a change in the backoff which causes a change to the non-linearity model.

At block 2104, the first wireless communication device may transmit an indication of the change in the non-linearity model to a second wireless communication device. In some examples, the indication of the change in the non-linearity model may include at least one non-linearity parameter of the non-linearity model. For example, the model processing circuitry 2043 together with the communication and processing circuitry 2041 and the transceiver 2010, shown and described above in connection with FIG. 20, may provide a means to transmit an indication of the change in the non-linearity model to a second wireless communication device In some examples, the indication of the change in the non-linearity model is for a digital post-distorter of the second wireless communication device. In some examples, the digital post-distorter is associated with mitigation of out-of-band emissions. In some examples, the digital pre-distorter is associated with mitigation of in-band emissions.

In some examples, the method may further include transmitting at least one non-linearity parameter of the non-linearity model to the second wireless communication device. In some examples, the at least one non-linearity parameter may include at least one non-linearity kernel of the digital pre-distorter. In some examples, the at least one non-linearity parameter may include the non-linearity model. In some examples, the at least one non-linearity parameter is transmitted after the determining the change in the non-linearity model. In some examples, the at least one non-linearity parameter is transmitted after receiving a request for the at least one non-linearity parameter from the second wireless communication device.

In some examples, the method may further include receiving digital pre-distortion information from the second wireless communication device. In some examples, the method may further include adjusting the non-linearity model based on the digital pre-distortion information. In some examples, the first wireless communication device may receive digital pre-distortion information from the second wireless communication device, the digital pre-distortion information including at least a portion of a set of digital pre-distortion parameters for the digital pre-distorter. In some examples, the first wireless communication device may adjust a parameter of the digital pre-distorter based on the digital pre-distortion information.

In some examples, the first wireless communication device may receive a first message from the second wireless communication device. In some examples, the first message indicates that the second wireless communication device has a capability to compute the digital pre-distortion information. In some examples, the first wireless communication device may transmit a second message to the second wireless communication device after the receipt of the first message. In some examples, the second message requests the second wireless communication device to compute the digital pre-distortion information and transmit the digital pre-distortion information to the first wireless communication device. In some examples, the digital pre-distortion information is received from the second wireless communication device after the transmission of the second message. In some examples, the second message further requests the second wireless communication device to compute digital post-distortion information in conjunction with the digital pre-distortion information.

In some examples, the method may further include receiving a first message from the second wireless communication device, where the first message indicates that the second wireless communication device has a capability to compute digital pre-distortion information, transmitting a second message to the second wireless communication device after receiving the first message, where the second message requests the second wireless communication device to compute the digital pre-distortion information and transmit the digital pre-distortion information to the first wireless communication device. In some examples, the digital pre-distortion information is received from the second wireless communication device after transmitting the second message. In some examples, the second message requests the second wireless communication device to jointly compute the digital pre-distortion information and digital post-distortion information.

In some examples, the method may further include transmitting first information for computing the digital pre-distortion information to the second wireless communication device. In some examples, the first information may include at least one of a kernel type, a digital pre-distortion parameter, or a combination thereof, and the digital pre-distortion information may include digital pre-distortion kernel coefficients.

In some examples, the method may further include transmitting at least one constraint for computing the digital pre-distortion information to the second wireless communication device. In some examples, the at least one constraint may include at least one of an adjacent channel leakage ratio (ACLR) limit, a weight for at least one frequency band, or a combination thereof.

In some examples, the method may further include receiving digital pre-distortion coefficients for the digital pre-distorter from the second wireless communication device, pre-distorting a signal based on the pre-distortion coefficients to provide a pre-distorted signal, amplifying the pre-distorted signal at a power amplifier of the power amplifier circuit to provide an amplified signal, and transmitting the amplified signal.

In some examples, the method may further include calculating digital pre-distortion coefficients for the digital pre-distorter after determining (after the determination of) the change in the non-linearity model, pre-distorting a signal based on the pre-distortion coefficients to provide a pre-distorted signal, amplifying the pre-distorted signal at a power amplifier of the power amplifier circuit to provide an amplified signal, and transmitting the amplified signal to the second wireless communication device.

Figure 22:
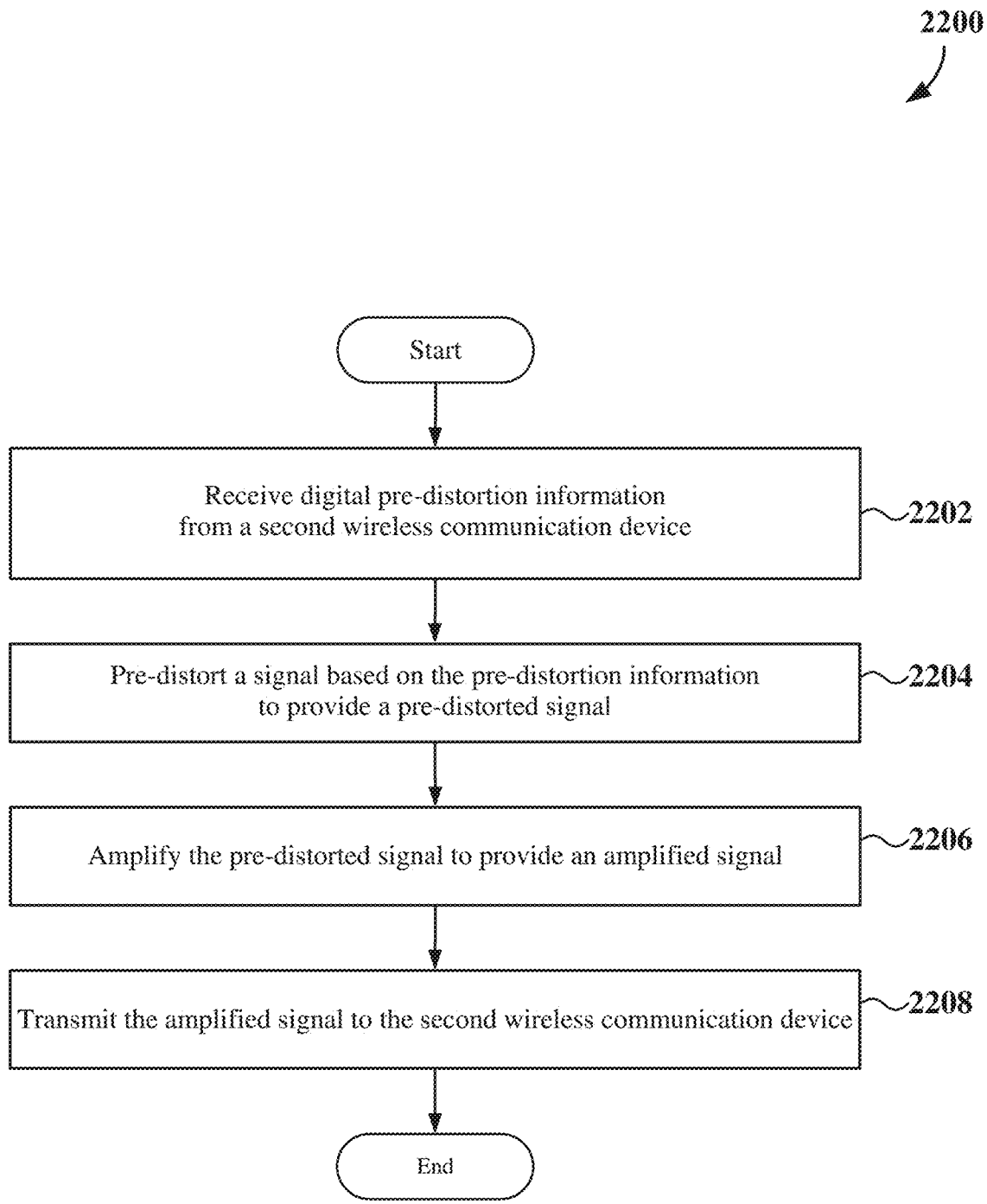
FIG. 22 is a flowchart illustrating an example process that involves using received DPD information according to some aspects.

FIG. 22 is a flow chart illustrating an example method 2200 for wireless communication in accordance with some aspects of the present disclosure. As described below, some or all illustrated features may be omitted in a particular implementation within the scope of the present disclosure, and some illustrated features may not be required for implementation of all examples. In some examples, the method 2200 may be carried out by the wireless communication device 2000 illustrated in FIG. 20. In some examples, the method 2200 may be carried out by any suitable apparatus or means for carrying out the functions or algorithm described below.

At block 2202, a first wireless communication device may receive digital pre-distortion information from a second wireless communication device. In some examples, the digital pre-distortion information may include digital pre-distortion coefficients. For example, the DPD control circuitry 2044 together with the communication and processing circuitry 2041 and the transceiver 2010, shown and described above in connection with FIG. 20, may provide a means to receive digital pre-distortion information from a second wireless communication device.

At block 2204, the first wireless communication device may pre-distort a signal based on the pre-distortion information to provide a pre-distorted signal. For example, the NL processing circuitry 2042 together with the communication and processing circuitry 2041 and the transceiver 2010, shown and described above in connection with FIG. 20, may provide a means to pre-distort a signal based on the pre-distortion information to provide a pre-distorted signal.

At block 2206, the first wireless communication device may amplify the pre-distorted signal to provide an amplified signal. For example, the communication and processing circuitry 2041 and the transceiver 2010, shown and described above in connection with FIG. 20, may provide a means to amplify the pre-distorted signal to provide an amplified signal.

At block 2208, the first wireless communication device may transmit the amplified signal to the second wireless communication device. For example, the communication and processing circuitry 2041 and the transceiver 2010, shown and described above in connection with FIG. 20, may provide a means to transmit the amplified signal to the second wireless communication device.

In some examples, the method may further include receiving a first message from the second wireless communication device, where the first message indicates that the second wireless communication device has a capability to compute digital pre-distortion information, and transmitting a second message to the second wireless communication device after receiving the first message. In some examples, the second message requests the second wireless communication device to compute the digital pre-distortion information and transmit the digital pre-distortion information to the first wireless communication device. In some examples, the digital pre-distortion information is received from the second wireless communication device after transmitting the second message. In some examples, the second message requests the second wireless communication device to jointly compute the digital pre-distortion information and digital post-distortion information.

In some examples, the method may further include transmitting first information for computing the digital pre-distortion information to the second wireless communication device. In some examples, the first information may include at least one of a kernel type, a digital pre-distortion parameter, or a combination thereof, and the digital pre-distortion information may include digital pre-distortion kernel coefficients.

In some examples, the method may further include transmitting at least one constraint for computing the digital pre-distortion information to the second wireless communication device. In some examples, the at least one constraint may include an adjacent channel leakage ratio (ACLR) limit. In some examples, the at least one constraint may include at least one weight for at least one frequency band.

Figure 23:
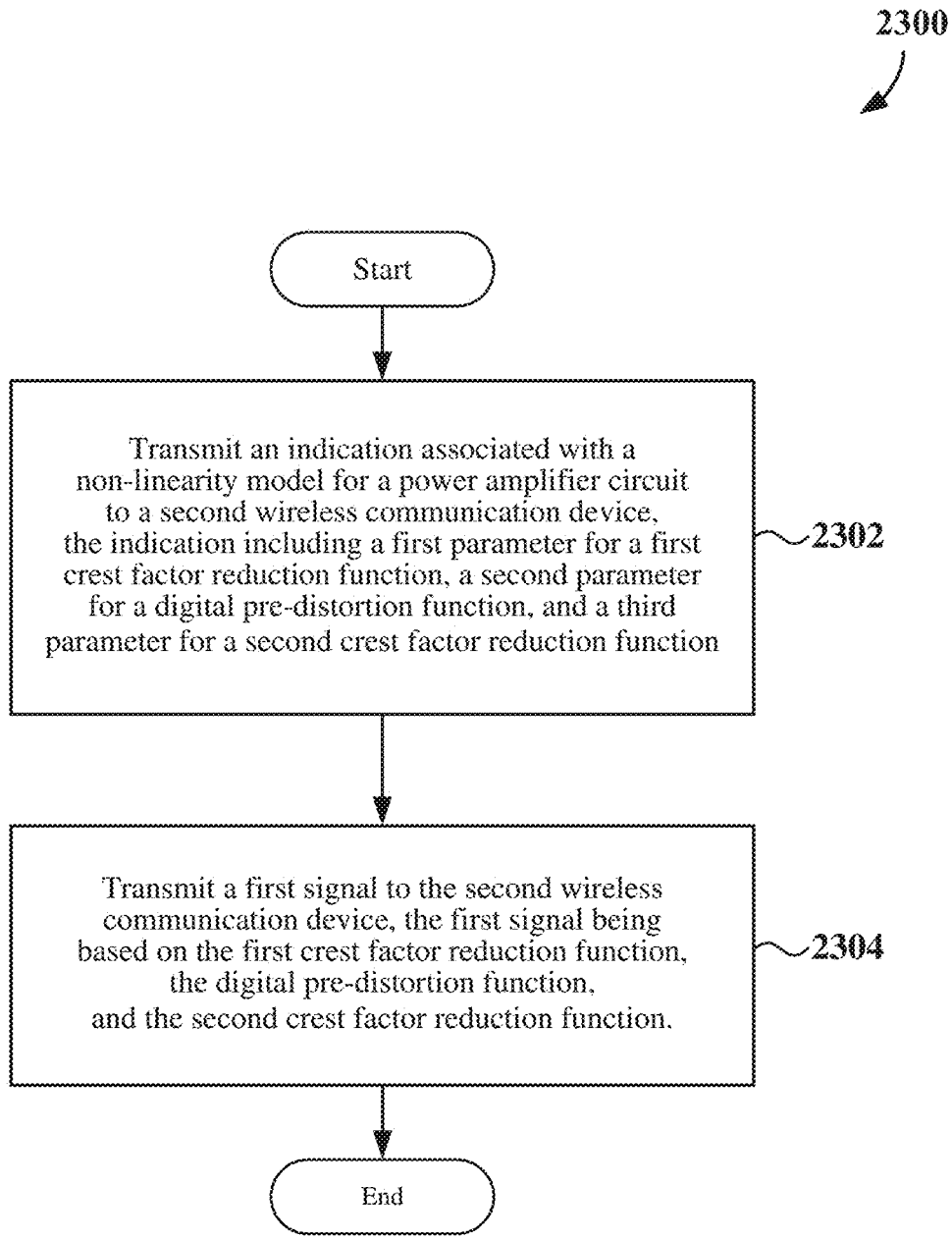
FIG. 23 is a flowchart illustrating an example process that involves transmitting a signal based on multiple CFRs according to some aspects.

FIG. 23 is a flow chart illustrating an example method 2300 for wireless communication in accordance with some aspects of the present disclosure. As described below, some or all illustrated features may be omitted in a particular implementation within the scope of the present disclosure, and some illustrated features may not be required for implementation of all examples. In some examples, the method 2300 may be carried out by the wireless communication device 2000 illustrated in FIG. 20. In some examples, the method 2300 may be carried out by any suitable apparatus or means for carrying out the functions or algorithm described below.

At block 2302, a first wireless communication device may transmit an indication associated with a non-linearity model for a power amplifier circuit to a second wireless communication device, the indication including a first parameter for a first crest factor reduction function, a second parameter for a digital pre-distortion function, and a third parameter for a second crest factor reduction function. For example, the model processing circuitry 2043 together with the communication and processing circuitry 2041 and the transceiver 2010, shown and described above in connection with FIG. 20, may provide a means to transmit an indication associated with a non-linearity model for a power amplifier circuit to a second wireless communication device.

At block 2304, the first wireless communication device may transmit a first signal to the second wireless communication device, the first signal being based on the first crest factor reduction function, the digital pre-distortion function, and the second crest factor reduction function. In some examples, the indication of the change in the non-linearity model may include at least one non-linearity parameter of the non-linearity model. For example, the NL processing circuitry 2042 together with the communication and processing circuitry 2041 and the transceiver 2010, shown and described above in connection with FIG. 20, may provide a means to transmit a first signal to the second wireless communication device.

In some examples, the first parameter may include a first clipping level associated with the first crest factor reduction function. In some examples, the first clipping level is an absolute clipping level.

In some examples, the third parameter may include a second clipping level associated with the second crest factor reduction function. In some examples, the second clipping level is defined relative to a signal power associated with a transmission using the power amplifier circuit. In some examples, the second clipping level is associated with a target peak-to-average power ratio associated with a transmission using the power amplifier circuit.

In some examples, the second parameter may include at least one non-linearity kernel associated with the digital pre-distortion function. In some examples, the second parameter may include at least one non-linearity parameter for the at least one non-linearity kernel associated with the digital pre-distortion function.

In some examples, the indication further includes the non-linearity model of the power amplifier circuit. In some examples, the non-linearity model of the power amplifier circuit may include at least one non-linearity kernel.

In some examples, the first wireless communication device may provide a second signal to the first crest factor reduction function to obtain a third signal. In some examples, the first wireless communication device may provide the third signal to the digital pre-distortion function to obtain a fourth signal. In some examples, the first wireless communication device may provide the fourth signal to the second crest factor reduction function to provide a fifth signal. In some examples, the first wireless communication device may provide the fifth signal to the power amplifier circuit to obtain the first signal.

In some examples, the first wireless communication device may transmit the indication based on a change in the non-linearity model.

In some examples, the first wireless communication device may receive a request for the indication from the second wireless communication device. In some examples, the first wireless communication device may transmit the indication after the receipt of the request.

In some examples, the first wireless communication device may receive digital pre-distortion information for the digital pre-distortion function from the second wireless communication device. In some examples, the first wireless communication device may adjust the non-linearity model based on the digital pre-distortion information.

In some examples, the first wireless communication device may receive a first message from the second wireless communication device. In some examples, the first message indicates that the second wireless communication device has a capability to compute digital pre-distortion information for the digital pre-distortion function. In some examples, the first wireless communication device may transmit a second message to the second wireless communication device after the receipt of the first message. In some examples, the second message may include a request for the second wireless communication device to compute the digital pre-distortion information and transmit the digital pre-distortion information to the first wireless communication device. In some examples, the digital pre-distortion information is received from the second wireless communication device after the transmission of the second message.

In some examples, the first wireless communication device may transmit a message that requests the second wireless communication device to compute digital pre-distortion information for the digital pre-distortion function. In some examples, the message includes at least one parameter for computation of the digital pre-distortion information to meet a target crest factor reduction clipping level associated with the digital pre-distortion function. In some examples, the at least one parameter includes: a first limitation on an instantaneous signal peak at an input to a power amplifier, a second limitation on a peak-to-average power ratio associated with the power amplifier, or a combination thereof.

Referring again to FIG. 20, in one configuration, the wireless communication device 2000 includes means for determining a change in a non-linearity model for a power amplifier circuit that includes a digital pre-distorter, and means for transmitting an indication of the change in the non-linearity model to a second wireless communication device. In one configuration, the wireless communication device 2000 includes means for receiving digital pre-distortion information from a second wireless communication device, means for pre-distorting a signal based on the pre-distortion information to provide a pre-distorted signal, means for amplifying the pre-distorted signal to provide an amplified signal, and means for transmitting the amplified signal to the second wireless communication device. In one configuration, the wireless communication device 2000 includes means for transmitting an indication associated with a non-linearity model for a power amplifier circuit to a second wireless communication device, the indication including a first parameter for a first crest factor reduction function, a second parameter for a digital pre-distortion function, and a third parameter for a second crest factor reduction function, and means for transmitting a signal to a second wireless communication device, the signal being generated based on the first crest factor reduction function, the digital pre-distortion function, and the second crest factor reduction function. In one aspect, the aforementioned means may be the processor 2004 shown in FIG. 20 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable medium 2006, or any other suitable apparatus or means described in any one or more of FIGS. 1-3, 7-13, and 15-20, and utilizing, for example, the methods and/or algorithms described herein in relation to FIGS. 21-23.

Figure 24:
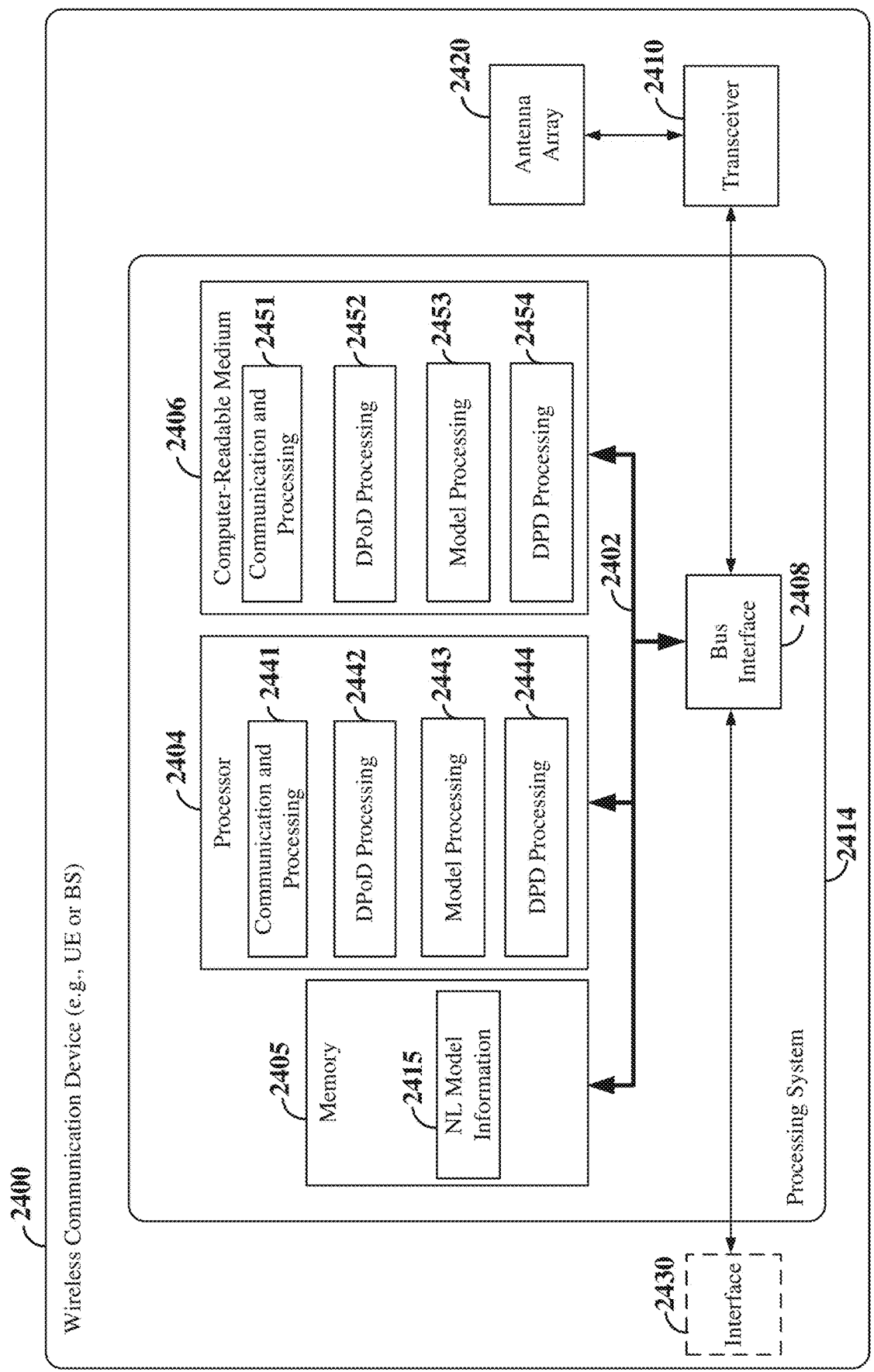
FIG. 24 is a block diagram illustrating an example of a hardware implementation for a wireless communication device (e.g., a user equipment or a base station) employing a processing system according to some aspects.

FIG. 24 is a block diagram illustrating an example of a hardware implementation for a wireless communication device 2400 employing a processing system 2414. In some examples, the wireless communication device 2400 may be a UE or scheduled entity configured to wirelessly communicate with a base station or scheduling entity, as discussed in any one or more of FIGS. 1-19. In this case, the wireless communication device 2400 may correspond to any of the UEs or scheduled entities shown in any of FIGS. 1-3 and 20. In some examples, the wireless communication device 2400 may be a base station or scheduling entity configured to wirelessly communicate with a UE or scheduled entity, as discussed in any one or more of FIGS. 1-19. In this case, the wireless communication device 2400 may correspond to any of the base stations or scheduling entities shown in any of FIGS. 1-3 and 20. In some examples, the wireless communication device 2000 may correspond to any of the transmitting devices shown in any of FIGS. 7-9 and 15-19. In some examples, the wireless communication device 2000 may correspond to any of the receiving devices shown in any of FIGS. 7-9 and 15-19.

In accordance with various aspects of the disclosure, an element, or any portion of an element, or any combination of elements may be implemented with the processing system 2414. The processing system may include one or more processors 2404. The processing system 2414 may be substantially the same as the processing system 2014 illustrated in FIG. 20, including a bus interface 2408, a bus 2402, memory 2405, a processor 2404, a computer-readable medium 2406, a transceiver 2410, and an antenna array 2420. The memory 2405 may store NL model information 2415 (e.g., kernels, coefficients, etc.) used by the processor 2404 in cooperation with the transceiver 2410 for the NL model-related operations described herein. Furthermore, the wireless communication device 2400 may include an interface 2430 that provides a means for communicating with at least one other apparatus within a core network and with at least one radio access network.

The wireless communication device 2400 may be configured to perform any one or more of the operations described herein (e.g., as described above in conjunction with FIGS. 1-19 and as described below in conjunction with FIGS. 25-27). In some aspects of the disclosure, the processor 2404, as utilized in the wireless communication device 2400, may include circuitry configured for various functions.

In some aspects of the disclosure, the processor 2404 may include communication and processing circuitry 2441. The communication and processing circuitry 2444 may be configured to communicate with a UE. The communication and processing circuitry 2441 may include one or more hardware components that provide the physical structure that performs various processes related to communication (e.g., signal reception and/or signal transmission) as described herein. The communication and processing circuitry 2441 may further include one or more hardware components that provide the physical structure that performs various processes related to signal processing (e.g., processing a received signal and/or processing a signal for transmission) as described herein. The communication and processing circuitry 2441 may further be configured to execute communication and processing software 2451 included on the computer-readable medium 2406 to implement one or more functions described herein.

In some implementations wherein the communication involves receiving information, the communication and processing circuitry 2441 may obtain information from a component of the wireless communication device 2400 (e.g., from the transceiver 2410 that receives the information via radio frequency signaling or some other type of signaling suitable for the applicable communication medium), process (e.g., decode) the information, and output the processed information. For example, the communication and processing circuitry 2441 may output the information to another component of the processor 2404, to the memory 2405, or to the bus interface 2408. In some examples, the communication and processing circuitry 2441 may receive one or more of signals, messages, other information, or any combination thereof. In some examples, the communication and processing circuitry 2441 may receive information via one or more channels. In some examples, the communication and processing circuitry 2441 may include functionality for a means for receiving. In some examples, the communication and processing circuitry 2441 may include functionality for a means for decoding.

In some implementations wherein the communication involves sending (e.g., transmitting) information, the communication and processing circuitry 2441 may obtain information (e.g., from another component of the processor 2404, the memory 2405, or the bus interface 2408), process (e.g., encode) the information, and output the processed information. For example, the communication and processing circuitry 2441 may output the information to the transceiver 2410 (e.g., that transmits the information via radio frequency signaling or some other type of signaling suitable for the applicable communication medium). In some examples, the communication and processing circuitry 2441 may send one or more of signals, messages, other information, or any combination thereof. In some examples, the communication and processing circuitry 2441 may send information via one or more channels. In some examples, the communication and processing circuitry 2441 may include functionality for a means for sending (e.g., a means for transmitting). In some examples, the communication and processing circuitry 2441 may include functionality for a means for encoding.

The processor 2404 may include digital post-distortion (DPoD) processing circuitry 2442 configured to perform DPoD processing-related operations as discussed herein (e.g., one or more of the DPoD processing-related operations described in conjunction with FIGS. 6-19). The DPoD processing circuitry 2442 may be configured to execute DPoD processing software 2452 included on the computer-readable medium 2406 to implement one or more functions described herein.

In some examples, the DPoD processing circuitry 2442 may include functionality for a means for receiving a signal. For example, the DPoD processing circuitry 2442 may be configured to cooperate with the communication and processing circuitry 2441 and the transceiver 2410 to receive a signal with non-linearity components from a wireless communication device via a designated channel (e.g., as described at #1618 of FIGS. 16 and/or 1912 of FIG. 19).

In some examples, the DPoD processing circuitry 2442 may include functionality for a means for using digital post-distortion of compensate for non-linear distortion in a signal. For example, the DPoD processing circuitry 2442 may be configured to apply a DPoD function to a received signal (e.g., as described at #1620 of FIGS. 16 and/or 1914 of FIG. 19).

The processor 2404 may include model processing circuitry 2443 configured to perform model processing-related operations as discussed herein (e.g., one or more of the model processing-related operations described in conjunction with FIGS. 6-19). The model processing circuitry 2443 may be configured to execute model processing software 2453 included on the computer-readable medium 2406 to implement one or more functions described herein.

In some examples, the model processing circuitry 2443 may include functionality for a means for receiving an indication of a change in a non-linearity model. For example, the model processing circuitry 2443 may receive an indication (e.g., including a new kernel and associated parameters) from a wireless communication device via a designated channel (e.g., as described at #1608 of FIG. 16).

In some examples, the model processing circuitry 2443 may include functionality for a means for updating non-linearity information for a digital post-distorter. For example, the model processing circuitry 2443 may regenerate an effective power amplifier model based on received parameters or based on processing of a received signals (e.g., as described at #1612 of FIG. 16).

In some examples, the model processing circuitry 2443 may include functionality for a means for receiving an indication associated with a non-linearity model. For example, the model processing circuitry 2443 may receive an indication including a first parameter for a first CFR function, a second parameter for a DPD function, and a third parameter for a second CFR function from a wireless communication device via a designated channel (e.g., as described at #1906 of FIG. 19).

In some examples, the model processing circuitry 2443 may include functionality for a means for deriving a non-linearity model based on an indication. For example, the model processing circuitry 2443 may generate or regenerate an effective power amplifier model based on a first parameter for a first CFR function, a second parameter for a DPD function, and a third parameter for a second CFR function from a wireless communication device via a designated channel (e.g., as described at #1908 of FIG. 19).

The processor 2404 may include digital pre-distortion (DPD) processing circuitry 2444 configured to perform DPD processing-related operations as discussed herein (e.g., one or more of the DPD processing operations described in conjunction with FIGS. 6-19). The DPD processing circuitry 2444 may further be configured to execute DPD processing software 2454 included on the computer-readable medium 2406 to implement one or more functions described herein.

In some examples, the DPD processing circuitry 2444 may include functionality for a means for calculating DPD information. For example, the DPD processing circuitry 2444 may generate DPD parameters based on processing of a received signals (e.g., as described at #1714 of FIG. 17).

In some examples, the DPD processing circuitry 2444 may include functionality for a means for transmitting DPD information. For example, the DPD processing circuitry

2444 may send DPD parameters to a wireless communication device via a designated channel (e.g., as described at #1716 of FIG. 17).

Figure 25:
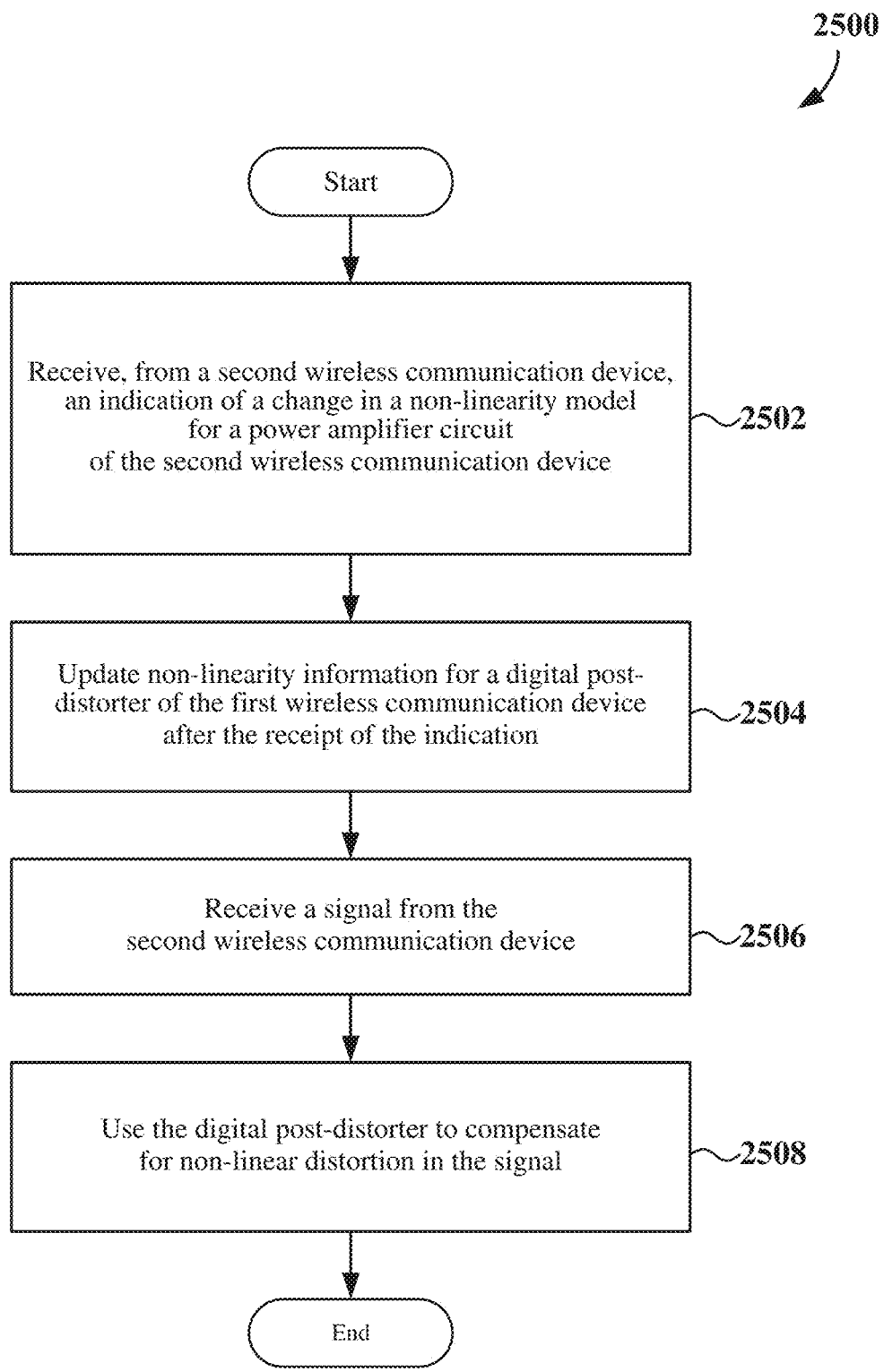
FIG. 25 is a flowchart illustrating an example process for updating non-linearity information in response to a change in a non-linearity model according to some aspects.

FIG. 25 is a flow chart illustrating an example method 2500 for wireless communication in accordance with some aspects of the present disclosure. As described below, some or all illustrated features may be omitted in a particular implementation within the scope of the present disclosure, and some illustrated features may not be required for implementation of all examples. In some examples, the method 2500 may be carried out by the wireless communication device 2400 illustrated in FIG. 24. In some examples, the method 2500 may be carried out by any suitable apparatus or means for carrying out the functions or algorithm described below.

At block 2502, a first wireless communication device may receive, from a second wireless communication device, an indication of a change in a non-linearity model for a power amplifier circuit of the second wireless communication device. For example, the model processing circuitry 2443 together with the communication and processing circuitry 2441 and the transceiver 2410, shown and described above in connection with FIG. 24, may provide a means to receive, from a second wireless communication device, an indication of a change in a non-linearity model for a power amplifier circuit of the second wireless communication device.

In some examples, the indication of the change in the non-linearity model indicates a change associated with a power amplifier of the power amplifier circuit. In some examples, the indication of the change in the non-linearity model indicates a change in a configuration of a digital pre-distorter of the power amplifier circuit. In some examples, the indication of the change in the non-linearity model indicates a change in a configuration of a crest factor reducer of the power amplifier circuit. In some examples, the indication of the change in the non-linearity model indicates at least one of a change in an in-band distortion parameter, a change in an out-of-band emission parameter, a change in a maximum power reduction parameter, a change in a modulation to be used when transmitting a signal via the power amplifier circuit, or a combination thereof. In some examples, the indication of the change in the non-linearity model may include at least one non-linearity parameter of the non-linearity model.

At block 2504, the first wireless communication device may update non-linearity information for a digital post-distorter (e.g., for a digital post-distortion process) of the first wireless communication device after receiving the indication. For example, the model processing circuitry 2443, shown and described above in connection with FIG. 24, may provide a means to update non-linearity information for a digital post-distorter (e.g., for a digital post-distortion process) of the first wireless communication device after receiving the indication.

In some examples, updating the non-linearity information for the digital post-distorter may include determining the non-linearity model. In some examples, determining the non-linearity model may include receiving the non-linearity model from the second wireless communication device.

In some examples, determining the non-linearity model may include selecting a set of kernels for the non-linearity model after receiving the indication of the change in the non-linearity model, and calculating coefficients for the non-linearity model based on the set of kernels. In some examples, selecting the set of kernels for the non-linearity model may include selecting the set of kernels based on at least one received signal.

In some examples, determining the non-linearity model may include receiving at least one non-linearity parameter of the non-linearity model from the second wireless communication device, and generating an estimate of the non-linearity model based on the at least one non-linearity parameter. In some examples, the at least one non-linearity parameter may include at least one non-linearity kernel of a digital pre-distorter of the power amplifier circuit. In some examples, the method may further include transmitting a request for the at least one non-linearity parameter, where the at least one non-linearity parameter is received after the transmitting of the request.

At block 2506, the first wireless communication device may receive a signal from the second wireless communication device. For example, the DPoD processing circuitry 2442 together with the communication and processing circuitry 2441 and the transceiver 2410, shown and described above in connection with FIG. 24, may provide a means to receive a signal from the second wireless communication device.

At block 2508, the first wireless communication device may use the digital post-distorter to compensate for non-linear distortion in the signal. For example, the DPoD processing circuitry 2442 together with the communication and processing circuitry 2441 and the transceiver 2410, shown and described above in connection with FIG. 24, may provide a means to use the digital post-distorter to compensate for non-linear distortion in the signal.

In some examples, the method may further include calculating digital pre-distortion information for a digital pre-distorter of the second wireless communication device. In some examples, the method may further include transmitting the digital pre-distortion information to the second wireless communication device.

In some examples, the method may further include transmitting a first message to the second wireless communication device, wherein the first message indicates a capability to compute digital pre-distortion information, and receiving a second message from the second wireless communication device after transmitting the first message, wherein the second message requests the first wireless communication device to compute the digital pre-distortion information and transmit the digital pre-distortion information to the second wireless communication device, wherein the digital pre-distortion information is transmitted to the second wireless communication device after receiving the second message. In some examples, the second message requests the first wireless communication device to jointly compute the digital pre-distortion information and digital post-distortion information.

In some examples, the method may further include receiving first information for computing the digital pre-distortion information from the second wireless communication device, wherein the calculating the digital pre-distortion information may include calculating the digital pre-distortion information according to the first information. In some examples, the first information may include at least one of a kernel type, a digital pre-distortion parameter, or a combination thereof, and the digital pre-distortion information may include digital pre-distortion kernel coefficients.

In some examples, the method may further include receiving at least one constraint for computing the digital pre-distortion information from the second wireless communication device. In some examples, calculating the digital pre-distortion information may include calculating the digital pre-distortion information according to the at least one constraint.

Figure 26:
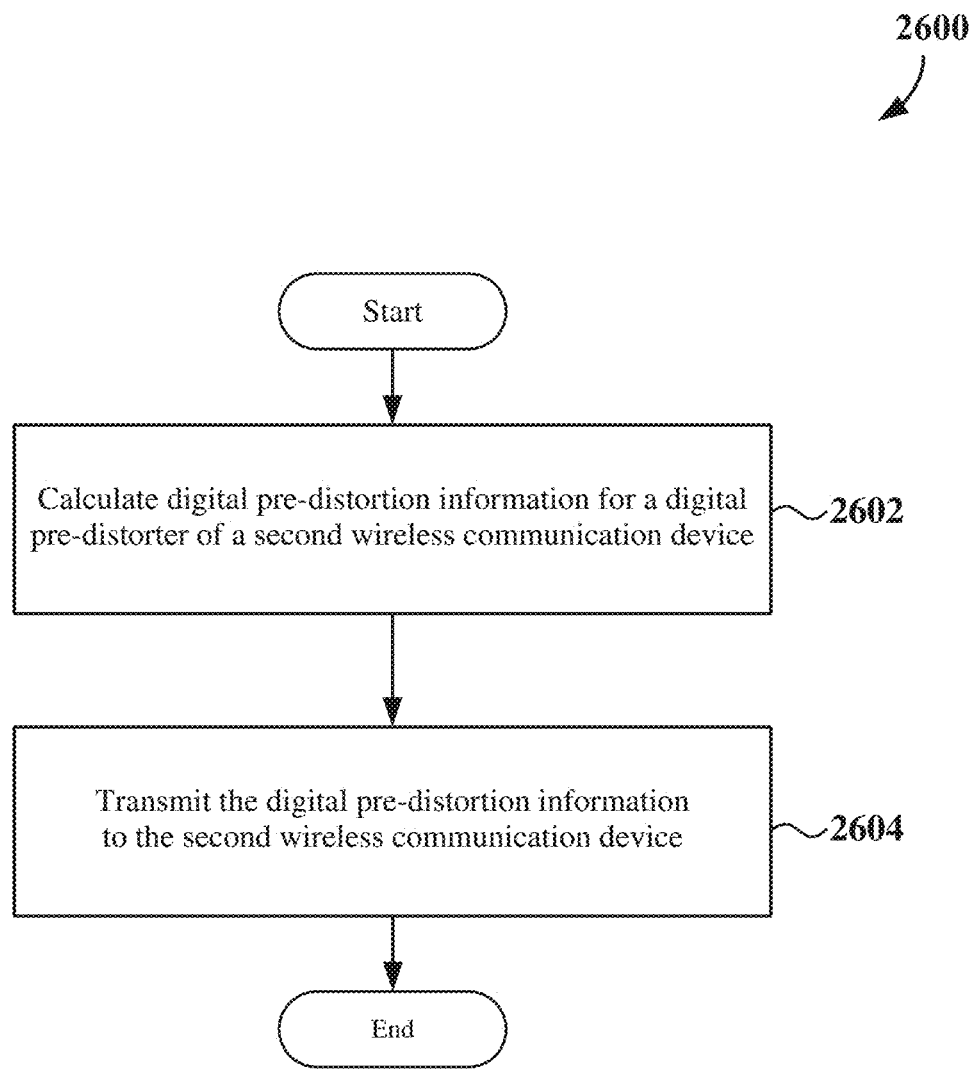
FIG. 26 is a flowchart illustrating an example process that involves calculating DPD information according to some aspects.

FIG. 26 is a flow chart illustrating an example method 2600 for wireless communication in accordance with some aspects of the present disclosure. As described below, some or all illustrated features may be omitted in a particular implementation within the scope of the present disclosure, and some illustrated features may not be required for implementation of all examples. In some examples, the method 2600 may be carried out by the wireless communication device 2400 illustrated in FIG. 24. In some examples, the method 2600 may be carried out by any suitable apparatus or means for carrying out the functions or algorithm described below.

At block 2602, a first wireless communication device may calculate digital pre-distortion information for a digital pre-distorter of a second wireless communication device. In some examples, the digital pre-distortion information may include digital pre-distortion coefficients. For example, the DPD processing circuitry 2444, shown and described above in connection with FIG. 24, may provide a means to calculate digital pre-distortion information for a digital pre-distorter of a second wireless communication device.

At block 2604, the first wireless communication device may transmit the digital pre-distortion information to the second wireless communication device. For example, the DPD processing circuitry 2444 together with the communication and processing circuitry 2441 and the transceiver 2410, shown and described above in connection with FIG. 24, may provide a means to transmit the digital pre-distortion information to the second wireless communication device.

In some examples, the method may further include transmitting a first message to the second wireless communication device, wherein the first message indicates a capability to compute digital pre-distortion information, and receiving a second message from the second wireless communication device after transmitting the first message, wherein the second message requests the first wireless communication device to compute the digital pre-distortion information and transmit the digital pre-distortion information to the second wireless communication device, wherein the digital pre-distortion information is transmitted to the second wireless communication device after receiving the second message. In some examples, the second message requests the first wireless communication device to jointly compute the digital pre-distortion information and digital post-distortion information.

In some examples, the method may further include receiving first information for computing the digital pre-distortion information from the second wireless communication device, wherein the calculating the digital pre-distortion information may include calculating the digital pre-distortion information according to the first information. In some examples, the first information may include at least one of a kernel type, a digital pre-distortion parameter, or a combination thereof, and the digital pre-distortion information may include digital pre-distortion kernel coefficients.

In some examples, the method may further include receiving at least one constraint for computing the digital pre-distortion information from the second wireless communication device, wherein the calculating the digital pre-distortion information may include calculating the digital pre-distortion information according to the at least one constraint. In some examples, the at least one constraint may include an adjacent channel leakage ratio (ACLR) limit. In some examples, the at least one constraint may include at least one weight for at least one frequency band.

Figure 27:
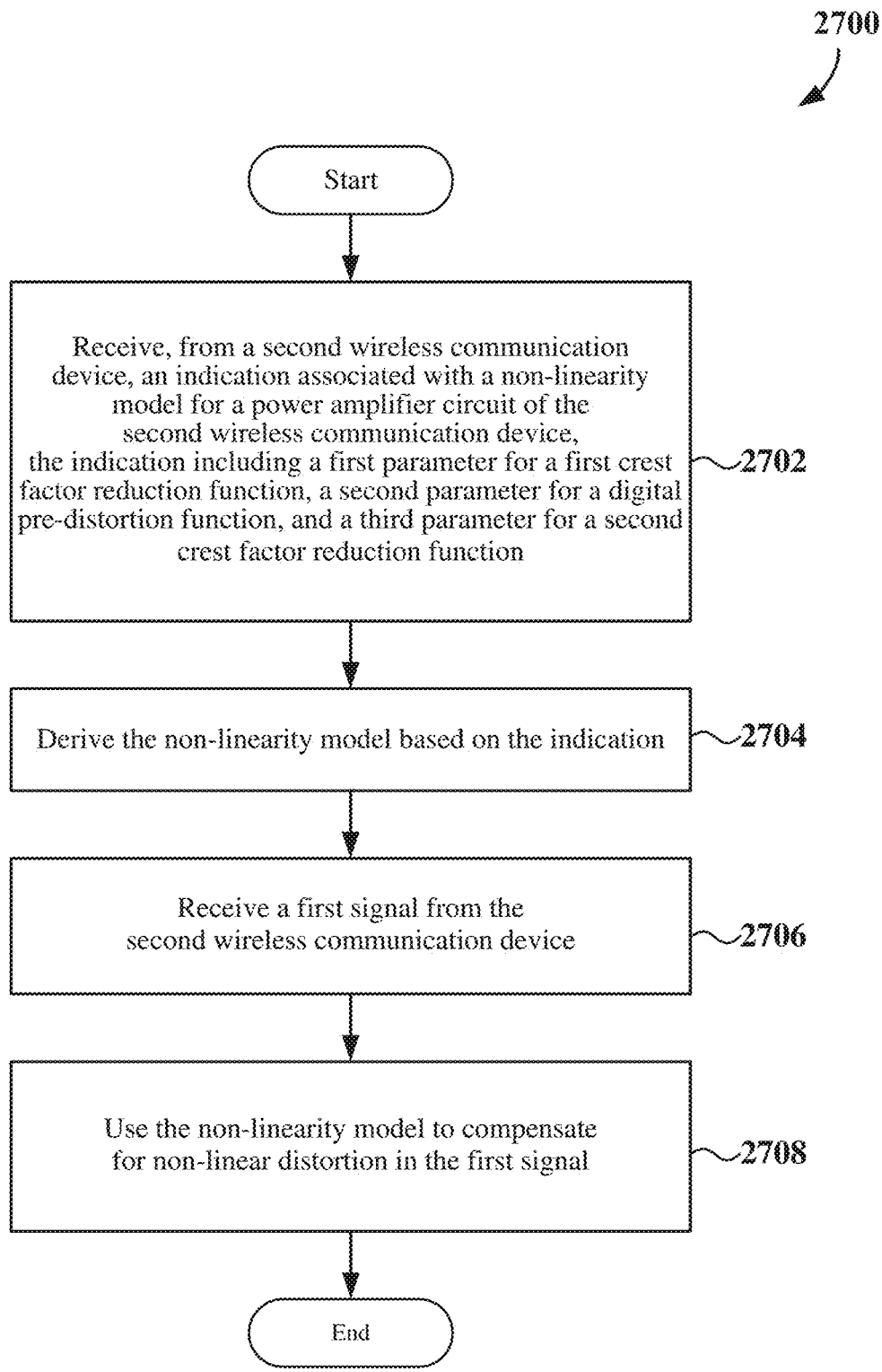
FIG. 27 is a flowchart illustrating an example process that involves receiving a signal based on multiple CFRs according to some aspects.

FIG. 27 is a flow chart illustrating an example method 2700 for wireless communication in accordance with some aspects of the present disclosure. As described below, some or all illustrated features may be omitted in a particular implementation within the scope of the present disclosure, and some illustrated features may not be required for implementation of all examples. In some examples, the method 2700 may be carried out by the wireless communication device 2400 illustrated in FIG. 24. In some examples, the method 2700 may be carried out by any suitable apparatus or means for carrying out the functions or algorithm described below.

At block 2702, a first wireless communication device may receive, from a second wireless communication device, an indication associated with a non-linearity model for a power amplifier circuit of the second wireless communication device, the indication including a first parameter for a first crest factor reduction function, a second parameter for a digital pre-distortion function, and a third parameter for a second crest factor reduction function. For example, the model processing circuitry 2443 together with the communication and processing circuitry 2441 and the transceiver 2410, shown and described above in connection with FIG. 24, may provide a means to receive, from a second wireless communication device, an indication associated with a non-linearity model for a power amplifier circuit of the second wireless communication device.

At block 2704, the first wireless communication device may derive the non-linearity model based on the indication. For example, the model processing circuitry 2443, shown and described above in connection with FIG. 24, may provide a means to derive the non-linearity model based on the indication.

At block 2706, the first wireless communication device may receive a first signal from the second wireless communication device. For example, the DPoD processing circuitry 2442 together with the communication and processing circuitry 2441 and the transceiver 2410, shown and described above in connection with FIG. 24, may provide a means to receive a first signal from the second wireless communication device.

At block 2708, the first wireless communication device may use the non-linearity model to compensate for non-linear distortion in the first signal. For example, the DPoD processing circuitry 2442 together with the communication and processing circuitry 2441 and the transceiver 2410, shown and described above in connection with FIG. 24, may provide a means to use the non-linearity model to compensate for non-linear distortion in the first signal.

In some examples, the first parameter may include a first clipping level associated with the first crest factor reduction function. In some examples, the first clipping level is an absolute clipping level.

In some examples, the third parameter may include a second clipping level associated with the second crest factor reduction function. In some examples, the second clipping level is defined relative to a signal power associated with a transmission using the power amplifier circuit. In some examples, the second clipping level is associated with a target peak-to-average power ratio associated with a transmission using the power amplifier circuit.

In some examples, the second parameter may include at least one non-linearity kernel associated with the digital pre-distortion function. In some examples, the second parameter may include at least one non-linearity parameter for the at least one non-linearity kernel associated with the digital pre-distortion function.

In some examples, the indication further includes the non-linearity model of the power amplifier circuit. In some examples, the non-linearity model of the power amplifier circuit may include at least one non-linearity kernel.

In some examples, the first wireless communication device may select a set of kernels for the non-linearity model after the receipt of the indication. In some examples, the first wireless communication device may calculate coefficients for the non-linearity model based on the set of kernels. In some examples, the first wireless communication device may select the set of kernels based on the first signal.

In some examples, the first wireless communication device may transmit a request for the indication. In some examples, the indication is received after the transmission of the request.

In some examples, the first wireless communication device may receive a message that requests the first wireless communication device to compute digital pre-distortion information for a digital pre-distortion function. In some examples, the message includes at least one parameter for computation of the digital pre-distortion information to meet a target crest factor reduction clipping level associated with the digital pre-distortion function. In some examples, the at least one parameter includes: a first limitation on an instantaneous signal peak at an input to a power amplifier, a second limitation on a peak-to-average power ratio associated with the power amplifier, or a combination thereof. In some examples, the first wireless communication device may compute the digital pre-distortion information such that: the first limitation on the instantaneous signal peak at the input to the power amplifier is not exceeded, the second limitation on the peak-to-average power ratio associated with the power amplifier is not exceeded, or a combination thereof.

Referring again to FIG. 24, in one configuration, the wireless communication device 2400 includes means for receiving, from a second wireless communication device, an indication of a change in a non-linearity model for a power amplifier circuit including a digital pre-distorter of the second wireless communication device, means for updating non-linearity information for a digital post-distorter of the first wireless communication device after the receiving the indication, means for receiving a signal from the second wireless communication device, and means for using the digital post-distortion to compensate for non-linear distortion in the signal. In one configuration, the wireless communication device 2400 includes means for calculating digital pre-distortion information for a digital pre-distorter of a second wireless communication device, and means for transmitting the digital pre-distortion information to the second wireless communication device. In one configuration, the wireless communication device 2400 includes means for receiving, from a second wireless communication device, an indication associated with a non-linearity model for a power amplifier circuit of the second wireless communication device, the indication including a first parameter for a first crest factor reduction function, a second parameter for a digital pre-distortion function, and a third parameter for a second crest factor reduction function, means for deriving the non-linearity model based on the indication, means for receiving a first signal from the second wireless communication device, and means for using the non-linearity model to compensate for non-linear distortion in the first signal. In one aspect, the aforementioned means may be the processor 2404 shown in FIG. 24 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 2404 is merely provided as an example, and other means for carrying out the described functions may be included within various aspects of the present disclosure, including but not limited to the instructions stored in the computer-readable medium 2406, or any other suitable apparatus or means described in any one or more of FIGS. 1-3, 7-13, 15-19, and 24, and utilizing, for example, the methods and/or algorithms described herein in relation to FIGS. 25-27.

The methods shown in FIGS. 20-23 and 25-27 may include additional aspects, such as any single aspect or any combination of aspects described below and/or in connection with one or more other processes described elsewhere herein. The following provides an overview of several aspects of the present disclosure.

Aspect 1: A method for wireless communication at a first wireless communication device, the method comprising: determining a change in a non-linearity model for a power amplifier circuit that includes a digital pre-distorter; and transmitting an indication of the change in the non-linearity model to a second wireless communication device.

Aspect 2: The method of aspect 1, wherein the determining the change in the non-linearity model comprises: detecting a change associated with a power amplifier of the power amplifier circuit.

Aspect 3: The method of aspect 1 or 2, wherein the determining the change in the non-linearity model comprises: changing a configuration of the digital pre-distorter.

Aspect 4: The method of any of aspects 1 through 3, wherein the determining the change in the non-linearity model comprises: changing a configuration of a crest factor reducer of the power amplifier circuit.

Aspect 5: The method of any of aspects 1 through 4, wherein the determining the change in the non-linearity model comprises determining at least one of: a change in an in-band distortion parameter, a change in an out-of-band emission parameter, a change in a maximum power reduction parameter, a change in a modulation to be used when transmitting a signal via the power amplifier circuit, or a combination thereof.

Aspect 6: The method of any of aspects 1 through 5, wherein the indication comprises at least one non-linearity parameter of the non-linearity model.

Aspect 7: The method of aspect 6, wherein the at least one non-linearity parameter comprises at least one of: a non-linearity kernel of the digital pre-distorter, the non-linearity model, or a combination thereof.

Aspect 8: The method of aspect 6, further comprising: transmitting the at least one non-linearity parameter after receipt of a request for the at least one non-linearity parameter from the second wireless communication device.

Aspect 9: The method of any of aspects 1 through 8, further comprising: receiving digital pre-distortion information from the second wireless communication device, the digital pre-distortion information including at least a portion of a set of digital pre-distortion parameters for the digital pre-distorter; and adjusting a parameter of the digital pre-distorter based on the digital pre-distortion information.

Aspect 10: The method of aspect 9, further comprising: receiving a first message from the second wireless communication device, wherein the first message indicates that the second wireless communication device has a capability to compute the digital pre-distortion information; transmitting a second message to the second wireless communication device after the receipt of the first message, wherein the second message requests the second wireless communication device to compute the digital pre-distortion information and transmit the digital pre-distortion information to the first wireless communication device, and wherein the digital pre-distortion information is received from the second wireless communication device after the transmitting the second message.

Aspect 11: The method of aspect 10, wherein the second message further requests the second wireless communication device to compute digital post-distortion information in conjunction with the digital pre-distortion information.

Aspect 12: The method of aspect 9, further comprising: transmitting first information for computing the digital pre-distortion information to the second wireless communication device.

Aspect 13: The method of aspect 12, wherein: the first information comprises at least one of a kernel type, a digital pre-distortion parameter, or a combination thereof; and the digital pre-distortion information comprises digital pre-distortion kernel coefficients.

Aspect 14: The method of aspect 9-12, further comprising: transmitting at least one constraint for computing the digital pre-distortion information to the second wireless communication device, wherein the at least one constraint comprises at least one of an adjacent channel leakage ratio (ACLR) limit, a weight for at least one frequency band, or a combination thereof.

Aspect 15: The method of any of aspects 1 through 14, further comprising: receiving digital pre-distortion coefficients for the digital pre-distorter from the second wireless communication device; pre-distorting a signal based on the pre-distortion coefficients to provide a pre-distorted signal; amplifying the pre-distorted signal at a power amplifier of the power amplifier circuit to provide an amplified signal; and transmitting the amplified signal to the second wireless communication device.

Aspect 16: The method of any of aspects 1 through 15, further comprising: calculating digital pre-distortion coefficients for the digital pre-distorter after the determining the change in the non-linearity model; pre-distorting a signal based on the pre-distortion coefficients to provide a pre-distorted signal; amplifying the pre-distorted signal at a power amplifier of the power amplifier circuit to provide an amplified signal; and transmitting the amplified signal to the second wireless communication device.

Aspect 21: A method for wireless communication at a first wireless communication device, the method comprising: receiving, from a second wireless communication device, an indication of a change in a non-linearity model for a power amplifier circuit comprising a digital pre-distorter of the second wireless communication device; updating non-linearity information for a digital post-distorter of the first wireless communication device after the receiving the indication; receiving a signal from the second wireless communication device; and using the digital post-distorter to compensate for non-linear distortion in the signal.

Aspect 22: The method of aspect 21, wherein the indication of the change in the non-linearity model indicates at least one of: a change associated with a power amplifier of the power amplifier circuit, a change in a configuration of a digital pre-distorter of the power amplifier circuit, a change in a configuration of a crest factor reducer of the power amplifier circuit, or a combination thereof.

Aspect 23: The method of any of aspects 21 through 22, wherein the indication of the change in the non-linearity model indicates at least one of: a change in an in-band distortion parameter, a change in an out-of-band emission parameter, a change in a maximum power reduction parameter, a change in a modulation to be used when transmitting a signal via the power amplifier circuit, or a combination thereof.

Aspect 24: The method of any of aspects 21 through 23, wherein the updating the non-linearity information for the digital post-distorter comprises: determining the non-linearity model.

Aspect 25: The method of aspect 24, wherein the determining the non-linearity model comprises: selecting a set of kernels for the non-linearity model after the receiving the indication of the change in the non-linearity model; and calculating coefficients for the non-linearity model based on the set of kernels.

Aspect 26: The method of aspect 25, wherein the selecting the set of kernels for the non-linearity model comprises: selecting the set of kernels based on at least one received signal.

Aspect 27: The method of aspect 24, wherein the determining the non-linearity model comprises: receiving at least one non-linearity parameter of the non-linearity model from the second wireless communication device; and generating an estimate of the non-linearity model based on the at least one non-linearity parameter.

Aspect 28: The method of aspect 27, further comprising: transmitting a request for the at least one non-linearity parameter, wherein the at least one non-linearity parameter is received after the transmitting the request.

Aspect 29: The method of any of aspects 21 through 28, wherein the determining the non-linearity model comprises: receiving the non-linearity model from the second wireless communication device.

Aspect 30: The method of any of aspects 21 through 29, further comprising: calculating digital pre-distortion information for a digital pre-distorter of the second wireless communication device; and transmitting the digital pre-distortion information to the second wireless communication device.

Aspect 31: The method of aspect 30, further comprising: transmitting a first message to the second wireless communication device, wherein the first message indicates a capability to compute digital pre-distortion information; and receiving a second message from the second wireless communication device after the transmitting the first message, wherein the second message requests the first wireless communication device to compute the digital pre-distortion information and transmit the digital pre-distortion information to the second wireless communication device, wherein the digital pre-distortion information is transmitted to the second wireless communication device after the receiving the second message.

Aspect 32: The method of aspect 30, further comprising: receiving first information for computing the digital pre-distortion information from the second wireless communication device, wherein the calculating the digital pre-distortion information comprises calculating the digital pre-distortion information according to the first information.

Aspect 41: A method for wireless communication at a first wireless communication device, the method comprising: transmitting an indication associated with a non-linearity model for a power amplifier circuit to a second wireless communication device, the indication including a first parameter for a first crest factor reduction function, a second parameter for a digital pre-distortion function, and a third parameter for a second crest factor reduction function; and transmitting a first signal to a second wireless communication device, the first signal being generated based on the first crest factor reduction function, the digital pre-distortion function, and the second crest factor reduction function.

Aspect 42: The method of aspect 41, wherein the first parameter comprises a first clipping level associated with the first crest factor reduction function.

Aspect 43: The method of aspect 42, wherein the first clipping level is an absolute clipping level.

Aspect 44: The method of any of aspects 41 through 43, wherein the third parameter comprises a second clipping level associated with the second crest factor reduction function.

Aspect 45: The method of aspect 44, wherein the second clipping level is defined relative to a signal power associated with a transmission using the power amplifier circuit.

Aspect 46: The method of aspect 44, wherein the second clipping level is associated with a target peak-to-average power ratio associated with a transmission using the power amplifier circuit.

Aspect 47: The method any of aspects 41 through 46, wherein the second parameter comprises at least one non-linearity kernel associated with the digital pre-distortion function.

Aspect 48: The method of aspect 47, wherein the second parameter further comprises at least one non-linearity parameter for the at least one non-linearity kernel associated with the digital pre-distortion function.

Aspect 49: The method of any of aspects 41 through 48, wherein: the indication further includes the non-linearity model of the power amplifier circuit; and the non-linearity model of the power amplifier circuit comprises at least one non-linearity kernel.

Aspect 50: The method of any of aspects 41 through 49, further comprising: providing a second signal to the first crest factor reduction function to obtain a third signal; providing the third signal to the digital pre-distortion function to obtain a fourth signal; providing the fourth signal to the second crest factor reduction function to provide a fifth signal; and providing the fifth signal to the power amplifier circuit to obtain the first signal.

Aspect 51: The method of any of aspects 41 through 50, further comprising: transmitting the indication based on a change in the non-linearity model.

Aspect 52: The method of any of aspects 41 through 50, further comprising: receiving a request for the indication from the second wireless communication device; and transmitting the indication after the receipt of the request.

Aspect 53: The method of any of aspects 41 through 52, further comprising: receiving digital pre-distortion information for the digital pre-distortion function from the second wireless communication device; and adjusting the non-linearity model based on the digital pre-distortion information.

Aspect 54: The method of any of aspects 41 through 53, wherein: the method further comprises transmitting a message that requests the second wireless communication device to compute digital pre-distortion information for the digital pre-distortion function; the message includes at least one parameter for computation of the digital pre-distortion information to meet a target crest factor reduction clipping level associated with the digital pre-distortion function; and the at least one parameter comprises: a first limitation on an instantaneous signal peak at an input to a power amplifier, a second limitation on a peak-to-average power ratio associated with the power amplifier, or a combination thereof.

Aspect 55: The method of any of aspects 41 through 53, wherein: the method further comprises receiving a first message from the second wireless communication device; the first message indicates that the second wireless communication device has a capability to compute digital pre-distortion information for the digital pre-distortion function; the method further comprises transmitting a second message to the second wireless communication device after the receipt of the first message; the second message comprises a request for the second wireless communication device to compute the digital pre-distortion information and transmit the digital pre-distortion information to the first wireless communication device; and the digital pre-distortion information is received from the second wireless communication device after the transmission of the second message.

Aspect 57: A method for wireless communication at a first wireless communication device, the method comprising: receiving, from a second wireless communication device, an indication associated with a non-linearity model for a power amplifier circuit of the second wireless communication device, the indication including a first parameter for a first crest factor reduction function, a second parameter for a digital pre-distortion function, and a third parameter for a second crest factor reduction function; deriving the non-linearity model based on the indication; receiving a first signal from the second wireless communication device; and using the non-linearity model to compensate for non-linear distortion in the first signal.

Aspect 58: The method of aspect 57, wherein the first parameter comprises a first clipping level associated with the first crest factor reduction function.

Aspect 59: The method of aspect 58, wherein the first clipping level is an absolute clipping level.

Aspect 60: The method of any of aspects 57 through 58, wherein the third parameter comprises a second clipping level associated with the second crest factor reduction function.

Aspect 61: The method of aspect 60, wherein the second clipping level is defined relative to a signal power associated with a transmission using the power amplifier circuit.

Aspect 62: The method of aspect 60, wherein the second clipping level is associated with a target peak-to-average power ratio associated with a transmission using the power amplifier circuit.

Aspect 63: The method any of aspects 57 through 62, wherein the second parameter comprises at least one non-linearity kernel associated with the digital pre-distortion function.

Aspect 64: The method of aspect 63, wherein the second parameter further comprises at least one non-linearity parameter for the at least one non-linearity kernel associated with the digital pre-distortion function.

Aspect 65: The method of any of aspects 57 through 64, wherein: the indication further includes the non-linearity model of the power amplifier circuit; and the non-linearity model of the power amplifier circuit comprises at least one non-linearity kernel.

Aspect 66: The method of any of aspects 57 through 65, further comprising: selecting a set of kernels for the non-linearity model after the receipt of the indication; and calculating coefficients for the non-linearity model based on the set of kernels.

Aspect 67: The method of aspect 66, further comprising: selecting the set of kernels based on the first signal.

Aspect 68: The method of any of aspects 57 through 67, wherein: the method further comprises transmitting a request for the indication; and the indication is received after the transmission of the request.

Aspect 69: The method of any of aspects 57 through 67, wherein: the method further comprises receiving a message that requests the first wireless communication device to compute digital pre-distortion information for a digital pre-distortion function; the message includes at least one parameter for computation of the digital pre-distortion information to meet a target crest factor reduction clipping level associated with the digital pre-distortion function; the at least one parameter comprises: a first limitation on an instantaneous signal peak at an input to a power amplifier, a second limitation on a peak-to-average power ratio associated with the power amplifier, or a combination thereof; and the method further comprises computing the digital pre-distortion information such that: the first limitation on the instantaneous signal peak at the input to the power amplifier is not exceeded, the second limitation on the peak-to-average power ratio associated with the power amplifier is not exceeded, or a combination thereof.

Aspect 81: A method for wireless communication at a first wireless communication device, the method comprising: receiving digital pre-distortion information from a second wireless communication device; pre-distorting a signal based on the pre-distortion information to provide a pre-distorted signal; amplifying the pre-distorted signal to provide an amplified signal; and transmitting the amplified signal to the second wireless communication device.

Aspect 82: The method of aspect 81, wherein the digital pre-distortion information comprises digital pre-distortion coefficients.

Aspect 83: The method of aspect 81 or 82, further comprising: receiving a first message from the second wireless communication device, wherein the first message indicates that the second wireless communication device has a capability to compute digital pre-distortion information; and transmitting a second message to the second wireless communication device after the receiving the first message, wherein the second message requests the second wireless communication device to compute the digital pre-distortion information and transmit the digital pre-distortion information to the first wireless communication device, wherein the digital pre-distortion information is received from the second wireless communication device after the transmitting the second message.

Aspect 84: The method of aspect 83, wherein the second message requests the second wireless communication device to jointly compute the digital pre-distortion information and digital post-distortion information.

Aspect 85: The method of any of aspects 81 through 84, further comprising: transmitting first information for computing the digital pre-distortion information to the second wireless communication device.

Aspect 86: The method of aspect 85, wherein: the first information comprises at least one of a kernel type, a digital pre-distortion parameter, or a combination thereof; and the digital pre-distortion information comprises digital pre-distortion kernel coefficients.

Aspect 87: The method of any of aspects 81 through 86, further comprising: transmitting at least one constraint for computing the digital pre-distortion information to the second wireless communication device.

Aspect 88: The method of aspect 87, wherein the at least one constraint comprises an adjacent channel leakage ratio (ACLR) limit.

Aspect 89: The method of aspect 87, wherein the at least one constraint comprises at least one weight for at least one frequency band.

Aspect 101: A method for wireless communication at a first wireless communication device, the method comprising: calculating digital pre-distortion information for a digital pre-distorter of a second wireless communication device; and transmitting the digital pre-distortion information to the second wireless communication device.

Aspect 102: The method of aspect 101, wherein the digital pre-distortion information comprises digital pre-distortion coefficients.

Aspect 103: The method of aspect 101 or 102, further comprising: transmitting a first message to the second wireless communication device, wherein the first message indicates a capability to compute digital pre-distortion information; and receiving a second message from the second wireless communication device after the transmitting the first message, wherein the second message requests the first wireless communication device to compute the digital pre-distortion information and transmit the digital pre-distortion information to the second wireless communication device, wherein the digital pre-distortion information is transmitted to the second wireless communication device after the receiving the second message.

Aspect 104: The method of aspect 103, wherein the second message requests the first wireless communication device to jointly compute the digital pre-distortion information and digital post-distortion information where the computation of the digital pre-distortion information is constrained by an adjacent channel leakage ratio (ACLR) limit.

Aspect 105: The method of any of aspects 101 through 104, further comprising: receiving first information for computing the digital pre-distortion information from the second wireless communication device, wherein the calculating the digital pre-distortion information comprises calculating the digital pre-distortion information according to the first information.

Aspect 106: The method of aspect 105, wherein: the first information comprises at least one of a kernel type, a digital pre-distortion parameter, or a combination thereof; and the digital pre-distortion information comprises digital pre-distortion kernel coefficients.

Aspect 107: The method of any of aspects 101 through 106, further comprising: receiving at least one constraint for computing the digital pre-distortion information from the second wireless communication device, wherein the calculating the digital pre-distortion information comprises calculating the digital pre-distortion information according to the at least one constraint.

Aspect 108: The method of aspect 107, wherein the at least one constraint comprises an adjacent channel leakage ratio (ACLR) limit.

Aspect 109: The method of any of aspects 107 through 108, wherein the at least one constraint comprises at least one weight for at least one frequency band.

Aspect 110: A wireless communication device comprising: a transceiver, a memory, and a processor communicatively coupled to the transceiver and the memory, wherein the processor is configured to perform any one of aspects 1 through 19.

Aspect 111: An apparatus configured for wireless communication comprising at least one means for performing any one of aspects 1 through 19.

Aspect 112: A non-transitory computer-readable medium storing computer-executable code, comprising code for causing an apparatus to perform any one of aspects 1 through 19.

Aspect 113: A wireless communication device comprising: a transceiver, a memory, and a processor communicatively coupled to the transceiver and the memory, wherein the processor is configured to perform any one of aspects 21 through 39.

Aspect 114: An apparatus configured for wireless communication comprising at least one means for performing any one of aspects 21 through 39.

Aspect 115: A non-transitory computer-readable medium storing computer-executable code, comprising code for causing an apparatus to perform any one of aspects 21 through 39.

Aspect 116: A wireless communication device comprising: a transceiver, a memory, and a processor communicatively coupled to the transceiver and the memory, wherein the processor is configured to perform any one of aspects 81 through 89.

Aspect 117: An apparatus configured for wireless communication comprising at least one means for performing any one of aspects 81 through 89.

Aspect 118: A non-transitory computer-readable medium storing computer-executable code, comprising code for causing an apparatus to perform any one of aspects 81 through 89.

Aspect 119: A wireless communication device comprising: a transceiver, a memory, and a processor communicatively coupled to the transceiver and the memory, wherein the processor is configured to perform any one of aspects 101 through 109.

Aspect 120: An apparatus configured for wireless communication comprising at least one means for performing any one of aspects 101 through 109.

Aspect 121: A non-transitory computer-readable medium storing computer-executable code, comprising code for causing an apparatus to perform any one of aspects 101 through 109.

Aspect 122: A wireless communication device comprising: a transceiver, a memory, and a processor communicatively coupled to the transceiver and the memory, wherein the processor is configured to perform any one of aspects 41 through 55.

Aspect 123: An apparatus configured for wireless communication comprising at least one means for performing any one of aspects 41 through 55.

Aspect 124: A non-transitory computer-readable medium storing computer-executable code, comprising code for causing an apparatus to perform any one of aspects 41 through 55.

Aspect 125: A wireless communication device comprising: a transceiver, a memory, and a processor communicatively coupled to the transceiver and the memory, wherein the processor is configured to perform any one of aspects 56 through 69.

Aspect 126: An apparatus configured for wireless communication comprising at least one means for performing any one of aspects 56 through 69.

Aspect 127: A non-transitory computer-readable medium storing computer-executable code, comprising code for causing an apparatus to perform any one of aspects 56 through 69.

Several aspects of a wireless communication network have been presented with reference to example implementations. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-27 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-3, 7-13, 15-20, and 24 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A first wireless communication device, comprising:
one or more memories that store processor-executable code; and
one or more processors configured to execute the processor-executable code and cause the first wireless communication device to:
receive a first request from a second wireless communication device, the first request instructing the first wireless communication device to perform joint digital pre-distortion and digital post-distortion operations to jointly compute first digital pre-distortion information for a first non-linearity model for a power amplifier circuit of the second wireless communication device and digital post-distortion information for the first wireless communication device, the first request further requesting the first wireless communication device to send the first digital pre-distortion information to the second wireless communication device;
receive first non-linearity information associated with the first non-linearity model for the power amplifier circuit of the second wireless communication device;
receive, from the second wireless communication device, an indication of a change in the first non-linearity model;
jointly compute the first digital pre-distortion information for the first non-linearity model for the power amplifier circuit of the second wireless communication device and the digital post-distortion information for the first wireless communication device in response to the receipt of the indication of the change in the first non-linearity model, the digital post-distortion information comprising a second non-linearity model for a digital post-distortion process of the second wireless communication device, the digital post-distortion process comprising an iterative slicer and estimator process based on the second non-linearity model;
transmit the first digital pre-distortion information to the second wireless communication device;
receive a first signal from the second wireless communication device; and
use the digital post-distortion process comprising the iterative slicer and estimator process based on the second non-linearity model to compensate for non-linear distortion in the first signal, wherein:
the joint computation of the first digital pre-distortion information for the first non-linearity model for the power amplifier circuit of the second wireless communication device and the digital post-distortion information for the first wireless communication device is based on an adjacent channel leakage ratio (ACLR) limit whereby crest factor reduction, digital pre-distortion, and digital post-distortion configurations associated with a gain state are selected to meet the ACLR limit; and
the digital post-distortion process comprises an iterative Bussgang decomposition process where estimates of the non-linear distortion in the first signal are subtracted from the first signal until a convergence criterion is met.

2. The first wireless communication device of claim 1, wherein the first non-linearity model comprises a first crest factor reduction function that provides an input for a digital pre-distortion function, the first non-linearity model further comprising a second crest factor reduction function that receives an output of the digital pre-distortion function, the first non-linearity information including a first parameter for the first crest factor reduction function, a second parameter for the digital pre-distortion function, and a third parameter for the second crest factor reduction function.

3. The first wireless communication device of claim 2, wherein the first parameter comprises a first clipping level associated with the first crest factor reduction function.

4. The first wireless communication device of claim 2, wherein the third parameter comprises a second clipping level associated with the second crest factor reduction function.

5. The first wireless communication device of claim 4, wherein the second clipping level is defined relative to a signal power associated with a transmission using the power amplifier circuit.

6. The first wireless communication device of claim 4, wherein the second clipping level is associated with a target peak-to-average power ratio associated with a transmission using the power amplifier circuit.

7. The first wireless communication device of claim 2, wherein the second parameter comprises at least one non-linearity kernel associated with the digital pre-distortion function.

8. The first wireless communication device of claim 7, wherein the second parameter comprises at least one non-linearity parameter for the at least one non-linearity kernel associated with the digital pre-distortion function.

9. The first wireless communication device of claim 1, wherein:
the first non-linearity information further includes the first non-linearity model of the power amplifier circuit; and
the first non-linearity model of the power amplifier circuit comprises at least one non-linearity kernel.

10. The first wireless communication device of claim 1, wherein the one or more processors are further configured to execute the processor-executable code and cause the first wireless communication device to:

select a set of kernels for the first non-linearity model after the receipt of the first non-linearity information; and calculate coefficients for the first non-linearity model based on the set of kernels.

11. The first wireless communication device of claim 10, wherein the one or more processors are further configured to execute the processor-executable code and cause the first wireless communication device to:

select the set of kernels based on the first signal.

12. The first wireless communication device of claim 1, wherein:

the first request includes at least one parameter for computation of the first digital pre-distortion information to meet a target crest factor reduction clipping level associated with a digital pre-distortion function;

the at least one parameter comprises: a first limitation on an instantaneous signal peak at an input to a power amplifier and a second limitation on a peak-to-average power ratio associated with the power amplifier; and the one or more processors are further configured to execute the processor-executable code and cause the first wireless communication device to compute the first digital pre-distortion information such that: the first limitation on the instantaneous signal peak at the input to the power amplifier is not exceeded and the second limitation on the peak-to-average power ratio associated with the power amplifier is not exceeded.

13. A method for wireless communication at a first wireless communication device, the method comprising:

receiving a first request from a second wireless communication device, the first request instructing the first wireless communication device to perform joint digital pre-distortion and digital post-distortion operations to jointly compute first digital pre-distortion information for a first non-linearity model for a power amplifier circuit of the second wireless communication device and digital post-distortion information for the first wireless communication device, the first request further requesting the first wireless communication device to send the first digital pre-distortion information to the second wireless communication device;

receiving first non-linearity information associated with the first non-linearity model for the power amplifier circuit of the second wireless communication device;

receiving, from the second wireless communication device, an indication of a change in the first non-linearity model;

jointly computing the first digital pre-distortion information for the first non-linearity model for the power amplifier circuit of the second wireless communication device and the digital post-distortion information for the first wireless communication device in response to the receipt of the indication of the change in the first non-linearity model, the digital post-distortion information comprising a second non-linearity model for a digital post-distortion process of the second wireless communication device, the digital post-distortion process comprising an iterative slicer and estimator process based on the second non-linearity model;

transmitting the first digital pre-distortion information to the second wireless communication device;

receiving a first signal from the second wireless communication device; and using the digital post-distortion process comprising the iterative slicer and estimator process based on the second non-linearity model to compensate for non-linear distortion in the first signal, wherein:

the joint computation of the first digital pre-distortion information for the first non-linearity model for the power amplifier circuit of the second wireless communication device and the digital post-distortion information for the first wireless communication device is based on an adjacent channel leakage ratio (ACLR) limit whereby crest factor reduction, digital pre-distortion, and digital post-distortion configurations associated with a gain state are selected to meet the ACLR limit; and the digital post-distortion process comprises an iterative Bussgang decomposition process where estimates of the non-linear distortion in the first signal are subtracted from the first signal until a convergence criterion is met.

14. The first wireless communication device of claim 1, wherein the one or more processors are further configured to execute the processor-executable code and cause the first wireless communication device to:

receive a second request from the second wireless communication device, the second request instructing the first wireless communication device to compute second digital pre-distortion information for the first non-linearity model for the power amplifier circuit of the second wireless communication device, the second request further requesting the first wireless communication device to send the second digital pre-distortion information to the second wireless communication device;

compute the second digital pre-distortion information for the first non-linearity model for the power amplifier circuit of the second wireless communication device; and transmit the second digital pre-distortion information to the second wireless communication device.

15. The method of claim 13, wherein the first non-linearity model comprises a first crest factor reduction function that provides an input for a digital pre-distortion function, the first non-linearity model further comprising a second crest factor reduction function that receives an output of the digital pre-distortion function, the first non-linearity information including a first parameter for the first crest factor reduction function, a second parameter for the digital pre-distortion function, and a third parameter for the second crest factor reduction function.

16. The method of claim 15, wherein the first parameter comprises a first clipping level associated with the first crest factor reduction function.

17. The method of claim 15, wherein the third parameter comprises a second clipping level associated with the second crest factor reduction function.

18. The method of claim 17, wherein the second clipping level is defined relative to a signal power associated with a transmission using the power amplifier circuit.

19. The method of claim 17, wherein the second clipping level is associated with a target peak-to-average power ratio associated with a transmission using the power amplifier circuit.

20. The method of claim 15, wherein the second parameter comprises at least one non-linearity kernel associated with the digital pre-distortion function.

21. The method of claim 20, wherein the second parameter comprises at least one non-linearity parameter for the at least one non-linearity kernel associated with the digital pre-distortion function.

22. The method of claim 13, wherein:
the first non-linearity information further includes the first non-linearity model of the power amplifier circuit; and
the first non-linearity model of the power amplifier circuit comprises at least one non-linearity kernel.

23. The method of claim 13, comprising:
selecting a set of kernels for the first non-linearity model after the receipt of the first non-linearity information; and
calculating coefficients for the first non-linearity model based on the set of kernels.

24. The method of claim 23, comprising:
selecting the set of kernels based on the first signal.

25. The method of claim 13, wherein:
the first request includes at least one parameter for computation of the first digital pre-distortion information to meet a target crest factor reduction clipping level associated with a digital pre-distortion function;
the at least one parameter comprises: a first limitation on an instantaneous signal peak at an input to a power amplifier and a second limitation on a peak-to-average power ratio associated with the power amplifier; and
the method comprises computing the first digital pre-distortion information such that: the first limitation on the instantaneous signal peak at the input to the power amplifier is not exceeded and the second limitation on the peak-to-average power ratio associated with the power amplifier is not exceeded.

26. The method of claim 13, comprising:
receiving a second request from the second wireless communication device, the second request instructing the first wireless communication device to compute second digital pre-distortion information for the first non-linearity model for the power amplifier circuit of the second wireless communication device, the second request further requesting the first wireless communication device to send the second digital pre-distortion information to the second wireless communication device;
computing the second digital pre-distortion information for the first non-linearity model for the power amplifier circuit of the second wireless communication device; and
transmitting the second digital pre-distortion information to the second wireless communication device.

* * * * *